United States Patent
Shimokawa et al.

(10) Patent No.: US 9,210,096 B2
(45) Date of Patent: Dec. 8, 2015

(54) ROUTING METHOD AND NODE EQUIPMENT

(71) Applicant: FUJITSU LIMITED, Kawasaki-shi, Kanagawa (JP)

(72) Inventors: Yoshinobu Shimokawa, Itoshima (JP); Yoshiyuki Jufuku, Itoshima (JP); Yuji Kuroki, Fukuoka (JP); Masatsugu Kawamoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 288 days.

(21) Appl. No.: 13/778,224

(22) Filed: Feb. 27, 2013

(65) Prior Publication Data

US 2013/0170504 A1    Jul. 4, 2013

Related U.S. Application Data

(63) Continuation of application No. PCT/JP2010/066441, filed on Sep. 22, 2010.

(51) Int. Cl.
*H04L 12/875* (2013.01)
*H04W 40/02* (2009.01)
*H04L 12/733* (2013.01)
*H04L 12/705* (2013.01)

(52) U.S. Cl.
CPC .............. *H04L 47/56* (2013.01); *H04L 45/122* (2013.01); *H04L 45/18* (2013.01); *H04W 40/02* (2013.01)

(58) Field of Classification Search
None
See application file for complete search history.

(56) References Cited

U.S. PATENT DOCUMENTS

| | | | |
|---|---|---|---|
| 2002/0163912 A1 | 11/2002 | Carlson | |
| 2005/0157698 A1* | 7/2005 | Park et al. | 370/351 |
| 2006/0098575 A1* | 5/2006 | Lee | 370/237 |
| 2009/0296704 A1* | 12/2009 | Kim et al. | 370/389 |

FOREIGN PATENT DOCUMENTS

| | | |
|---|---|---|
| JP | 2002-368789 | 12/2002 |
| JP | 2006-245854 | 9/2006 |

OTHER PUBLICATIONS

International Search Report of Corresponding PCT Application PCT/JP2010/066441 mailed Dec. 14, 2010.
PCT International Preliminary Report on Patentability mailed Apr. 25, 2013 in corresponding International application No. PCT/JP2010/066441.

* cited by examiner

*Primary Examiner* — Ian N Moore
*Assistant Examiner* — Latresa McCallum
(74) *Attorney, Agent, or Firm* — Staas & Halsey LLP

(57) ABSTRACT

A routing method performed by node equipment includes: receiving a first frame including a wait number, incrementing the wait number, and storing the incremented wait number as a local wait number; receiving a second frame including a wait number of a destination node equipment, and comparing the wait number in the second frame and the local wait number; transmitting the second frame to an adjacent node equipment having a larger wait number than the local wait number, when the wait number in the second frame is larger than the local wait number; and returning the second frame to a source node equipment of the second frame, when the wait number in the second frame is larger than the local wait number but there is no adjacent node equipment having a larger wait number than the local wait number.

18 Claims, 51 Drawing Sheets

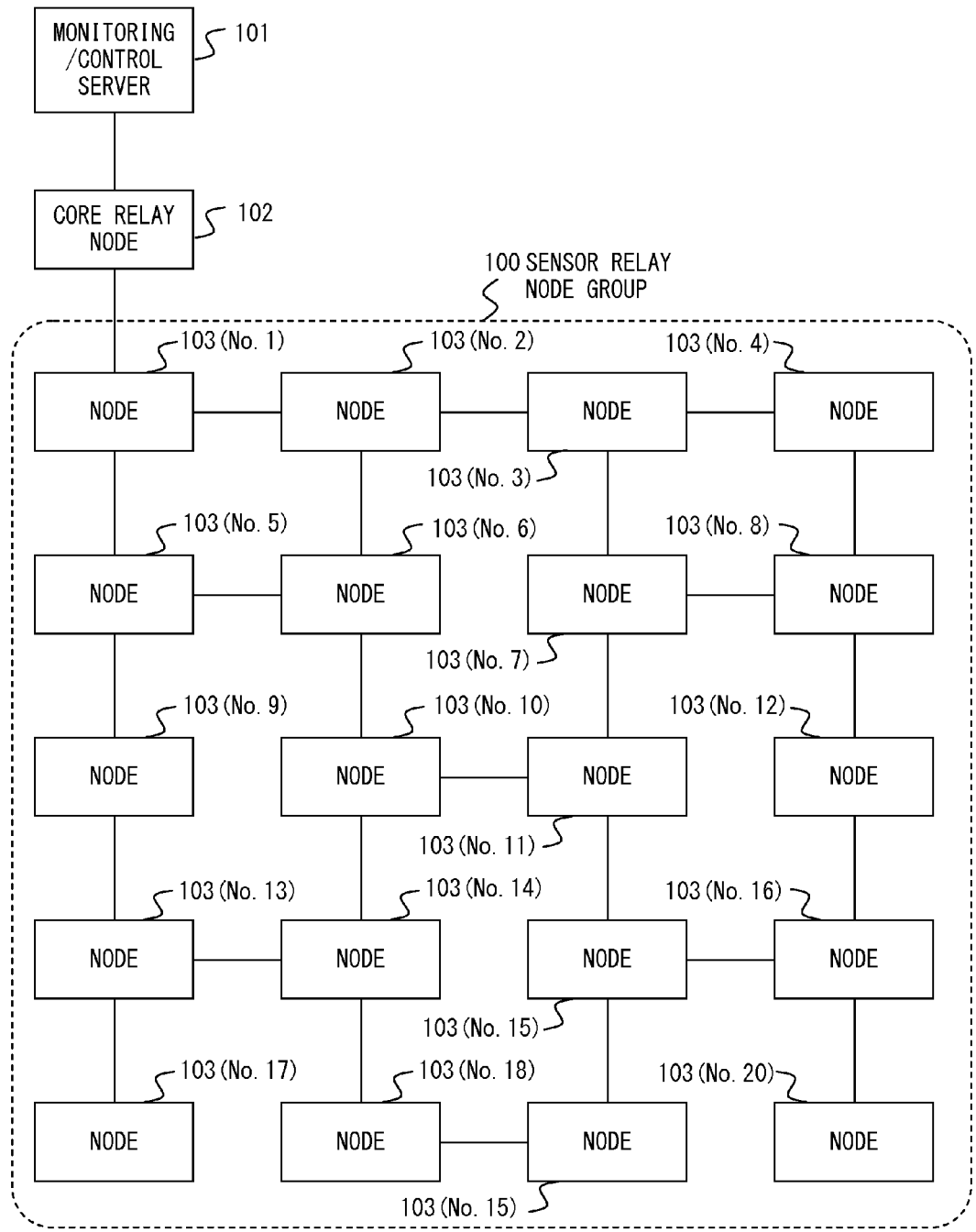
F I G. 1

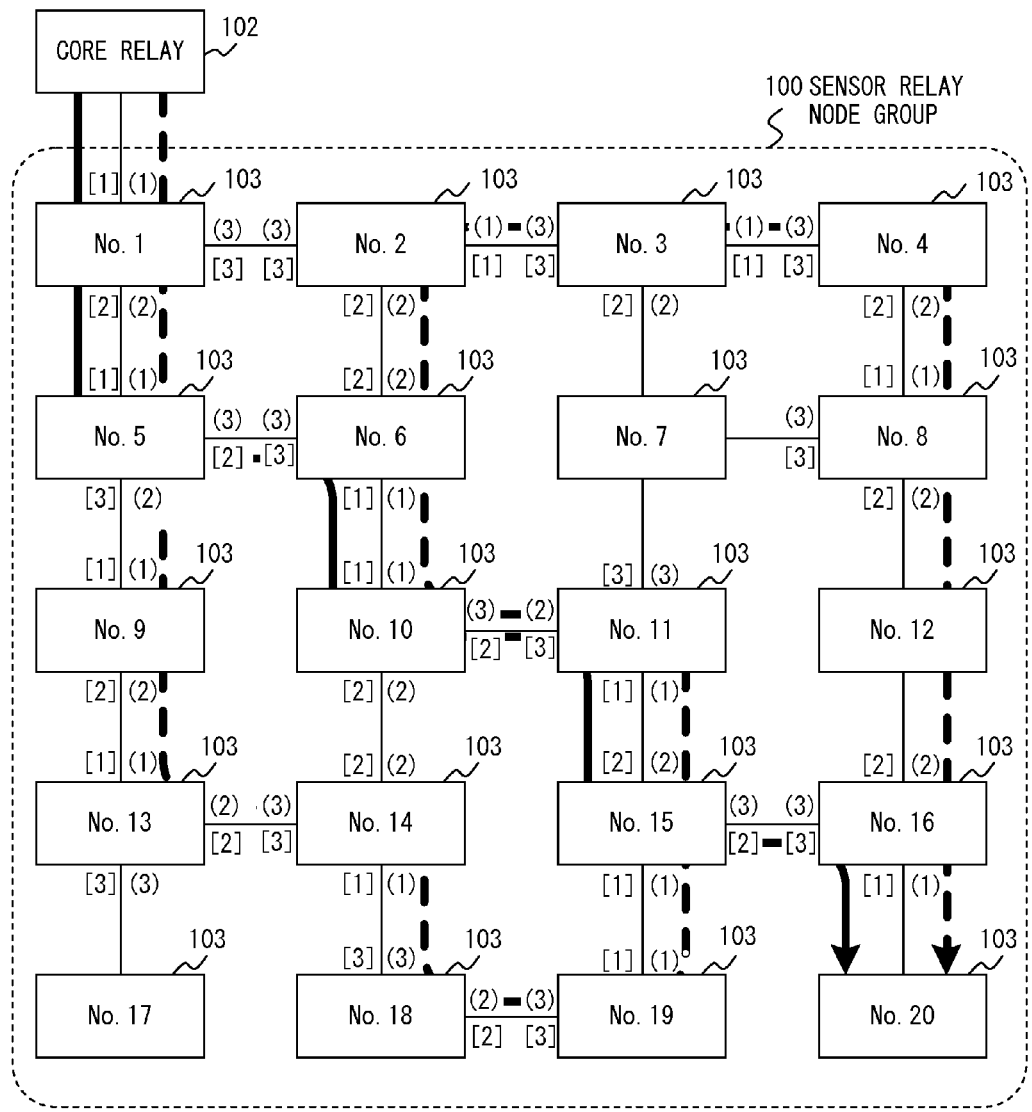
F I G. 2

| DST ID (6byte) | P1 (2bit) | P2 (2bit) | P3 (2bit) | TIMER (8bit) |
|---|---|---|---|---|

F I G. 4

| SRC ID (6byte) | FID (2byte) | RxPort (2bit) | P1 (2bit) | P2 (2bit) | P3 (2bit) | TIMER (8bit) |

F I G. 5

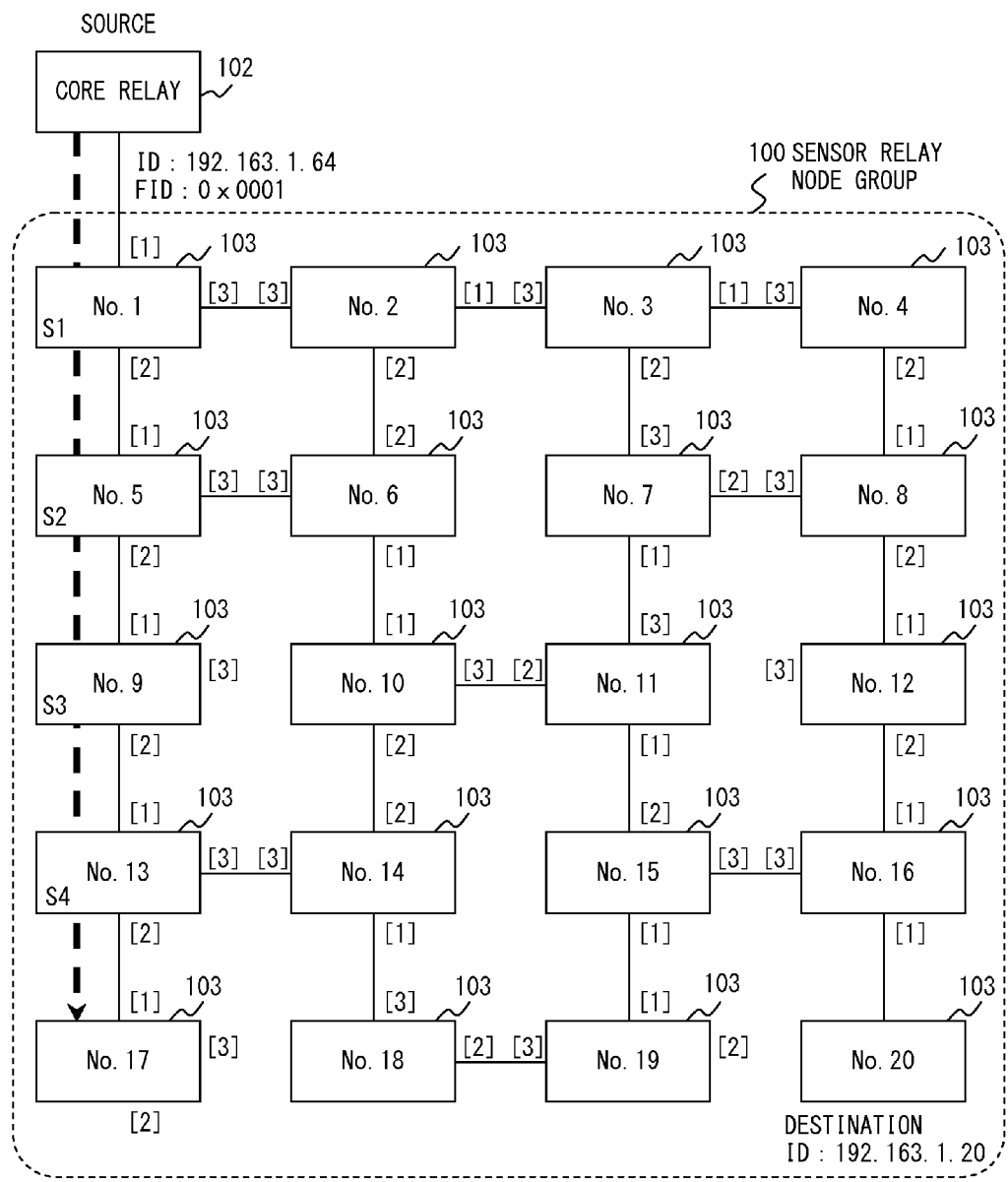
F I G. 6

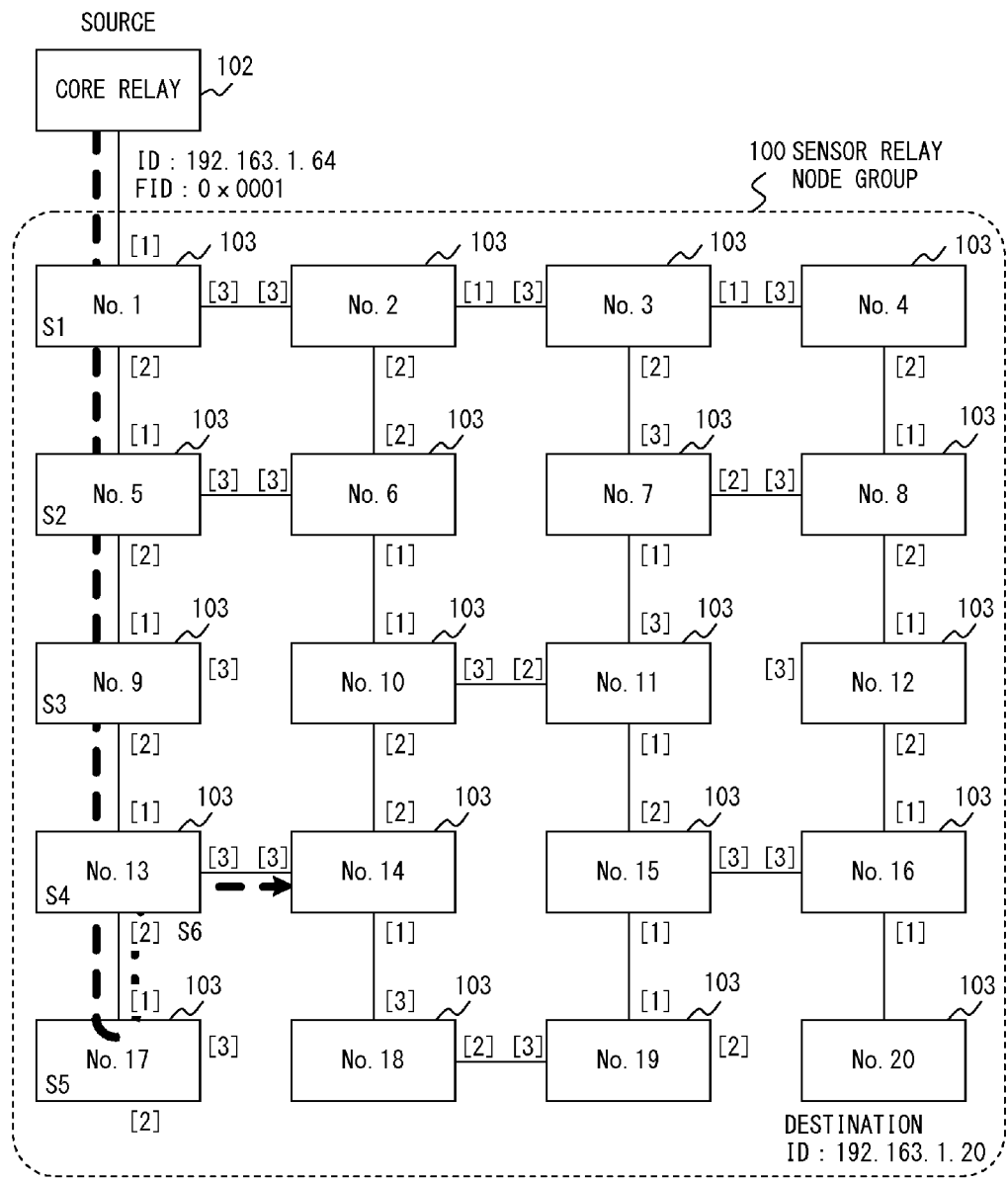
F I G. 7

F I G. 9A

| No. | SENSOR RELAY | DST ID (DESTINATION) | PS TABLE (Destination Table) | | |
|---|---|---|---|---|---|
| | | | Port1 | Port2 | Port3 |
| S1 | SENSOR RELAY No. 1 | 192.163.1.20 | Unused | Used | Unused |
| S2 | SENSOR RELAY No. 5 | 192.163.1.20 | Unused | Used | Unused |
| S3 | SENSOR RELAY No. 9 | 192.163.1.20 | Unused | Used | Link Disconnected |
| S4 | SENSOR RELAY No. 13 | 192.163.1.20 | Unused | Unused | Link Disconnected |
| S5 | SENSOR RELAY No. 17 | 192.163.1.20 | Loop | Link Disconnected | Used |
| S6 | SENSOR RELAY No. 13 | 192.163.1.20 | Unused | Loop | Unused |
| S7 | SENSOR RELAY No. 14 | 192.163.1.20 | Used | Unused | Unused |
| S8 | SENSOR RELAY No. 18 | 192.163.1.20 | Link Disconnected | Used | Unused |
| S9 | SENSOR RELAY No. 19 | 192.163.1.20 | Used | Link Disconnected | Unused |
| S10 | SENSOR RELAY No. 15 | 192.163.1.20 | Unused | Used | Unused |
| S11 | SENSOR RELAY No. 11 | 192.163.1.20 | Used | Unused | Unused |
| S12 | SENSOR RELAY No. 10 | 192.163.1.20 | Unused | Used | Unused |
| S13 | SENSOR RELAY No. 6 | 192.163.1.20 | Used | Unused | Unused |
| S14 | SENSOR RELAY No. 2 | 192.163.1.20 | Used | Unused | Unused |
| S15 | SENSOR RELAY No. 3 | 192.163.1.20 | Link Disconnected | Used | Unused |
| S16 | SENSOR RELAY No. 4 | 192.163.1.20 | Unused | Used | Unused |
| S17 | SENSOR RELAY No. 8 | 192.163.1.20 | Used | Used | Unused |
| S18 | SENSOR RELAY No. 12 | 192.163.1.20 | Unused | Used | Link Disconnected |
| S19 | SENSOR RELAY No. 16 | 192.163.1.20 | Used | Unused | Unused |

FID TABLE (Loop Monitoring Table)

| No. | SRC_ID (SOURCE) | FID (SEQUENCE No.) | PxPort | Port1 | Port2 | Port3 |
|---|---|---|---|---|---|---|
| S1 | 192.163.1.64 | 0x0001 | Port1 | No-transmission | Transmitting | No-transmission |
| S2 | 192.163.1.64 | 0x0001 | Port1 | No-transmission | Transmitting | No-transmission |
| S3 | 192.163.1.64 | 0x0001 | Port1 | No-transmission | Transmitting | Reserve |
| S4 | 192.163.1.64 | 0x0001 | Port1 | No-transmission | Transmitting | No-transmission |
| S5 | 192.163.1.64 | 0x0001 | Port1 | Loop | Reserve | Reserve |
| S6 | 192.163.1.64 | 0x0001 | Port1 | No-transmission | Loop | Transmitting |
| S7 | 192.163.1.64 | 0x0001 | Port3 | Transmitting | No-transmission | No-transmission |
| S8 | 192.163.1.64 | 0x0001 | Port3 | Reserve | Transmitting | No-transmission |
| S9 | 192.163.1.64 | 0x0001 | Port3 | Transmitting | Reserve | No-transmission |
| S10 | 192.163.1.64 | 0x0001 | Port1 | No-transmission | Transmitting | No-transmission |
| S11 | 192.163.1.64 | 0x0001 | Port2 | Transmitting | No-transmission | No-transmission |
| S12 | 192.163.1.64 | 0x0001 | Port3 | Transmitting | No-transmission | No-transmission |
| S13 | 192.163.1.64 | 0x0001 | Port3 | Transmitting | No-transmission | No-transmission |
| S14 | 192.163.1.64 | 0x0001 | Port1 | Reserve | Transmitting | No-transmission |
| S15 | 192.163.1.64 | 0x0001 | Port1 | No-transmission | Transmitting | No-transmission |
| S16 | 192.163.1.64 | 0x0001 | Port3 | No-transmission | Transmitting | No-transmission |
| S17 | 192.163.1.64 | 0x0001 | Port1 | No-transmission | Transmitting | Reserve |
| S18 | 192.163.1.64 | 0x0001 | Port2 | Transmitting | No-transmission | No-transmission |

F I G. 9 B

WaitNo. TABLE

| LOCAL NODE WaitNo | MASTER Port |
|---|---|

| | |
|---|---|
| P1 WaitNo | TIMER |
| P2 WaitNo | TIMER |
| P3 WaitNo | TIMER |

UNUSED STATUS
2'b00   Port1
2'b01   Port2
2'b10   Port3
2'b11

P1 WaitNo.   WaitNo. OF DESTINATION NODE CONNECTED TO Port1
P2 WaitNo.   WaitNo. OF DESTINATION NODE CONNECTED TO Port2
P3 WaitNo.   WaitNo. OF DESTINATION NODE CONNECTED TO Port3

FIG. 11

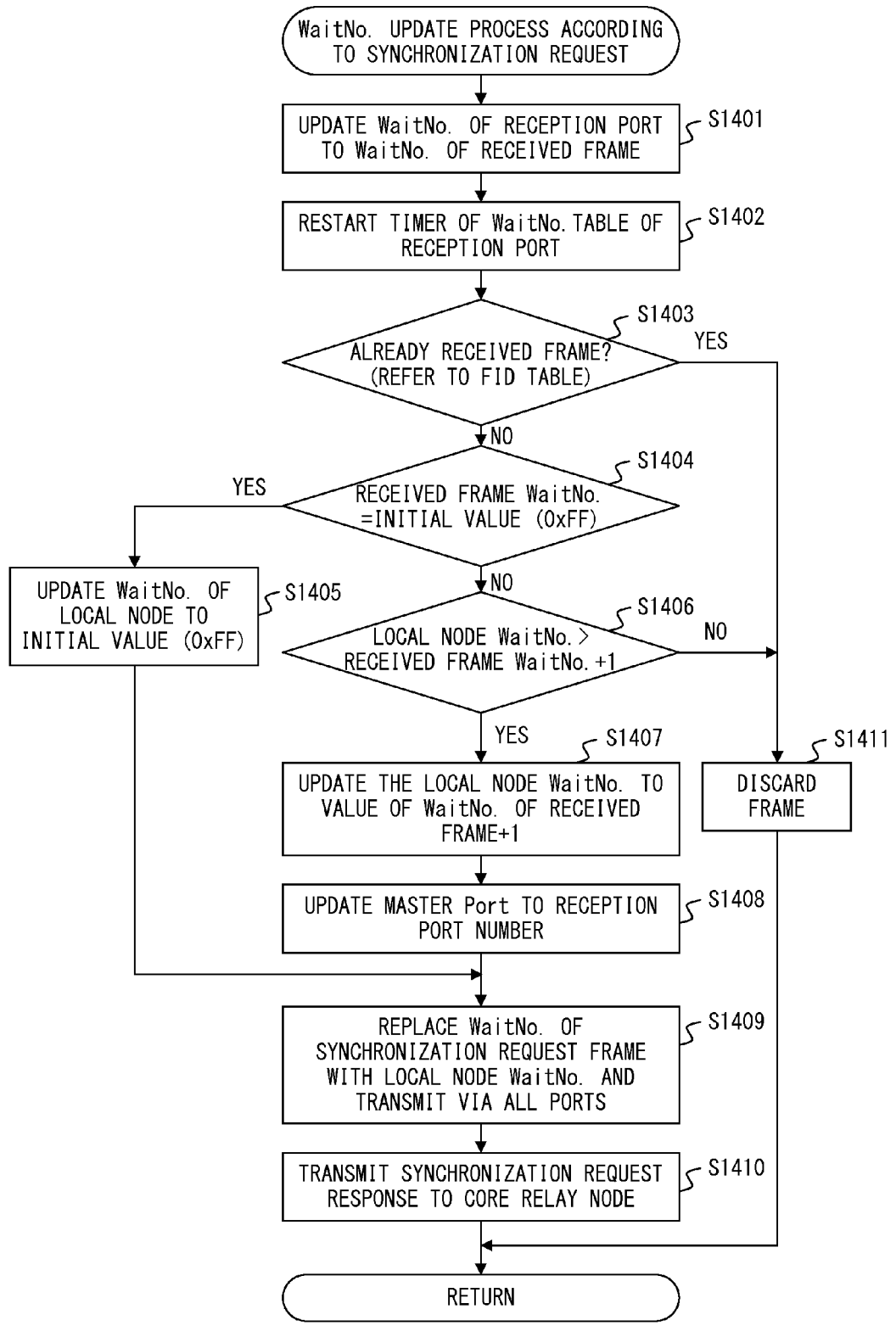
F I G. 14

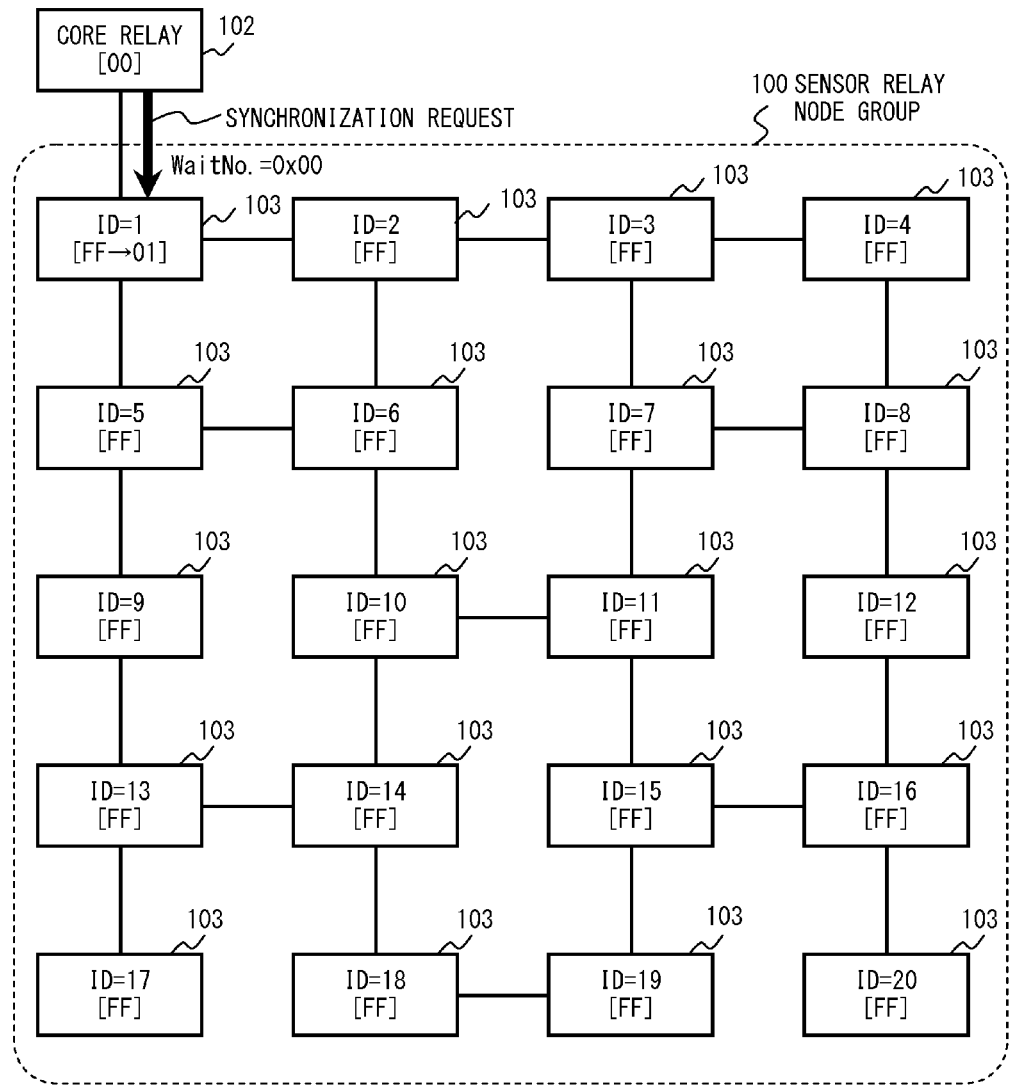
F I G. 1 5

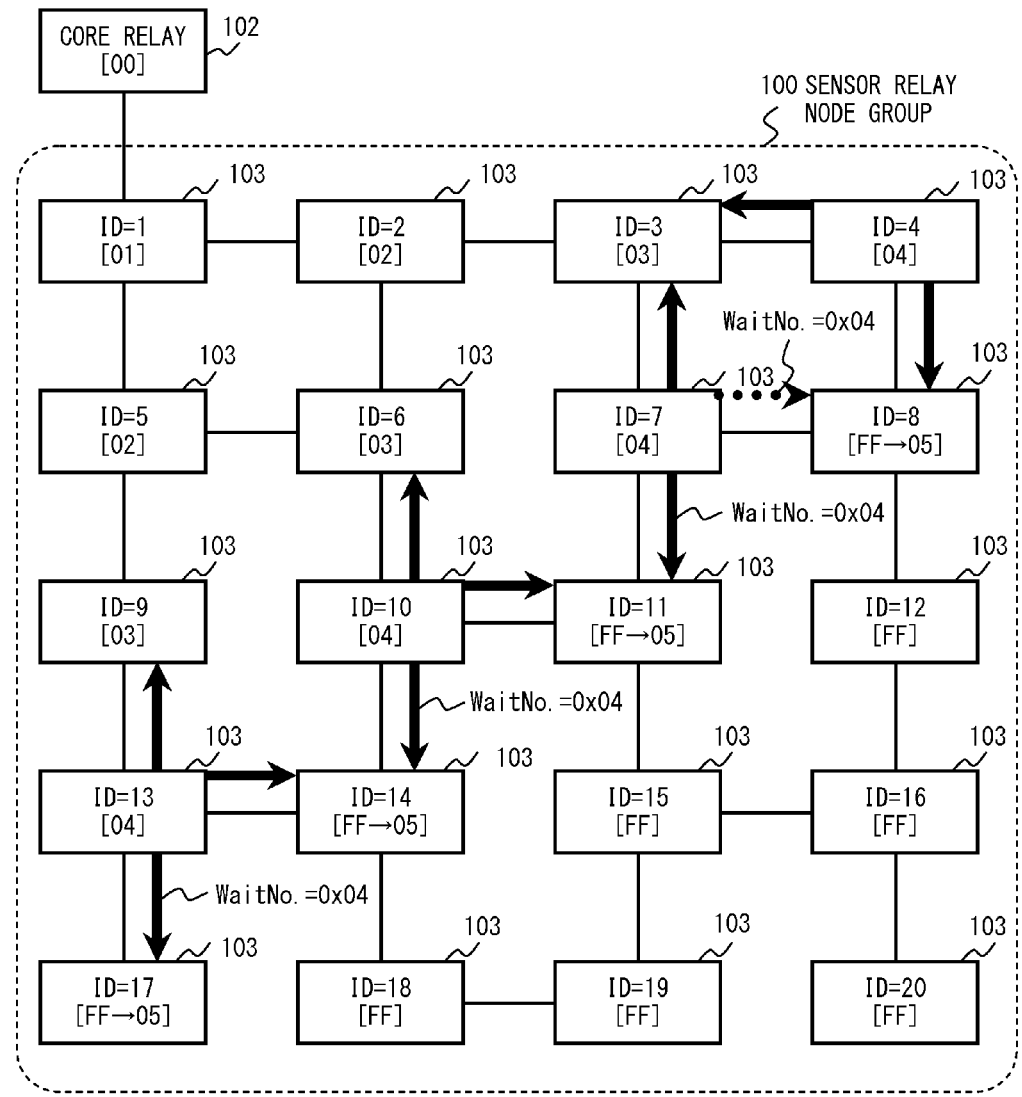
F I G. 19

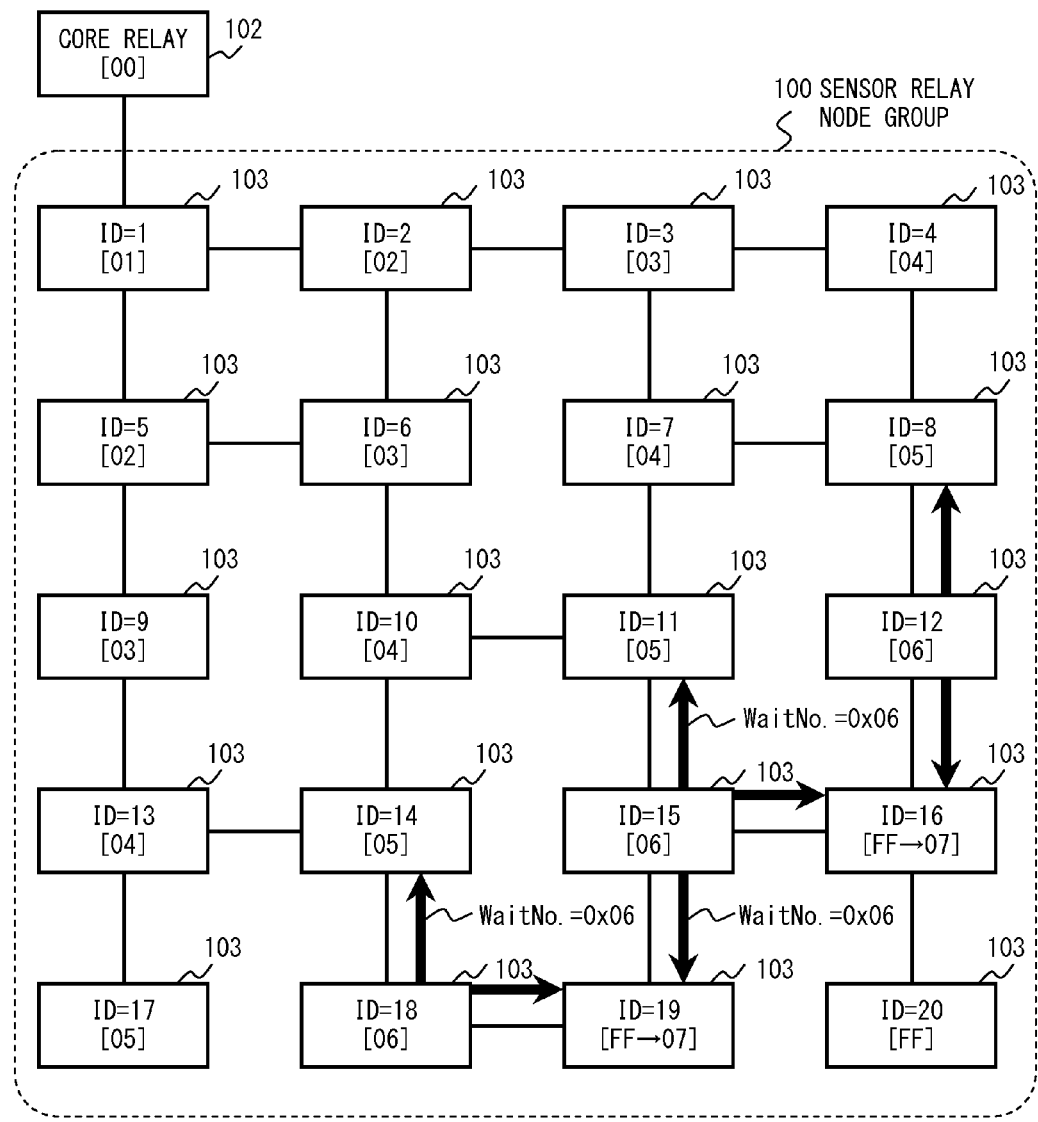
F I G. 2 1

FID TABLE (Loop Monitoring Table)

| SRC ID (6byte) | FID (2bite) | RxPort (2bit) | P1 (2bit) | P2 (2bit) | P3 (2bit) | Loop FLAG | TIMER (8bit) |
|---|---|---|---|---|---|---|---|

PS TABLE (Destination Table)

| No. | SENSOR RELAY | DST ID (DESTINATION) | Port1 | Port2 | Port3 |
|---|---|---|---|---|---|
| S1 | ID = 1 | 192.163.1.20 | Unused | Used | Unused |
| S2 | ID = 5 | 192.163.1.20 | Unused | Used | Unused |
| S3 | ID = 9 | 192.163.1.20 | Unused | Used | Link Disconnected |
| S4 | ID = 13 | 192.163.1.20 | Unused | Used | Unused |
| S5 | ID = 17 | 192.163.1.20 | Used | Link Disconnected | Link Disconnected |
| S6 | ID = 13 | 192.163.1.20 | Unused | Unused | Used |
| S7 | ID = 14 | 192.163.1.20 | Used | Unused | Unused |
| S8 | ID = 18 | 192.163.1.20 | Link Disconnected | Used | Unused |
| S9 | ID = 19 | 192.163.1.20 | Unused | Link Disconnected | Used |
| S10 | ID = 18 | 192.163.1.20 | Link Disconnected | Loop | Used |
| S11 | ID = 14 | 192.163.1.20 | Loop | Unused | Used |
| S12 | ID = 13 | 192.163.1.20 | Used | Loop | Used |
| S13 | ID = 9 | 192.163.1.20 | Used | Loop | Loop |
| S14 | ID = 5 | 192.163.1.20 | Unused | Loop | Link Disconnected |
| S15 | ID = 6 | 192.163.1.20 | Used | Unused | Used |
| S16 | ID = 10 | 192.163.1.20 | Unused | Used | Unused |
| S17 | ID = 14 | 192.163.1.20 | Loop | Loop | Loop |
| S18 | ID = 10 | 192.163.1.20 | Unused | Loop | Used |
| S19 | ID = 11 | 192.163.1.20 | Used | Unused | Unused |
| S20 | ID = 15 | 192.163.1.20 | Used | Unused | Unused |
| S21 | ID = 19 | 192.163.1.20 | Used | Link Disconnected | Unused |
| S22 | ID = 15 | 192.163.1.20 | Loop | Unused | Loop |
| S23 | ID = 16 | 192.163.1.20 | Used | Unused | Unused |

FIG. 30B

| No. | SRC ID (SOURCE) | FID (SEQUENCE No.) | PxPort | Port1 | Port2 | Port3 | Loop FLAG | |
|---|---|---|---|---|---|---|---|---|
| S1 | 192.163.1.64 | 0x0001 | Port1 | No-transmission | Transmitting | No-transmission | OFF | |
| S2 | 192.163.1.64 | 0x0001 | Port1 | No-transmission | Transmitting | No-transmission | OFF | |
| S3 | 192.163.1.64 | 0x0001 | Port1 | No-transmission | Transmitting | Reserve | OFF | |
| S4 | 192.163.1.64 | 0x0001 | Port1 | Transmitting | Transmitting | No-transmission | OFF | |
| S5 | 192.163.1.64 | 0x0001 | Port1 | Reserve | Reserve | Reserve | ON | Loop1 |
| S6 | 192.163.1.64 | 0x0001 | Port1 | No-transmission | Loop | Transmitting | OFF | |
| S7 | 192.163.1.64 | 0x0001 | Port3 | Transmitting | No-transmission | No-transmission | OFF | |
| S8 | 192.163.1.64 | 0x0001 | Port3 | Reserve | Transmitting | No-transmission | OFF | |
| S9 | 192.163.1.64 | 0x0001 | Port3 | No-transmission | Reserve | Transmitting | ON | Loop2 |
| S10 | 192.163.1.64 | 0x0001 | Port2 | Reserve | No-transmission | Transmitting | ON | Loop3 |
| S11 | 192.163.1.64 | 0x0001 | Port1 | Loop | Loop | Transmitting | ON | Loop4 |
| S12 | 192.163.1.64 | 0x0001 | Port1 | Transmitting | Loop | Loop | ON | Loop5 |
| S13 | 192.163.1.64 | 0x0001 | Port2 | Transmitting | Loop | Reserve | ON | Loop6 |
| S14 | 192.163.1.64 | 0x0001 | Port1 | No-transmission | No-transmission | Transmitting | OFF | |
| S15 | 192.163.1.64 | 0x0001 | Port3 | Transmitting | No-transmission | No-transmission | OFF | |
| S16 | 192.163.1.64 | 0x0001 | Port1 | No-transmission | Transmitting | No-transmission | OFF | |
| S17 | 192.163.1.64 | 0x0001 | Port1 | Loop | Transmitting | Loop | ON | Loop4 |
| S18 | 192.163.1.64 | 0x0001 | Port1 | No-transmission | Loop | Transmitting | OFF | |
| S19 | 192.163.1.64 | 0x0001 | Port2 | Transmitting | No-transmission | No-transmission | OFF | |
| S20 | 192.163.1.64 | 0x0001 | Port2 | Transmitting | No-transmission | No-transmission | OFF | |
| S21 | 192.163.1.64 | 0x0001 | Port3 | Transmitting | Reserve | No-transmission | OFF | |
| S22 | 192.163.1.64 | 0x0001 | Port2 | Loop | No-transmission | Transmitting | ON | Loop2 |
| S23 | 192.163.1.64 | 0x0001 | Port3 | Transmitting | No-transmission | No-transmission | OFF | |

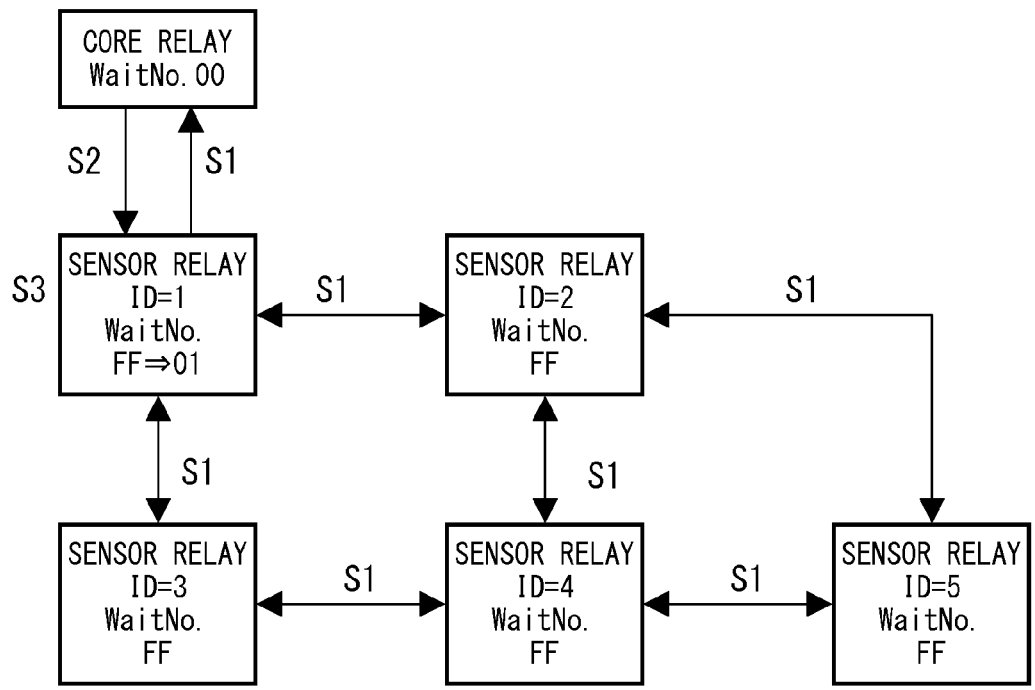
F I G. 3 4

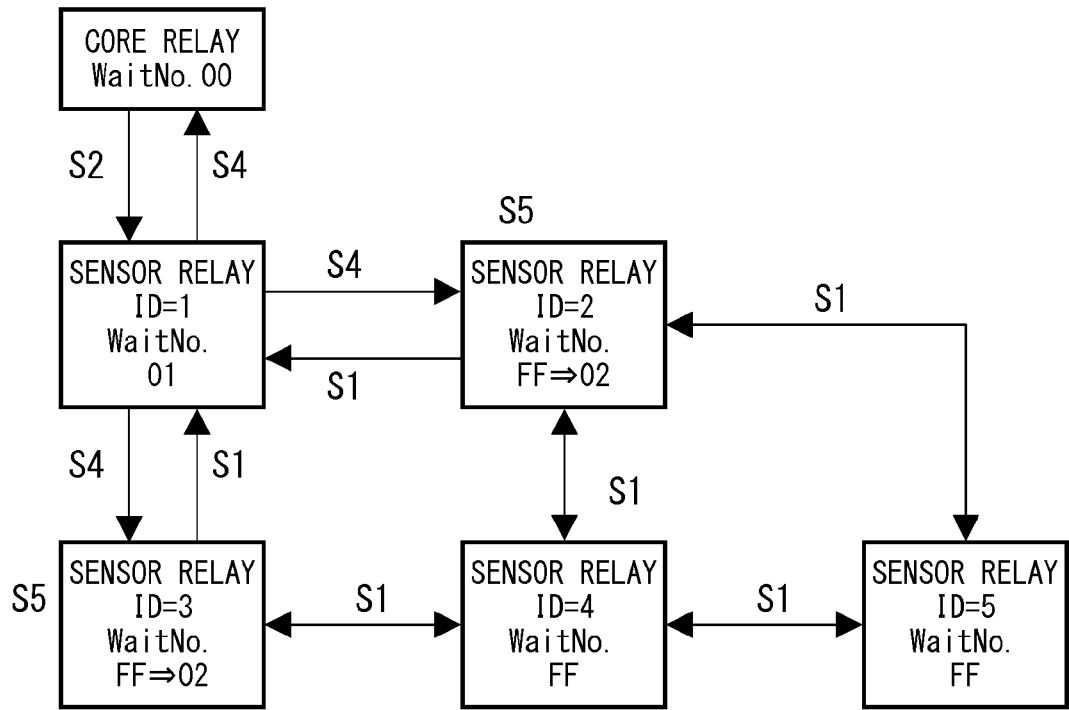
F I G. 3 5

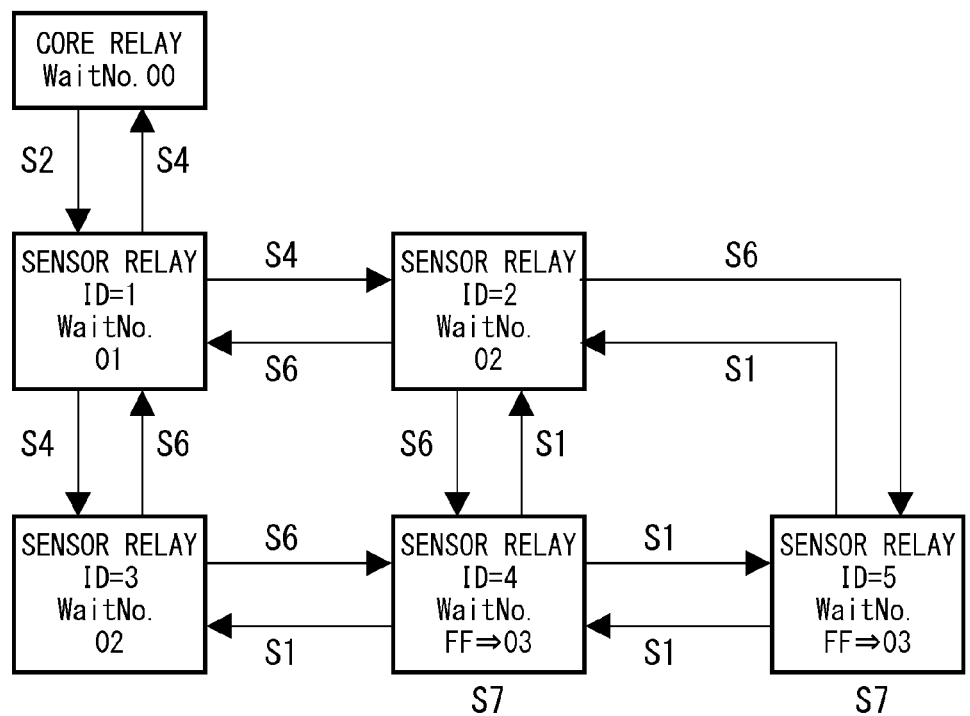
F I G. 3 6

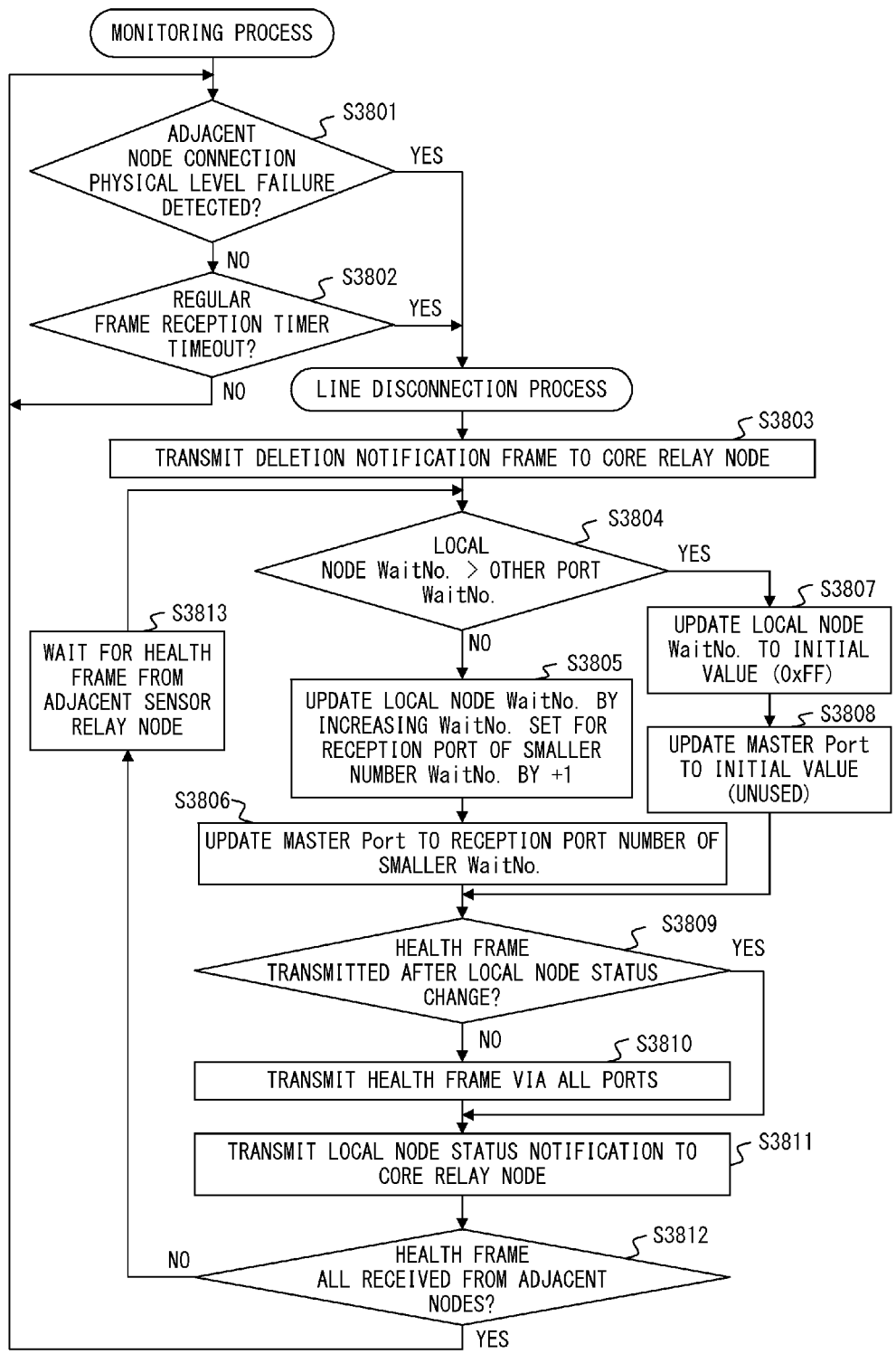
F I G. 3 8

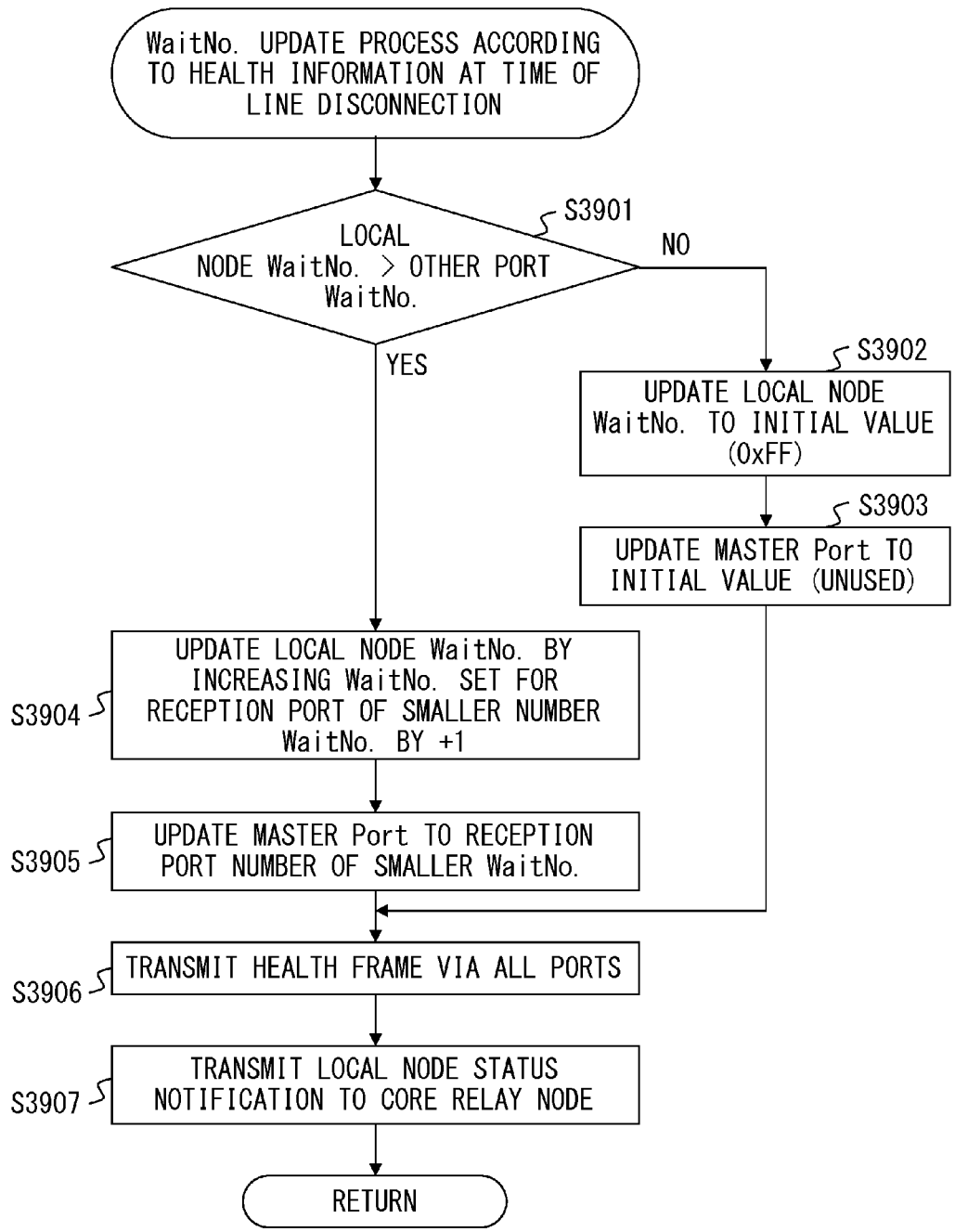
F I G. 3 9

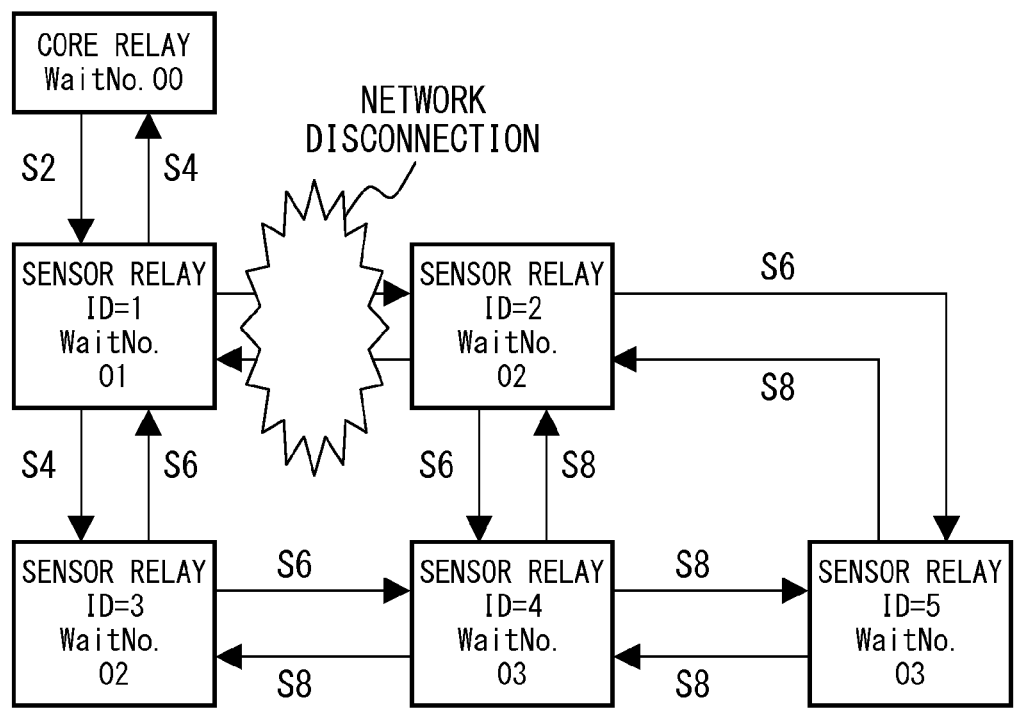
F I G. 4 1

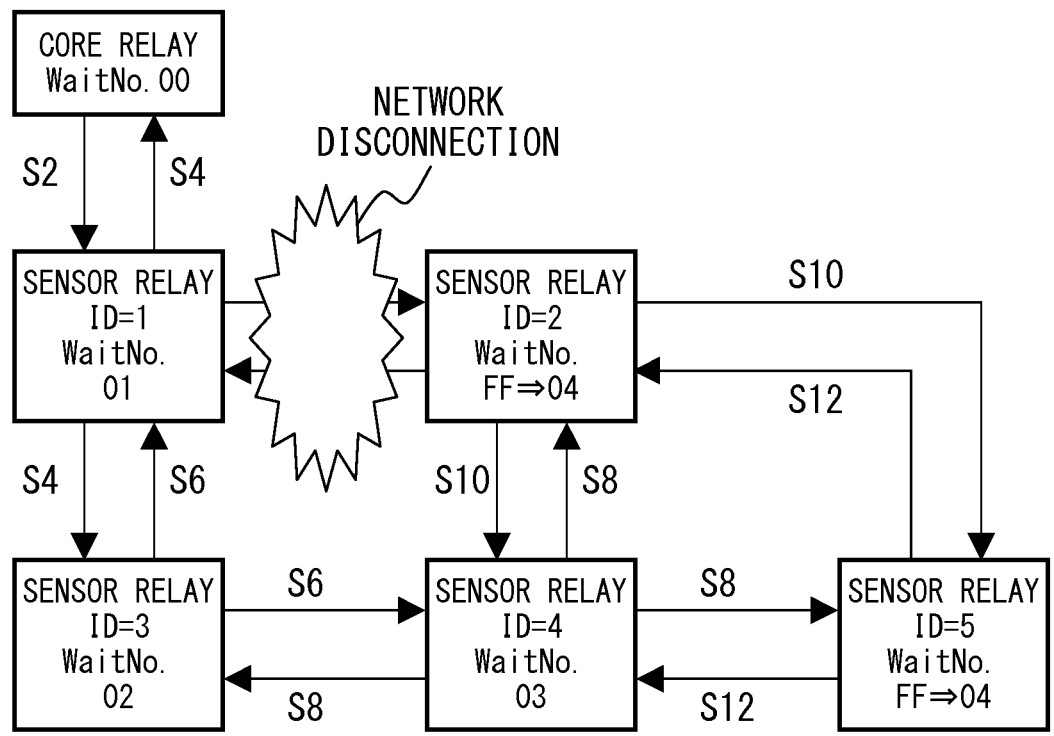
F I G. 43

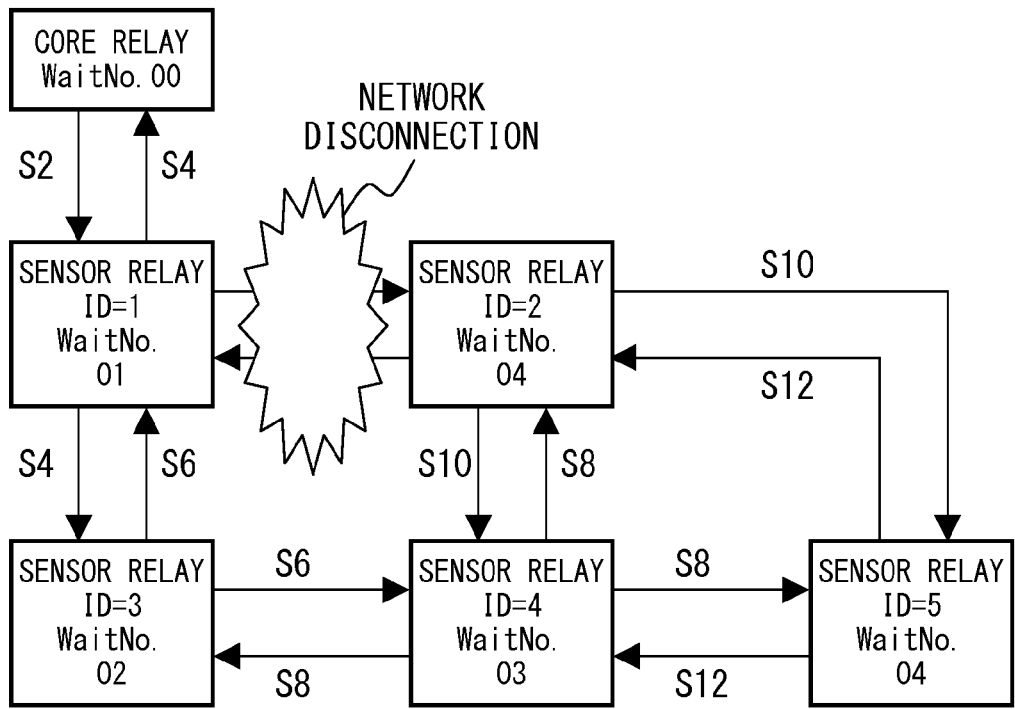
F I G. 4 4

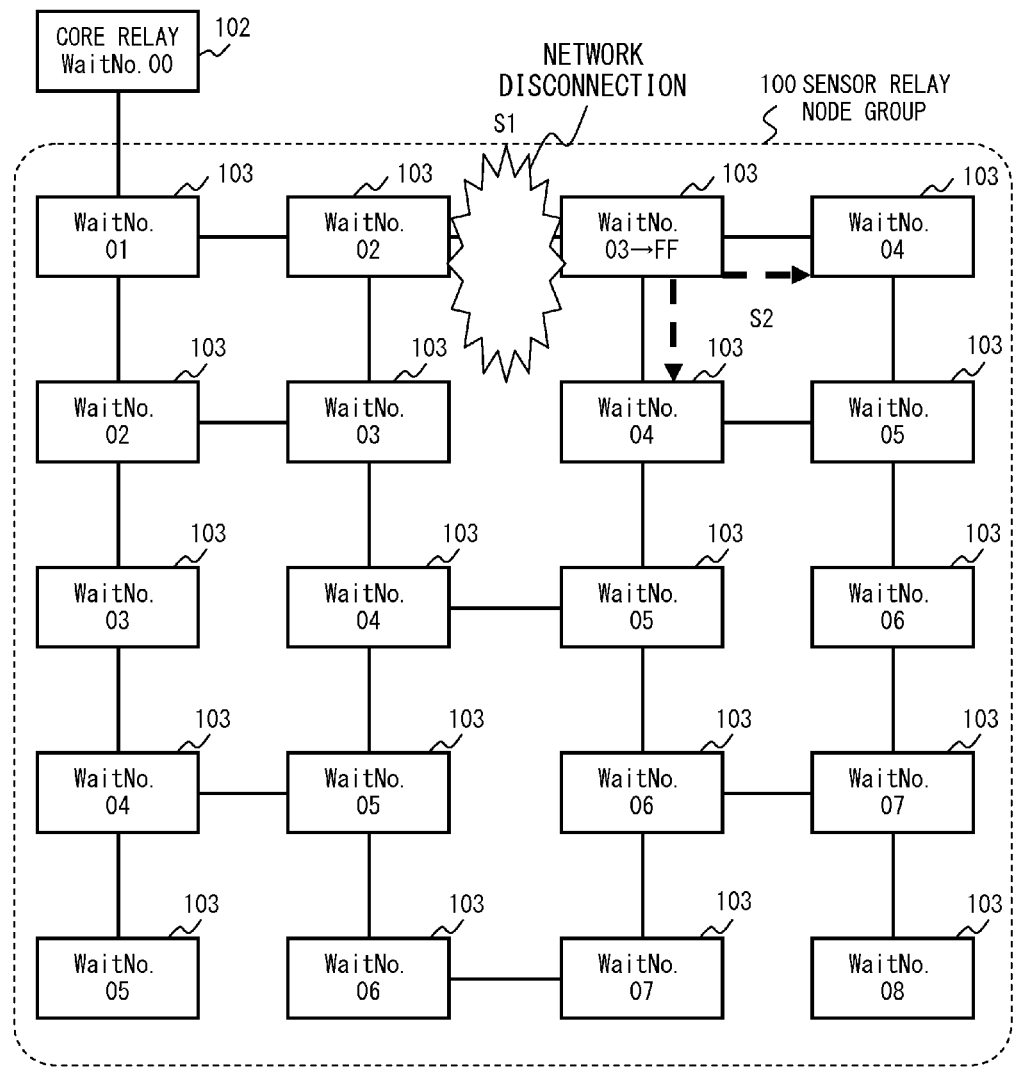
F I G. 45

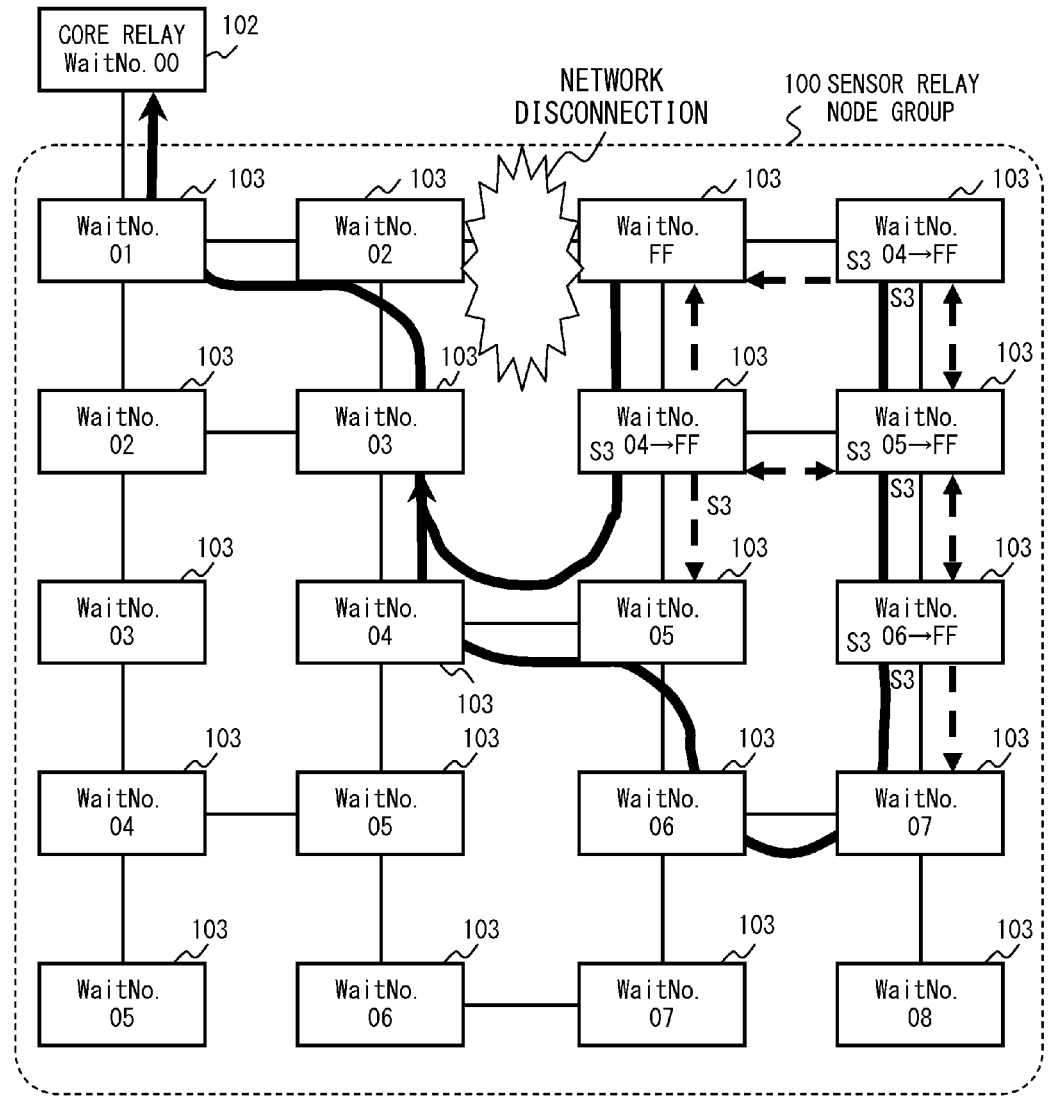
F I G. 4 6

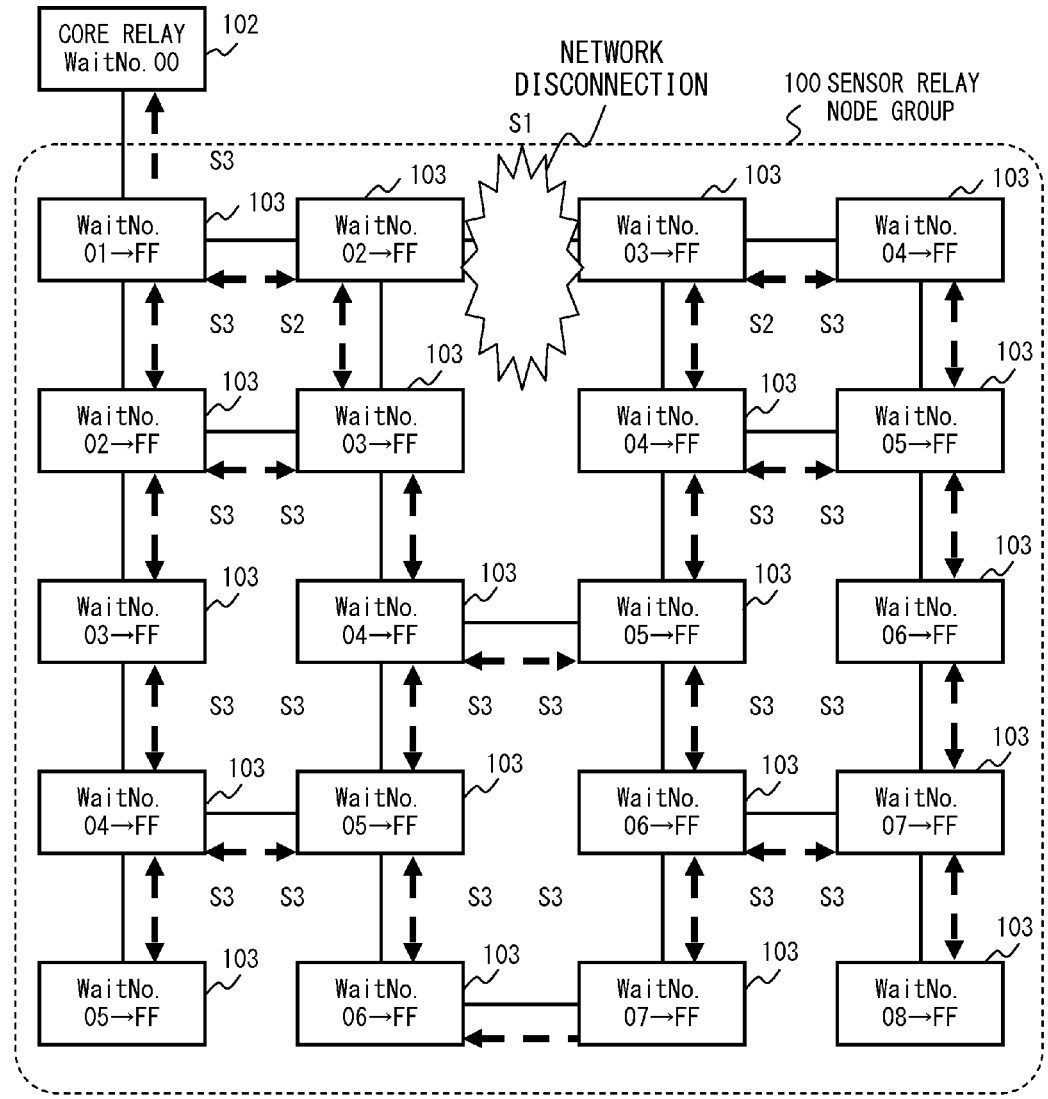
F I G. 4 7

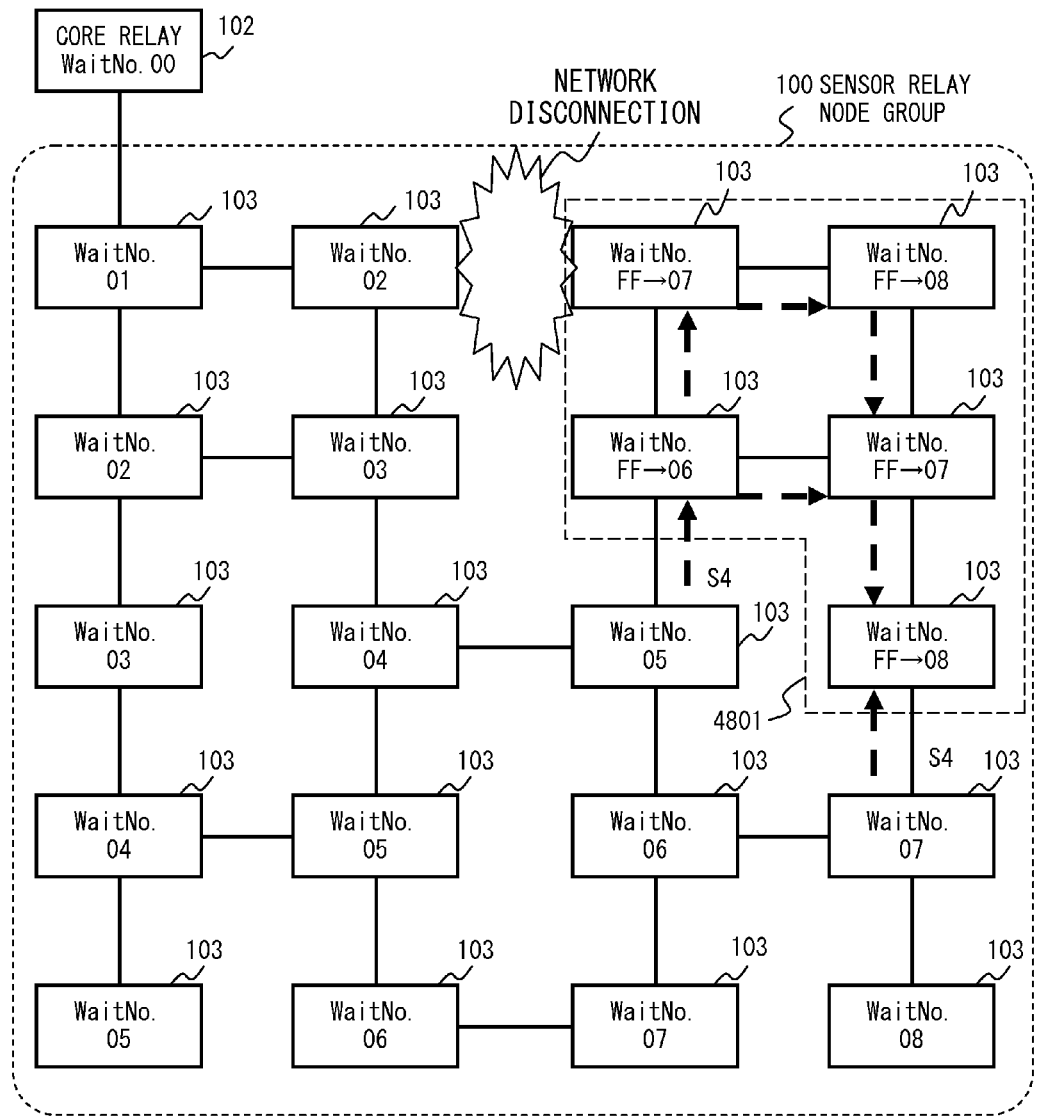
F I G. 4 8

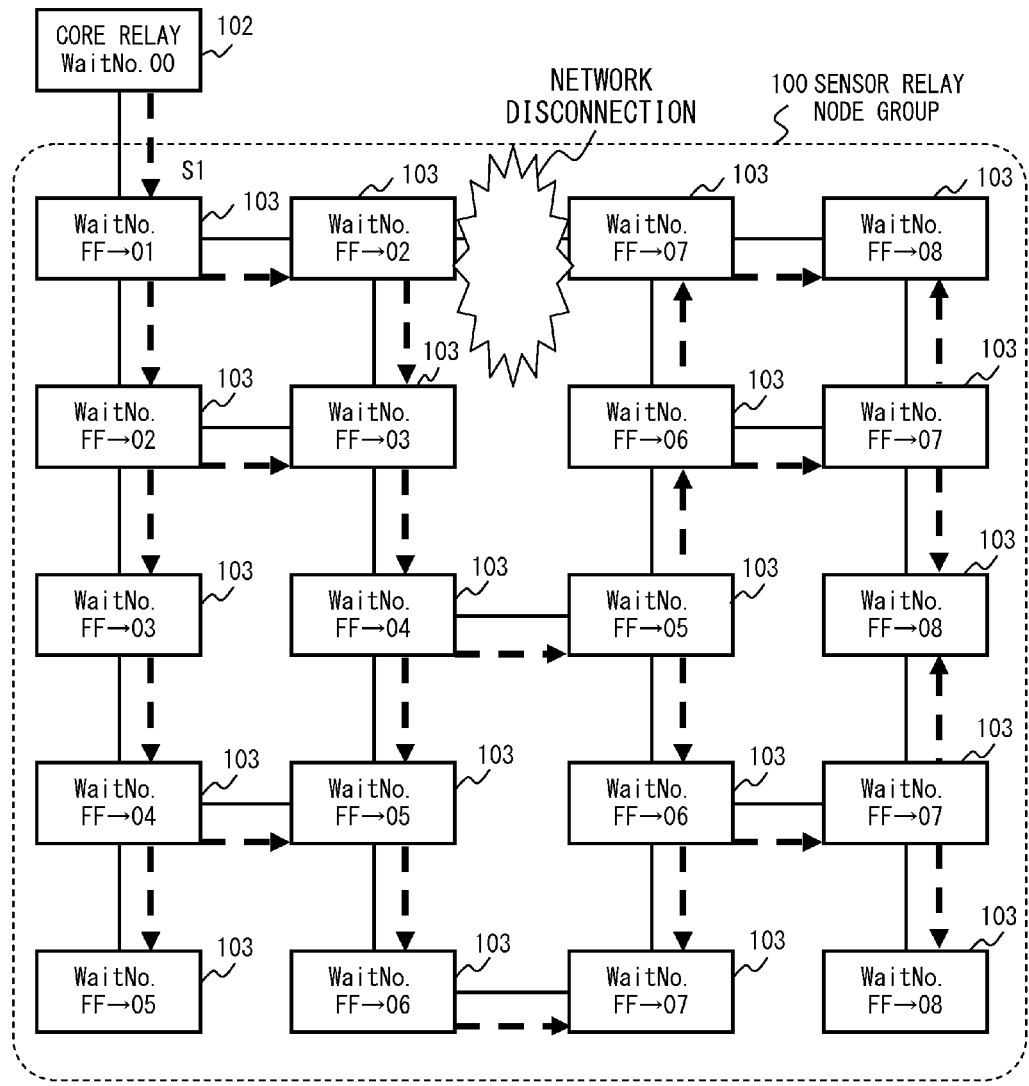
F I G. 4 9

ROUTING METHOD AND NODE EQUIPMENT

CROSS-REFERENCE TO RELATED APPLICATION

This application is a continuation application of International Application PCT/JP2010/066441 filed on Sep. 22, 2010 and designated the U.S., the entire contents of which are incorporated herein by reference.

FIELD

The embodiments discussed herein are related to a routing method and node equipment.

BACKGROUND

Ad-hoc network has been known as an autonomous distributed network. In the ad-hoc network, a large-scale network is formed autonomously, and the communication is maintained when a trouble occurs. In addition, the ad-hoc network is applicable to various communication media, either wired or wireless communication.

The ad-hoc network has been applied to a sensor network for example. In a wired sensor network, each node equipment is connected to a plurality of node equipments by wired connection, and data communication and power supply are performed by wired connection. Some of the advantages of the wired type are that it is possible to embed the sensor into the ground, water, structural objects and the like, and that it is possible to detect disconnection and the like.

In order to establish an ad-hoc network, a technique to select the optimal path, a control technique in case of trouble, and the like may be required.

As routing control in the ad-hoc network, the following technique is known. The sensor included in a communication node of the ad-hoc network has a function as a sensor node and a function as a relay node. Each node executes the routing process based on the adjacent node information, destination address, source address and the frame sequence number. Upon receiving a frame, the node compares the received frame with the contents of a destination table that the node has, and transmits the frame by selecting a transmission port that is different from the reception port. When there are a plurality of available communication ports for transmission, selection is made according to a condition such as the ascending order or the descending order of the port number. Related techniques are described in, for example, Japanese Laid-open Patent Publication No. 2002-368789.

However, when the routing in the ad-hoc network is performed in the known scheme, the path may not necessarily be determined with a smallest hop count, and the determined path may be redundant.

SUMMARY

According to an aspect of the embodiments, a routing method performed by node equipment in a network including a plurality of node equipments includes: receiving a first frame including a wait number, incrementing the wait number, and storing the incremented wait number as a local wait number; transmitting the first frame including the local wait number; receiving a second frame including a wait number of a destination node equipment, and comparing the wait number in the second frame and the local wait number; transmitting the second frame to an adjacent node equipment having a larger wait number than the local wait number, when the wait number in the second frame is larger than the local wait number; returning the second frame to a source node equipment of the second frame, when the wait number in the second frame is larger than the local wait number but there is no adjacent node equipment having a larger wait number than the local wait number; transmitting the second frame to an adjacent node equipment having a smaller wait number than the local wait number, when the wait number in the second frame is smaller than the local wait number; returning the second frame to the source node equipment of the second frame, when the wait number in the second frame is smaller than the local wait number but there is no adjacent node equipment having a smaller wait number than the local wait number.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example system configuration of an ad-hoc network.

FIG. 2 illustrates the relationship between a path and hop count.

FIG. 4 illustrates a data configuration of a PS table (destination table).

FIG. 5 illustrates a data configuration of an FID table in the routing method that is usually assumed.

FIGS. 6-8 illustrate examples of deciding the path by the routing method that is usually assumed.

FIG. 9A and FIG. 9B illustrate a state transition of each table of each sensor relay node in the routing method that is usually assumed.

FIG. 11 illustrates a data configuration of a WaitNo. table.

FIG. 14 is a flowchart illustrating a WaitNo. update process by a synchronization request.

FIGS. 15-23 are illustration diagrams of the WaitNo. update process by the synchronization request.

FIG. 24 illustrates a data configuration of an FID table in the routing method of the embodiment.

FIG. 30A and FIG. 30B illustrate a state transition table of each table of each sensor relay node in the routing method of the embodiment.

FIGS. 34-37 are illustration diagrams of the WaitNo. update process by health information.

FIG. 38 is a flowchart illustrating the operation of a sensor relay node at the time when line disconnection is detected.

FIG. 39 is a flowchart illustrating WaitNo. initialization process by health information at the time of occurrence of a line disconnection.

FIG. 41 and FIG. 42 are illustration diagrams of Wait No. initialization process at the time of line disconnection (example 1 by using health information).

FIG. 43 and FIG. 44 are illustration diagrams of Wait No. reconfiguration process at the time of line disconnection (example 1 by using health information).

FIG. 45 and FIG. 46 are illustration diagrams of Wait No. initialization process at the time of line disconnection (example 2 using health information).

FIG. 47 is an illustration diagram of Wait No. initialization process at the time of line disconnection (example 2 using deletion notification).

FIG. 48 is an illustration diagram of Wait No. reconfiguration process at the time of line disconnection (example 2 using health information).

FIG. 49 is an illustration diagram of Wait No. reconfiguration process at the time of line disconnection (example 2 using a synchronization request).

DESCRIPTION OF EMBODIMENTS

Figure 3:
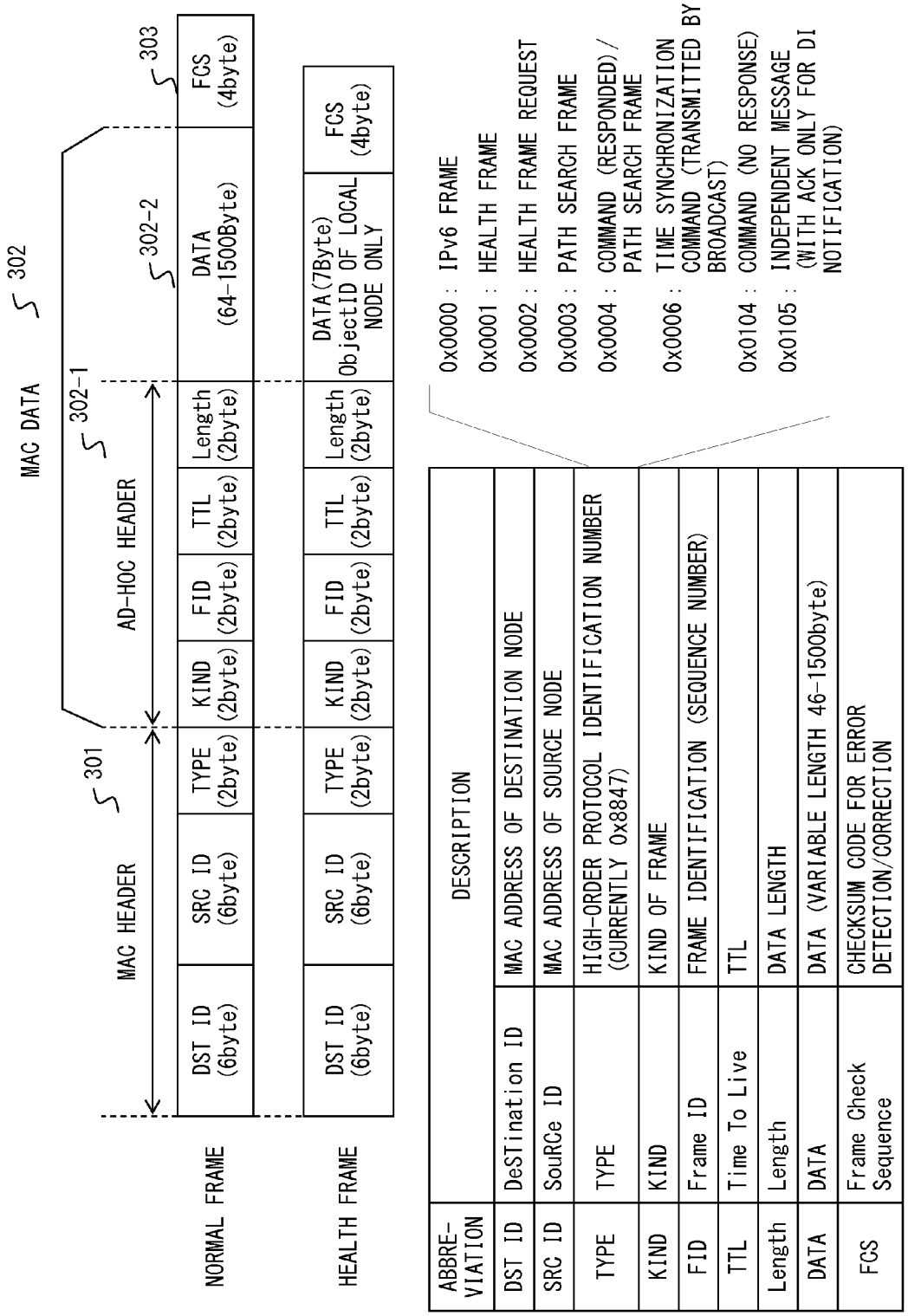
FIG. 3 illustrates a data configuration of a frame in the routing method that is usually assumed.

Embodiments to implement the present invention are described in details with reference to the drawings. In the description below, the configuration of the ad-hoc network and the routing method are explained, and then specific details of the embodiment are explained.

FIG. 1 illustrates an example system configuration of an ad-hoc network. In a sensor relay node group 100 realizes an ad-hoc network in which sensor relay nodes 103 being the node equipment directly or via another node are connected to each other by wired connection lines.

When the ad-hoc network is applied to an environment monitoring system for energy-saving control by controlling air-conditioning of a server data center, the sensor relay node 103 is, for example, a temperature sensor, a wind speed sensor and the like placed in respective locations in the data center. When the ad-hoc network is applied to a facility management/control system for energy-saving and security management of a building for example, the sensor relay node 103 is an illuminance sensor, a temperature sensor, a human sensor and the like to detect the condition of a room. When the ad-hoc network is applied to an inspection work system for optimization management of power generation and power distribution in an electricity producer for example, the sensor relay node 103 is, for example, a meter for reading. When the ad-hoc network is applied to a structural object monitoring system for checking the health of a bridge against degradation for example, the sensor relay node 103 is, for example, an acceleration sensor, a distortion sensor, a monitoring camera and the like.

FIG. 1 illustrates a configuration in which 20 sensor relay nodes 103 from No. 1 to No. 20 are connected to each other. The sensor relay nodes 103 communicate autonomously with each other according to the communication scheme of a wired ad-hoc routing protocol.

When a sensor relay node 103 is directly connected to another sensor relay node 103 by a cable, the two sensor relay nodes 103 are "adjacent". The other sensor relay node 103 adjacent to a sensor relay node 103 may be referred to as an "adjacent node". For a sensor relay node 103, the sensor relay node 103 itself may be referred to as a "local node".

A core relay node 102 functions as a gateway apparatus to relay sensor information collected by the sensor relay nodes 103 to a monitoring/control server 101 connected via a LAN (local area network) for example. In addition, the core relay node 102 can relay various control information from the monitoring/control server 101 to each sensor relay node 103 and may obtain the control information. In other words, the core relay node 102 has a function to perform conversion between the LAN communication protocol and the wired ad-hoc routing protocol.

The monitoring/control server 101 monitors the sensor information collected by the sensor relay nodes 103, displays the sensor information, and outputs an alarm when abnormal of the sensor information is detected. In addition, the monitoring/control server 101 controls the each of the sensor relay nodes 103

In the ad-hoc network, sensor information collected by each of the sensor relay nodes 103 is transmitted to the monitoring/control server 101, and monitored and controlled at the monitoring/control server 101. Accordingly, it is possible to perform efficient collection and monitoring of the sensor information.

Here, in the ad-hoc network that forms the sensor relay node group 100, it is favorable to prepare for occurrence of a trouble in the sensor relay node 103 and the communication line and to perform optimal communication. For this purpose, in order for the core relay node 102 to communicate with a target sensor relay node 103 according to an instruction of the monitoring/control server 101, path control in which each sensor relay node 103 autonomously selects the optimal path for communication and autonomously changes and restores the path at the time of occurrence of a trouble is important.

Generally, the optimal path between the core relay node 102 and a target sensor relay node 103 is decided by minimizing the number of sensor relay nodes 103 relayed while forwarding a frame from the target sensor relay node 103 to the core relay node 102 (or vice versa). The number of sensor relay nodes 103 relayed when a frame is forwarded to a target relay node may be called "hop count". When the hop count is small, the time spent for forwarding is also less, and the traffic in the communication line is also less.

FIG. 2 illustrates the relation between the path from the core relay node 102 to the sensor relay node 103-No. 20 and the hop count, when the sensor relay node 103-No. 20 is specified as a target node. For example, when the path indicated by the broken line is decided, a frame transmitted from the core relay node 102 is forwarded to the sensor relay nodes 103-No. 20 through the sensor relay nodes 103 of No. 1, No. 5, No. 9, No. 13, No. 14, No. 18, No. 19, No. 15, No. 11, No. 10, No. 6, No. 2, No. 3, No. 4, No. 8, No. 12, and No. 16, and the hop count is 18. Therefore, the path indicated by the broken line is a redundant path with too much hop count. Meanwhile, when the shortest path indicated by the solid line is determined, the frame transmitted from the core relay node 102 is forwarded to the sensor relay nodes 103-No. 20 through the sensor relay nodes 103 of No. 1, No. 5, No. 6, No. 10, No. 11, No. 15, and No. 16, and the hop count is 8. Therefore, the path indicated by the solid line is a optimal path with the smallest hop count.

As described above, to decide the optimal path, it is important how to select a path with a smaller hop count. Note that the numbers in brackets [1] [2] [3] and (1) (2) (3) and so on represent the port numbers of the sensor relay node 103.

One routing method for deciding a path in the ad-hoc network is as follows. Each sensor relay node 103 does not have location information of all nodes in the network. Each sensor relay node 103 manages four types of statuses used/unused/loop/unconnected of each port based on information of the adjacent sensor relay node 103, the destination address and source address, and the frame identification (FID: Frame Identification) being the frame sequence number. Accordingly, the sensor relay node 103 executes the routing process.

In the routing method that is usually assumed, for example, the frame illustrated in FIG. 3, the PS (Port Status) table (destination table) illustrated in FIG. 4, the FID (Frame ID) table (loop monitoring table) illustrated in FIG. 5, and the like are used.

The wired communication line that connects between the sensor relay nodes 103 with each other, or between the sensor relay node 103 and the core relay node 102 in FIG. 1 is configured as a physical line by the Ethernet protocol for example. Here, Ethernet is a registered trademark. In this case, the configuration illustrated in FIG. 3 is adopted as the data configuration of the frame.

As illustrated in FIG. 3, for both the normal frame and the health frame, the Ethernet frame includes a MAC header 301, MAC data 302, and an FCS (Frame Check Sequence) 303. Furthermore, the MAC data 302 includes an ad-hoc header 302-1 and data 302-2. The ad-hoc header 302-1 and the data 302-2 form an ad-hoc frame. That is, the ad-hoc frame is set in the MAC data 302 portion. According to this data configuration, with the conventional physical line of the Ethernet protocol, it is possible to transmit an ad-hoc frame for the ad-hoc communication using the Ethernet line.

The MAC header 301, ad-hoc header 302-1, and the FCS 303 are in the same data configuration in the normal frame and the health frame. The normal frame is a frame for conveying normal communication data and control data. The health frame is a frame that each sensor relay node 103 or the core relay node 102 in FIG. 1 broadcasts to the sensor relay node 103 and/or the core relay node 102 in its surroundings to notify that the sensor relay node 103 or the core relay node 102 itself is operating normally. The DATA portion of the health frame has an object ID (7 Byte) only, where DST ID=ALL"0" and SRC ID is the local node object ID.

The MAC header 301 has a DST ID (DeSTination ID) field, an SRC ID (Source ID) field, and a TYPE field. In the DST ID field, a 6-byte MAC (Media Access Control) address corresponding to the destination node number of the destination sensor relay node 103 is set. In the SRC ID field, a 6-byte MAC address corresponding to the source node address of the source sensor relay node 103 is set. In the TYPE field, a 2-byte high-order protocol identification number is set, and in the present situation, value 0x8847 is set. Meanwhile, "0x" indicates that the subsequent value is given in hexadecimal.

The ad-hoc header 302-1 has a KIND field, an FID field, a TTL field, and a Length field. In the KIND field, 2-byte data representing the kind of the ad-hoc frame is set. As the value in the KIND field, 0x0000 represents the IPv6 frame. Meanwhile, this value is not used in the present embodiment. The value 0x0001 represents the health frame. The value 0x0002 represents a health frame request frame for requesting a health frame. The value 0x0003 represents a path search frame for searching a path. The value 0x0004 represents a response command with respect to a path search frame. The value 0x0006 represents the time synchronization command. This command is broadcasted. The value 0104 represents a no-response command. The value 0x0105 represents an independent message. This message receives response (ACK) only for the DI notification. In the FID (Frame ID) field, a 2-byte frame identification being the sequence number is set for example. In the TTL (Time To Live) field, 2-byte data representing the upper limit of the time for which the ad-hoc frame is able to exist in the ad-hoc network is set. The TTL value is set in the source node of the ad-hoc frame, and is reduced by each of the sensor relay nodes 103 (FIG. 1) on the path to the target node. When the TTL value becomes zero before the ad-hoc frame reaches the target node, the ad-hoc frame is discarded. The field is for avoiding the situation in which an undeliverable ad-hoc frame keeps circulating in the ad-hoc network, and ultimately the system congestion due to such an imperishable frame. In the Length field, a 2-byte value representing the data length of the subsequent data 302-2 is set.

The data 302-2 has a variable data length from 7 bytes to 1500 bytes. When the ad-hoc frame is a health frame, only the Object ID representing a MAC address of the local node being a source node is set in the data 302-2. Meanwhile, the MAC address of the local node is set in the SRC ID field, and the all "0" value indicating broadcast is set in the DST ID field.

The FCS 303 is a redundant code for data error detection and correction for the MAC header 301 and the MAC data 302.

FIG. 4 illustrates a data configuration of the PS table (destination table) managed by the relay node 103 or the core relay node 102 in FIG. 1 in the routing method that is usually assumed. In the table, for each DST ID (destination ID) (FIG. 3) of the frame relayed by the local node, the status of each port of the local node is stored. Each entry of the PS table has DST ID field, P1, P2, P3 fields and a timer field.

In the DST ID field, 6-byte DST ID (destination ID) being the MAC address set in the DST ID field (FIG. 3) in the MAC header 301 of the frame relayed by the local node is set.

In the respective fields P1, P2, P3, 2-bit data representing corresponding status of the three wired ad-hoc network ports #1, #2, #3 of the local node. The 2-bit data value "00" represents the unused status (status "E": Empty), "01" represents the used status (status "U": Used), "10" represents the loop status (status "L": Loop), and "11" represents the link-disconnected status (status "R": Reserve).

In the timer field, 8-bit data representing the remaining time or the elapsed time to save the entry identified by the DST ID.

When relaying a received frame, the sensor relay node 103 searches the PS table with the DST ID of the received frame, and selects a port to transmit the received frame.

FIG. 5 illustrates data configuration of the FID table managed by the sensor relay node 103 or the core relay node 102 in FIG. 1, in the routing method that is usually assumed. This table functions as a loop monitoring table.

In this table, the loop status of each port of the local node is set, for each SRC ID (source ID) (FIG. 3)) of the frame relayed by the local node. That is, each entry of the FID table has an SRC ID field, FID field, RxPort field, P1, P2, P3 fields and a timer field.

In the SRC ID field, 6-byte SRC ID (source ID) being the MAC address stored in the SRC ID field (FIG. 3) in the MAC header 301 of the frame relayed by the local node is set.

In the FID field, 2-byte frame ID is set. The FID, which uniquely identifies a frame, is assigned by the core relay node 102 or the sensor relay node 103 when the core relay node 102 or the sensor relay node 103 transmits the frame. The FID may be a sequence number for example.

In the RxPort field, 2-bit data representing the reception port that first received the frame corresponding to the entry including the RxPort field data is set.

In the respective fields P1, P2, P3, 2-bit data representing corresponding port status of the three wired ad-hoc network ports of the local node is set. The 2-bit data value "00" represents the no-transmission port status (status "E": Empty), "01" represents the transmitting port status (status "U": Used), "10" represents the loop port status (status "L": Loop), and "11" represents the reserve status (status "R" Reserve).

The "U" status being set in Pi (i is one of 1, 2, 3) emerges when the following two conditions are satisfied.
(1) The local node has relayed a frame to which a pair of SRC ID and FID are assigned before.
(2) At the time of relaying, the i-th port corresponding to Pi was used as the destination in the local node.

The "E" status set in Pi (i is one of 1, 2, 3) has the following meaning. When the destination port at the time when the local node relayed a frame to which a pair of SRC ID and FID are assigned before is not the i-th port, the status of Pi is "E".

The "L" status set in Pi (i is one of 1, 2, 3) is a loop status that emerges when the following two conditions are satisfied.
(1) The local node has relayed a frame to which a pair of SRC ID and FID are assigned before, with the i-th port being the destination port.
(2) After the relay, the frame is received at the local node again. In the PS table in FIG. 4, the "U" status and the "E" status are the same in indicating "ready for transmission", that is, "can be selected as the destination port". However, in the FID table, the "U" status and the "E" status are distinguished as follows. The "U" status in the FID table indicates the status that is shifted to the "L" status meaning "not ready for transmission" when a loop is detected later. Meanwhile, the "E" status in the FID table indicates the status that can be selected as destination port even when a loop is detected later, at the time of the detection of the loop.

In the timer field, 8-bit data representing the remaining time or the elapsed time to save the entry identified by the SRC ID.

Based on the frame configuration in FIG. 3, the PS table in FIG. 4 and the FID table in FIG. 5, the routing method that is usually assumed is explained below.

Upon receiving a frame, the sensor relay node 103 compares the received frame and the registered contents of the PS table, and relays the received frame by transmitting to a port that is different from the reception port. At this time, when there are a plurality of available ports, that is, ports in the "unused status" corresponding to the DST ID field value set in the MAC header 301 of the frame, the transmission port is decided sequentially from the port having the smaller number or the port having the larger number.

Figure 8:
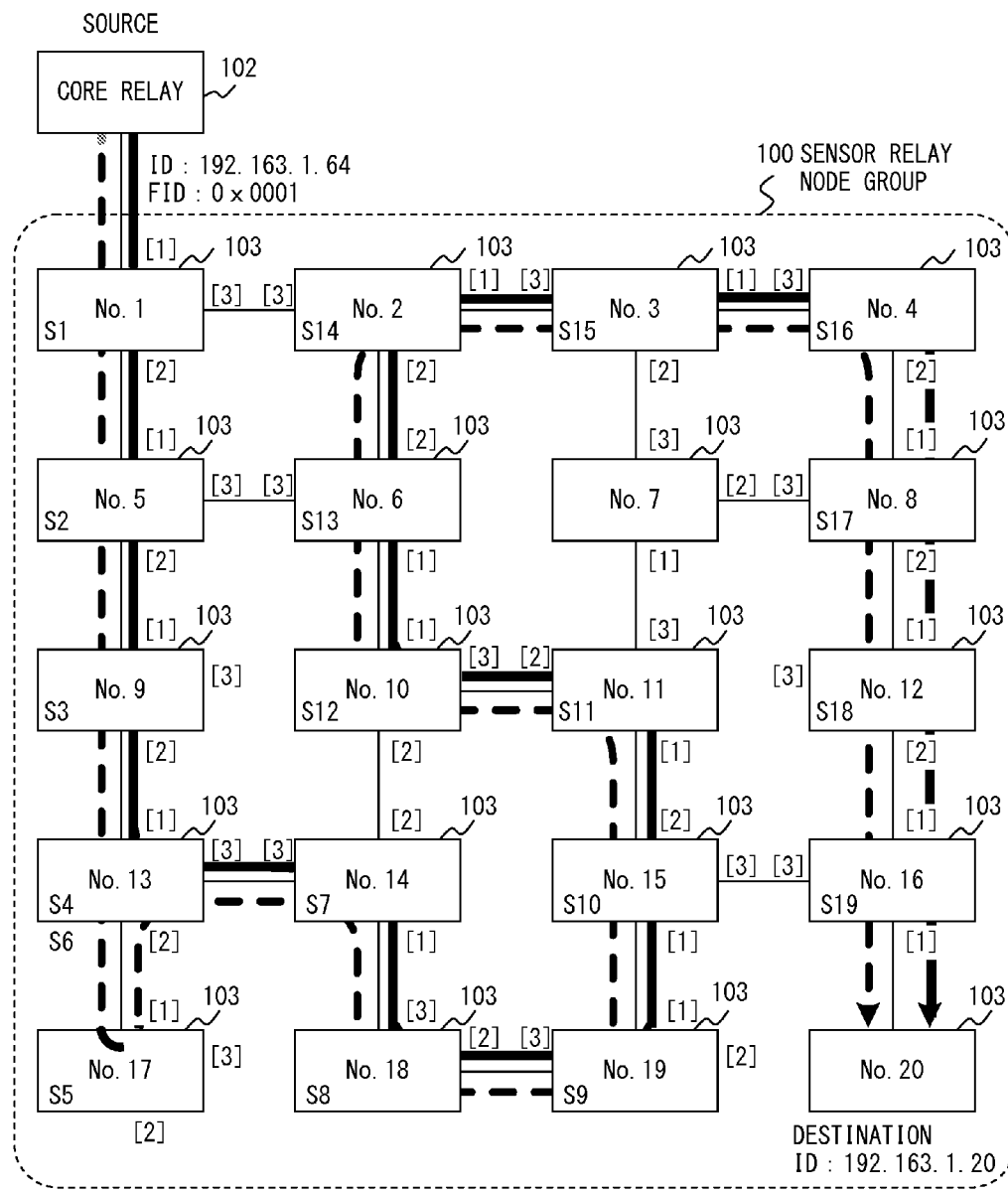

The specific operations of deciding the path by the routing method that is usually assumed is explained, based on the illustration diagrams of the path decision examples in FIG. 6 to FIG. 8 and the table representing the status transition of each port of each sensor relay node 103 illustrated in FIG. 9A and FIG. 9B.

In FIG. 6, the frame transmitted from the core relay node 102 has DST ID (destination address):192.163.1.20, SRC ID (source address):192.163.1.64, FID:0x001. The broken line represents the path from the core relay node 102 to the sensor relay node 103-No. 20.

The frame transmitted from the core relay node 102 is forwarded to the sensor relay node 103-No. 1 connected to the core relay node 102. The sensor relay node 103-No. 1 is connected to the core relay node 102 via the port 1. Accordingly, the frame transmitted from the core relay node 102 is received at the port 1 in the sensor relay node 103-No. 1. The sensor relay node 103-No. 1 outputs via the port 2 being the smaller number of the ports in the "unused status" port other than the reception port 1 (S1 in FIG. 6).

The frame is received at the port 1 of the sensor relay node 103-No. 5 connected to the port 2 of the sensor relay node 103-No. 1. The sensor relay node 103-No. 5 outputs via the port 2 being the smaller number of the ports in the "unused status" port other than the reception port 1 (S2 in FIG. 6).

The frame is received at the port 1 of the sensor relay node 103-No. 9 connected to the port 2 of the sensor relay node 103-No. 5. The sensor relay node 103-No. 9 outputs via the port 2 being the smaller number of the ports in the "unused status" port other than the reception port 1 (S3 in FIG. 6).

The frame is received at the port 1 of the sensor relay node 103-No. 13 connected to the port 2 of the sensor relay node 103-No. 9. The sensor relay node 103-No. 13 outputs via the port 2 being the smaller number of the ports in the "unused status" port other than the reception port 1 (S4 in FIG. 6).

In the status transition from S1 to S4, each of the sensor relay nodes 103-No. 1, 5, 9, 13 executes the following operation upon receiving a frame. That is, each sensor relay node 103 generates an entry in which the DST ID (FIG. 3) set in the received frame is set. In the entry, the status of the field corresponding to the output port among P1, P2, P3 is set to the "used status", and a specified timeout value is set to the timer field (FIG. 4). In addition, each sensor relay node 103 generates an entry in which the SRC ID and FID (FIG. 3) stored in the received frame are set. The number of the reception port is set in the RxPort. In the entry, the status of the field corresponding to the output port among P1, P2, P3 is set to the "transmitting port" status, and a specified timeout value is set to the timer field (FIG. 5). The sensor relay node 103 monitors the presence/absence of a return frame using the FID table. That is, each sensor relay node 103 regards the port to which a frame returned within the timeout period set in the timer field and the port that executed an operation to transmit back to the reception port itself as the "loop port" status and performs control to disable the port thereafter. In the status transition from S1 to S4, no port in the "loop port" status exists in the sensor relay nodes 103-No. 1, 5, 9, 13.

In FIG. 7, the frame transmitted from the port 2 of the sensor relay node 103-No. 13 is received at the port 1 of the sensor relay node 103-No. 17 connected to the port 2 of the sensor relay node 103-No. 13. The sensor relay node 103-No. 17 recognizes that the ports 2 and 3 other than the reception port 1 are in the link-disconnected status. In this case, the sensor relay node 103-No. 17 creates, in the PS table, an entry in which the same DST ID as the received frame is set, and sets "loop status" in the P1 field corresponding to the port 1 being the reception port in the entries. In addition, the sensor relay node 103-No. 17 creates, in the FID table, an entry in which the same SRC ID and FID as the received frame is set, and sets "loop port" status in P1 field corresponding to the port 1 being the reception port in the entry. Then, the sensor relay node 103-No. 17 transmits the frame received at the port 1 back to the port 1 as it is (S5 in FIG. 7).

The frame is received at the port 2 of the sensor relay node 103-No. 13 connected to the port 1 of the sensor relay node 103-No. 17. The sensor relay node 103-No. 13 recognizes that the frame is received at the port 2 in the "transmitting port" status among P1, P2, P3 in the entries in the FID table in which the same SRC ID and FID as the received frame are set. Accordingly, the sensor relay node 103-No. 13 sets "loop port" status in the P2 field corresponding to the port 2 in the entry of the FID table. In addition, the sensor relay node 103-No. 13 sets "loop status" in P2 field corresponding to the port 2 in the entry in the PS table in which the same DST ID as the received frame is set. Then, the sensor relay node 103-No. 13 selects a port other than the reception port 1 set in the RxPort field of the entry of the FID table and the port 2 corresponding to P2 field in the "loop port" status. At this time, the sensor relay node 103-No. 13 selects the port 3 corresponding to P3 in the "unused status" in the entry on the PS table. Then, the sensor relay node 103-No. 13 outputs the received frame via the port 3 (S6 in FIG. 7).

As a result, the frame is received at the port 3 of the sensor relay node 103-No. 14 connected to the port 3 of the sensor relay node 103-No. 13.

After this, as illustrated in FIG. 8, each of the sensor relay nodes 103-No. 14, 18, 19, 15, 11, 10, 6, 2, 3, 4, 8, 12, 16 performs similar operation to that performed in the sensor relay nodes 103-No. 1, 5, 9 in FIG. 6. That is, each sensor relay node 103 outputs the received frame via the port of the smaller number among the ports in the "unused status" other than a reception port (S7 to S19 in FIG. 8).

By the operation described above, as indicated as the decided path in the solid line in FIG. 8, the path from the core relay node 102 to the sensor relay node 103-NO. 20 is determined.

FIG. 9A and FIG. 9B illustrate a status transition of the PS table and the FID table in each sensor relay node 103 in the control operation from FIG. 6 to FIG. 8. In the explanation below, it is assumed that the description "entry S1" represents the line in which the value of leftmost "No." field in table in FIG. 9A and FIG. 9B is "S1". The same rule applies to the entries S2-S19. In addition, the P1, P2, P3 fields in the PS table illustrated in FIG. 4 and in the FID table illustrated in FIG. 5 are described as "Port1" "Port2" "Port3" in FIG. 9A and FIG. 9B. Furthermore, the "unused status" "used status" "loop status" "link-disconnected status" set in the PS table illustrated in FIG. 4 are described as "unused" "used" "loop" "link-disconnected", respectively, in FIG. 9A. In addition, the statuses "no-transmission port" "transmitting port" "loop port" "reserve" set in the FID table illustrated in FIG. 5 are described as "no-transmission" "transmitting" "loop" "Reserve", respectively, in FIG. 9B.

According to the status transitions S1, S2, S3 in FIG. 6, the respective entries S1, S2, S3 described below are registered in each PS table of each of the sensor relay nodes 103-No. 1, 5, 9 (FIG. 4). That is, a destination address (that is, an address of the sensor relay nodes 103-No. 20) extracted from a DST ID field of a received frame is written in the entries S1, S2, S3 in the PS table in the sensor relay nodes 103-No. 1, 5, 9. In addition, in the respective entries S1, S2, S3 of the PS table, "used" is registered in the P2 (Port 2) field corresponding to the port 2 being the output port in each sensor relay node 103. Furthermore, in each of the sensor relay nodes 103-No. 1, 5, in P1 (Port1) and P3 (Port3) fields of each entry S1, S2 of the FID table, "unused" is registered. In addition, in the sensor relay node 103-No. 9, "unused" is registered in the P1 (Port1) field of the entry S3 of the PS table, and "link-disconnected" is registered in the P3 (Port3) field since no other node is connected to the P3.

Meanwhile, according to the status transitions S1-S3 in FIG. 6, in each FID table of each of the sensor relay nodes 103-No. 1, 5, 9 (FIG. 5), the respective entries S1, S2, S3 described below are registered. That is, a source address (that is an address of the core relay node 102) extracted from the SRC ID field (FIG. 3) of the received frame is registered in the SRC ID field in the respective entries S1, S2, S3 of the FID table. In addition, in the respective entries S1, S2, S3 of the FID table, FID:0x0001 extracted from the FID field of the received frame (FIG. 3) is registered in the FID field. In the respective entries S1, S2, S3 of the FID table, port number Port1 corresponding to the port 1 being the reception port in each sensor relay node 103 is registered in the RxPort field. In the respective entries S1, S2, S3 of the FID table, "transmitting" is registered in the P2 (Port2) field corresponding to the port 2 being the output port in each sensor relay node 103. In each of the sensor relay nodes 103-No. 1, 5, in the P1 (Port1) and P3 (Port3) fields of the respective entries S1, S2 of the FID table, "no-transmission" is registered. In addition, in the sensor relay node 103-No. 9, "no-transmission" is registered in the P1 (Port1) field of the entry S3 of the FID table, and in the P3 (Port3) field, "Reserve" is registered since no other node is connected.

Meanwhile, according to the status transition of S4 in FIG. 6, in the entry S4 of the PS table and the FID table of the sensor relay node 103-No. 13, the same status as for the entries S1 and S2 of the sensor relay nodes 103-No. 1 and No. 5 are tentatively registered.

Next, according to the status transition of S5 in FIG. 7, in the PS table of the sensor relay node 103-No. 17 (FIG. 4), the entry S5 described below is registered. That is, the destination address (that is the address of the sensor relay node 103-No. 20) extracted from the DST ID field of the received frame (FIG. 3) is registered in the DST ID field of the entry S5 of the PS table. In addition, since the ports 2 and 3 are not connected to other node, "link-disconnected" is registered in the P2 (Port2) and P3 (Port3) fields in the entry S5 of the PS table. In addition, in the entry S5 of the PS table, "loop" is set in the P1 field corresponding to the port 1 being the reception port.

According to the status transition of S5 in FIG. 6, in the FID table of the sensor relay node 103-No. 17, the entry S5 described below is registered. That is, in the entry S5 of the FID table, the source address (that is the address of the core relay node 102) extracted from the SRC ID field of the received frame (FIG. 3) is registered in the SRC ID field. In addition, FID:0x0001 extracted from the FID field of the received frame (FIG. 3) is registered in the FID field. The port number Port1 corresponding to the port 1 being the reception port of the sensor relay node 103-No. 17 is registered in the RxPort field. Since no other node is connected to the ports 2 and 3, "Reserve" is registered in the P2 (Port2) and P3 (Port3) fields of the FID table. "loop port" is set in the P1 field corresponding to the port 1 being the reception port.

After that, according to the status transition of S6 in FIG. 7, the frame is returned to the sensor relay node 103-No. 13. As a result, the status of the PS table and the FID table of the sensor relay node 103-No. 13 changes from the status of the entry S4 to the status of the entry S6 in FIG. 9A and FIG. 9B. That is, in the entry S6 (=entry S4) of the PS table in which the same DST ID as the received frame is stored, since a loop was detected in the port 2, the status of the P2 (Port2) field is updated from "transmitting" to "loop port". In addition, since the port 3 becomes the new output port, the status of the P3 (Port3) field is updated from "no-transmission" to "transmitting".

After that, according to the status transition of S7 to S19 in FIG. 8, the status of the PS table and the FID table of each of the sensor relay nodes 103-No. 14, 18, 19, 15, 11, 10, 6, 2, 3, 4, 8, 12, 16 are updated in a similar manner to the case of the status transition S1 to S3 in FIG. 6.

According to the routing method that is usually assumed in the ad-hoc network described above, each sensor relay node 103 selects the port of the smaller number (or the port of the larger number) in the unused status, while detecting link-disconnection and loop status. As a result, the path from the core relay node 102 to the target sensor relay node 103 is decided autonomously.

Once the path from the core relay node 102 to the target sensor relay node 103 is decided, the frame transmitted from the core relay node 102 addressed to the target sensor relay node 103 is forwarded through the decided path. In this case, in each frame, DST ID corresponding to the target sensor relay node 103 is set, and a value sequentially incremented from 0x0001 is set as FID being the sequence number for transmission (FIG. 3). Each of the sensor relay nodes 103 that receives the frame detects that an entry corresponding to the DST ID stored in the DST ID field of the received frame exists in the PS table (FIG. 4). As a result, the sensor relay node 103 outputs the received frame via the port corresponding to the field in which the "used status" is set, among the P1, P2, P3 fields in the entry mentioned above. Meanwhile, for each SRC ID and FID stored in the received frame, a new entry is created in the FID table (FIG. 5), and the loop monitoring control is performed. As described above, in the communication from the core relay node 102 to the target sensor relay node 103, the same decided path is used.

However, in the routing method that is usually assumed, as illustrated in FIG. 2, the hop count of the path that is represented by the broken line in FIG. 2 is 18, being a significantly redundant compared with the shortest path with the hop count 8 that is assumed as optimal. It is preferable that the sensor relay node 103-No. 5 selects the port 3 instead of the port 2 to transfer the frame to the sensor relay node 103-No. 6, but such control is not performed in the routing method that is usually assumed.

That is, in the routing method that is usually assumed in the ad-hoc network described above, the path becomes redundant depending on the connection relationship of the ports of each sensor relay node 103.

Therefore, in the embodiment described below, a wait number (hereinafter, described as "WaitNo.") is given for each sensor relay node 103 as information corresponding to the number of relay nodes or the hop count from the node equipment (in this embodiment, the core relay node 102 or a gateway) as benchmark, and the redundant path may be avoided by routing with the wait number.

Figure 10:
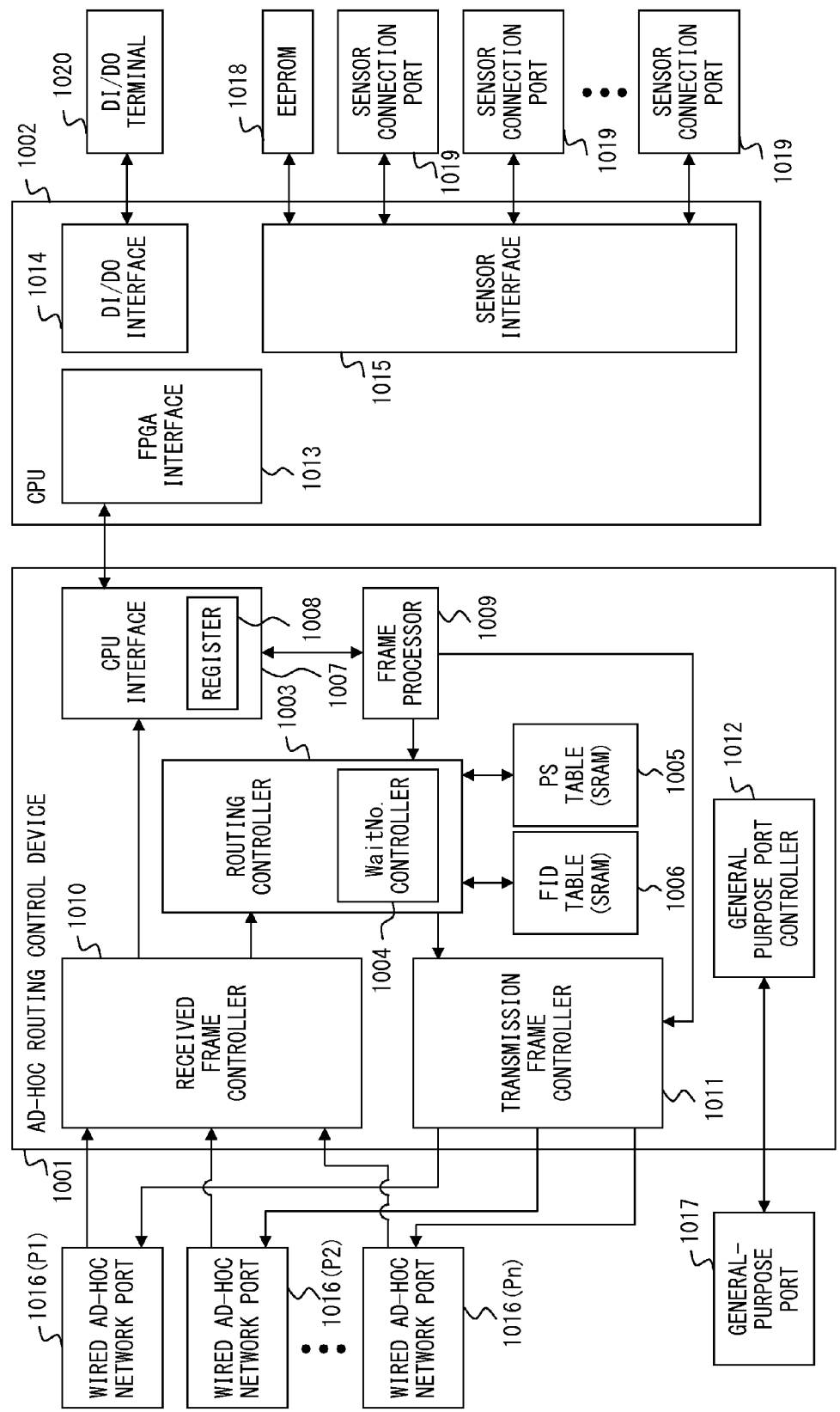
FIG. 10 is a functional block diagram of a sensor relay node in the embodiment.

FIG. 10 is a functional block diagram of the sensor relay node 103 according to the embodiment.

A plurality of wired ad-hoc network ports 1016 P1-Pn (for example, three ports P1, P2, P3) terminates data of an Ethernet frame in which the ad-hoc frame transmitted/received to/from another sensor relay node 103 or the core relay node 102 is capsulated, and encodes or decodes the frame. A wireless ad-hoc network port 1016 includes a buffer memory that temporarily stores a transmission frame. Hereinafter, it is assumed that "port" or "reception port" refers to the wired ad-hoc network port 1016 according to the present embodiment. A general-purpose port 1017 is a port that terminates LAN (local area network) for example.

An ad-hoc routing control device 1001 may be configured by an FPGA (Field Programmable Gate Array) for example. The ad-hoc routing control device 1001 includes a received frame controller 1010, transmission frame controller 1011, routing controller 1003 (including WaitNo. controller 1004), PS table 1005, FID table 1006, frame processor 1009, CPU interface 1007 (including register 1008), general-purpose port controller 1012, and the like. The routing controller 1003 has both a function as a wait number controller to control WaitNo. and a function as await number transmitter to forward a control frame including such WaitNo. to adjacent node equipment.

The received frame controller 1010 in the ad-hoc routing control device 1001 executes a process to receive frame data received via the wired ad-hoc network port 1016.

When the received frame data is data to be processed in the local node, sensor control information and the like taken out from the received frame at the received frame controller 1010 is stored in the register 1008 in the CPU interface 1007, and then forwarded from the CPU interface 1007 to the CPU (central processing unit) 1002. When the received frame data is not data to be processed in the local node, the frame data received at the received frame controller 1010 is passed to the routing controller 1003.

The routing controller 1003 selects a port on the transmission side for the frame data received at the received frame controller 1010 and passes the frame to the transmission frame controller 1011. At this time, the routing controller 1003 executes routing operation for the received frame, based on the port status on the PS table 1005, FID on the FID table 1006 and WaitNo. managed by the WaitNo. controller 1004, and selects the output port.

The WaitNo. controller 1004 decides and keeps the WaitNo. of the local sensor relay node 103 and the adjacent sensor relay node 103 connected to each port of the local sensor relay node 103.

The frame processor 1009 passes the frame processed by the routing controller 1003 to the transmission frame controller 1011. At this time, the frame processor 1009 rewrites WaitNo. in the frame as needed based on the routing process result at the routing controller 1003. In addition, the frame processor 1009 generates a transmission frame based on sensor information passed from the CPU interface 1007, and passes the frame to the transmission frame controller 1011.

The transmission frame controller 1011 outputs the frame passed from the frame processor 1009 to the wired ad-hoc network port 1016 specified by the routing controller 1003 and make the wired ad-hoc network port 1016 transmit the frame.

The CPU 1002 includes an FPGA interface 1013, DI/DO interface 1014, and sensor interface 1015, and controls the sensor information of the local node. The FPGA interface 1013 performs transmission/reception of sensor information and sensor control information and the like to/from the CPU interface 1007 in the ad-hoc routing control device 1001. To the sensor interface 1015, a plurality of sensor connection ports 1019 are connected and reception and/or transmission of sensor information and sensor control information and the like is performed. One or more sensor devices may be connected to each of the sensor connection ports 1019. As the sensor device, a temperature sensor, a wind speed sensor, an illuminance sensor, a human sensor, an electricity meter, an acceleration sensor, a distortion sensor, a monitoring camera and the like are connected. In addition, to the sensor interface 1015, for example, an EEPROM (Electrically Erasable and Programmable Read Only Memory) 1018 for storing various sensor information and sensor control information is connected. To the DI/DO interface 1014, a DI/DO terminal 1020 for data input/data output is connected. The sensor information detected by the sensor devices is sent from the sensor connection port 1019 to the sensor interface 1015 in the CPU 1002. The sensor information is processed by the CPU 1002, and then transmitted from the FPGA interface 1013 to the CPU interface 1007 in the ad-hoc routing control device 1001. The CPU interface 1007 outputs the received sensor information to the frame processor 1009 while storing the sensor information in the register 1008 as needed. Meanwhile, the sensor control information and the like received at the received frame controller 1010 in the ad-hoc routing control device 1001 is transmitted to the FPGA interface 1013 in the CPU 1002 while being stored in the register 1008. The CPU 1002 controls the specified sensor device via the sensor interface 1015 and the sensor connection port 1019 based on the sensor control information received at the FPGA interface 1013.

The present embodiment provides a routing method that enables detection/establishment of an optimized route by using WaitNo. being routing information corresponding to the hop count or the number of relay from the core relay node 102. In addition, by automatic control of the addition/deletion of the sensor relay node 103 to/from the ad-hoc network according to this WaitNo., a routing method that enables autonomous and prompt decision of the optimal path with the smallest hop count may be provided.

FIG. 11 illustrates a data configuration of a WaitNo. table managed by the WaitNo. controller 1004 in the routing controller 1003 in FIG. 10. The WaitNo. controller 1004 of each sensor relay node 103 illustrated in FIG. 10 stores local node WaitNo. which is specified for the local node in a WaitNo. table. In addition, the WaitNo. controller 1004 stores the master Port that represents the port number to which the sensor relay node 103 for which the local node WaitNo. has been decided is connected I in the WaitNo. table. In addition, the WaitNo. controller 1004 stores P1 WaitNo. being the wait number of the connection destination of the port P1, P2 WaitNo. being the wait number of the connection destination of the port P2, P3 WaitNo. being the WaitNo. of the connection destination of the port P3 in the WaitNo. table. These WaitNos. are the WaitNo. that has been received from the adjacent sensor relay node 103 connected to the respective ports P1, P2, P3 for example of the wired ad-hoc network port 1016 in FIG. 10. That is, P1 WaitNo. through P3 WaitNo. correspond to the communication port. Furthermore, the WaitNo. controller 1004 stores respective timer values corresponding to each WaitNo. P1 WaitNo., P2 WaitNo., P3 WaitNo in the WaitNo. table. These timer values are used to monitor whether or not the respective ports P1, P2, P3 are able to receive a synchronization request frame or a health frame regularly (step S3802 in FIG. 38 described later).

Figure 12:
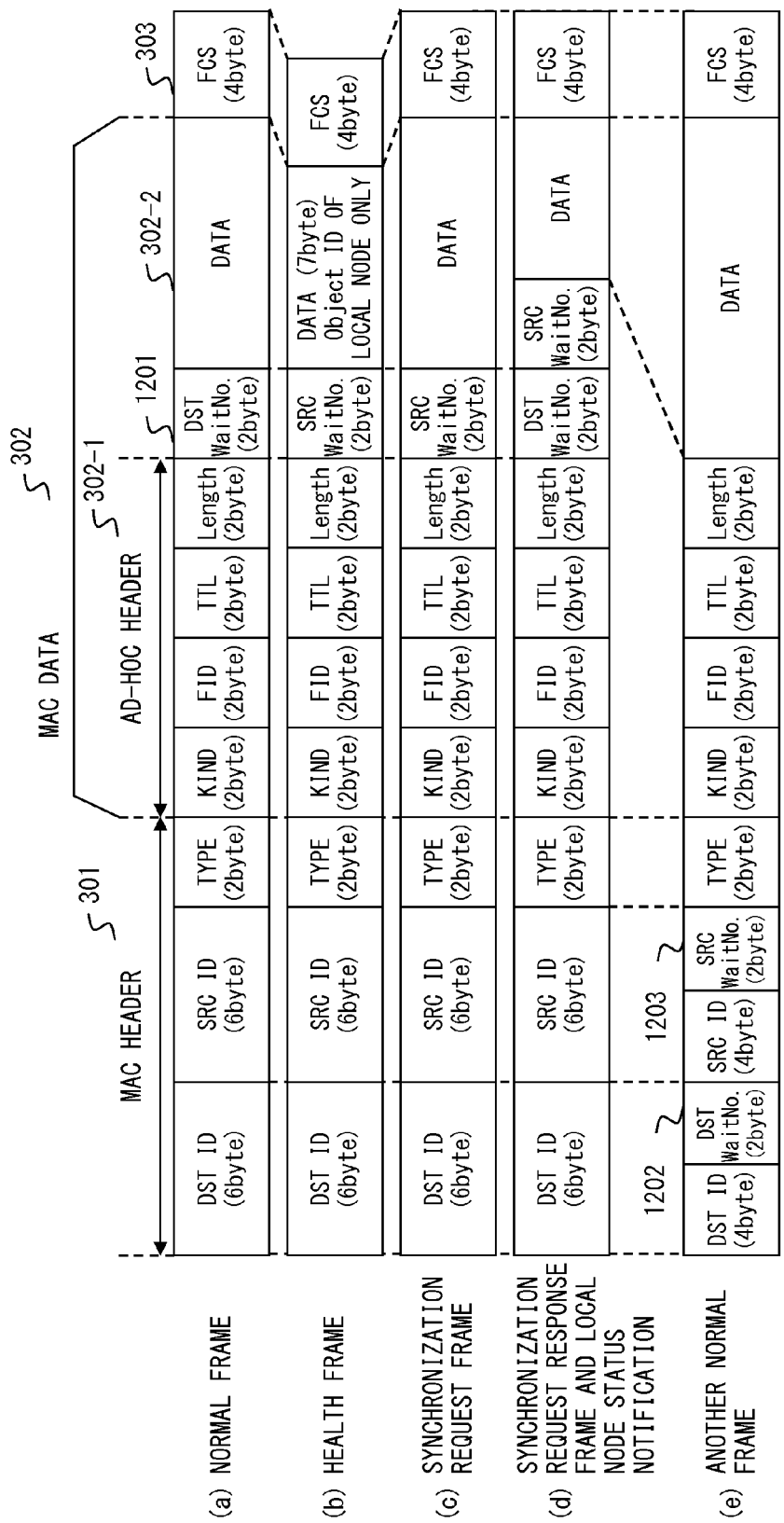
FIG. 12 illustrates a data configuration of a frame in the routing method of the embodiment.

FIG. 12 illustrates a data configuration of a frame in the routing method of the present embodiment. Note that the same numbers are assigned to the same portions in FIG. 3 and FIG. 13.

(a) illustrates the data configuration of a normal frame. (b) illustrates the data configuration of a health frame. The normal frame and the health frame correspond to the frame illustrated in FIG. 3. (c) illustrates the data configuration of a synchronization request frame. (d) illustrates the data configuration of a synchronization request response frame that the sensor relay node 103 sends back in response to the synchronization request frame, and a local node status notification frame that is transmitted by the sensor relay node 103 to inform the status of the local node. (e) illustrates the data configuration of another embodiment of a normal frame. That is, in the normal frame, destination Wait No. may be assigned as apart of the DST ID (destination), and source Wait No. may be assigned as a part of the SRC ID (source).

Figure 13:
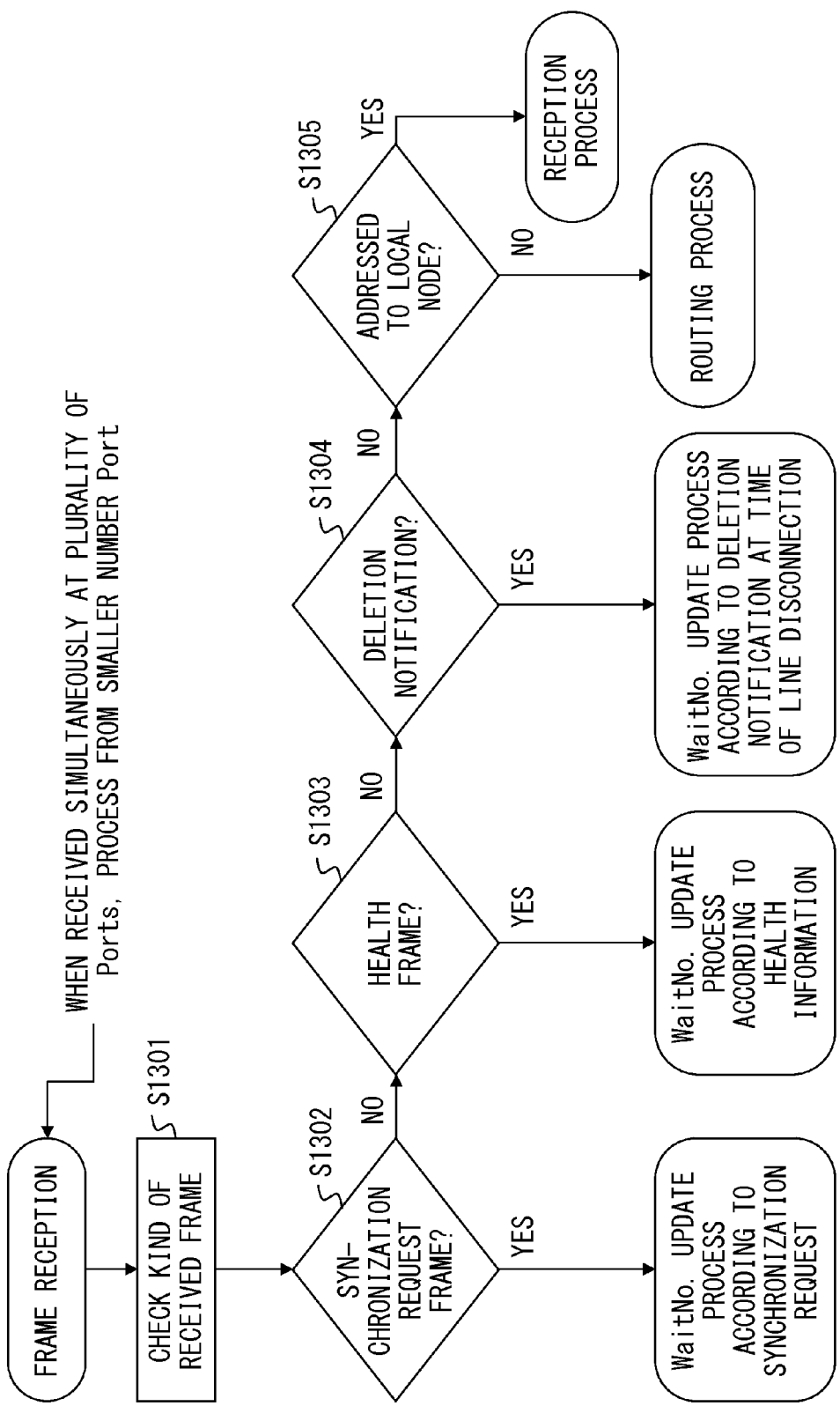
FIG. 13 is a flowchart illustrating the overall control at the time of frame reception at each sensor relay node.

In FIG. 13 ((a)-(d)), 2-byte WaitNo. field 1201 is provided in the MAC data 302 of the normal frame, the health frame, the synchronization request frame, synchronization request response frame, and the local node status notification frame. In the normal frame, the synchronization request frame, and the local node status notification frame illustrated in FIG. 12 ((a) and (d)), the WaitNo. of the destination is set in the WaitNo. field 1201. Meanwhile, in the health frame and the synchronization request frame illustrates in FIG. 12 ((b) and (c)), the WaitNo. of the source is set in the WaitNo. field 1201.

All "0" data indicating broadcast is set in the DST ID field of the health frame and the synchronization request frame. Meanwhile, instead of providing the WaitNo. field 1201, as illustrated in FIG. 12(*e*), the DST ID field in the MAC header 301 may be reduced from 6 bytes to 4 bytes, and the remaining 2 bytes may be assigned to the destination WaitNo. 1202. In the same manner, the SRC ID field in the MAC header 301 may be reduced from 6 bytes to the 4 bytes, and the remaining 2 bytes may be assigned to the source WaitNo. 1203.

In FIG. 12, the configuration may be made to judge whether it is an WaitNo.-assigned frame by the value set in the KIND field in the ad-hoc header 302-1, and each sensor relay node 103 may be configured to execute the update process of WaitNo. according to the judgment. By adopting such a configuration, it becomes possible to communicate the conventional frame as in FIG. 3 without a problem, and the method becomes effective for avoiding congestion of the network (reduction in the processes) by using the WaitNo. in different ways.

According to the WaitNo. table in FIG. 11 and the data structure of the frame in FIG. 12, the routing controller 1003 (FIG. 10) of each sensor relay node 103 according to the present embodiment executes a routing process as described below.

Upon receiving a synchronization request signal, the routing controller 1003 increments the received WaitNo. to be the local node WaitNo., and stores it in the WaitNo. table illustrated in FIG. 11. Meanwhile, in the sensor relay node group 100 in FIG. 1, a plurality of sensor relay nodes 103 having the same WaitNo. may exist.

When transmitting a frame the sensor relay node 103 attaches the local WaitNo. To the frame. The sensor relay node 103 that receives the frame compares the WaitNo. in the received frame and the local node Wait No. When the local node WaitNo. is larger than the WaitNo. of the received frame, the frame is transmitted to the sensor relay node 103 having a larger WaitNo. than the local node WaitNo. When there is not sensor relay node 103 that has a larger WaitNo. than the local node WaitNo., the frame is returned to the source sensor relay node 103 as the loop status. When the local node WaitNo. is smaller than the WaitNo. of the received frame, the frame is transmitted to the sensor relay node 103 having a smaller WaitNo. than the local node Wait No. When there is not sensor relay node 103 having a smaller WaitNo. than the local node Wait No., the frame is returned to the source sensor relay node 103 as the loop status.

To the WaitNo., the number is assigned by weighting according to time synchronization information included in the frame. Meanwhile, the initial value of WaitNo. may be set by the user.

Meanwhile, it is assumed that WaitNo. is transmitted by the regular transmission of the synchronization request frame (FIG. 12 (*c*)) or the regular transmission of the health frame (FIG. 12 (*b*)). When the synchronization request frame or the health frame is not received within the specified monitoring time, the local node WaitNo. is returned to the initial value, and a following operation is performed based on a synchronization request frame or a health frame from another port.

FIG. 13 is a flowchart illustrating the overall control at the time of frame reception in the sensor relay node 103. The flowchart is implemented as the processing function of the FPGA configured as the ad-hoc routing control device 1001 in FIG. 10. Alternatively, when the ad-hoc routing control device 1001 is configured by a processor including a central processing unit and a memory, it is implemented as an operation in which the central processing unit executes a control program stored in the memory.

In FIG. 13, upon detecting frame reception by the received frame controller 1010, the ad-hoc routing control device 1001 in FIG. 10 checks the value of the KIND field in the ad-hoc header 302-1 in the received frame (step S1301). The value of the KIND field may take the value explained in FIG. 3.

By checking a value of the KIND field, in steps S1302, S1303, S1304, S1305, whether the received frame is a synchronization request frame, a health frame, a deletion notification frame, or a frame addressed to the local node is judged.

When the received frame is a synchronization request frame, the judgment becomes YES in step S1302, and the routing controller 1003 in FIG. 10 executes a WaitNo. update process according to the synchronization request. Details of the process are described later using the flowchart in FIG. 14, and illustration diagrams from FIG. 15 to FIG. 23.

When the received frame is a health frame, the judgment in step S1302 becomes NO, and the judgment in step S1303 becomes YES. In this case, the routing controller 1003 in FIG. 10 executes a WaitNo. update process according to health information. Details of the process are described later using the flowchart in FIG. 33, and illustration diagrams from FIG. 34 to FIG. 41.

When the received frame is a deletion notification frame, the judgment in step S1302 and the judgment in step S1303 become NO, and the judgment in S1304 become YES. In this case, the routing controller 1003 in FIG. 10 executes a WaitNo. update process according to a deletion notification at the time of occurrence of line disconnection. Details of the process are described later using the flowchart in FIG. 43, and illustration diagram in FIG. 44.

When the received frame is a frame addressed to the local node, the judgments in steps S1302, S1303, and S1304 become NO, and the judgment in S1305 become YES. In this case, the ad-hoc routing control device 1001 in FIG. 10 executes the normal frame reception process. In this process, as described, sensor control information and the like taken out from the frame data received at the received frame controller 1010 of the ad-hoc routing control device 1001 in FIG. 10 is stored in the register 1008 in the CPU interface 1007. After that, the sensor control information and the like is forwarded to the CPU 1002 from the CPU interface 1007 in the ad-hoc routing control device 1001. The CPU 1002 controls the specified sensor device via the sensor interface 1015 and the sensor connection port 1019 based on the sensor control information and the like received at the FPGA interface 1013.

When the received frame is none of the synchronization request frame, health frame, deletion notification frame and the frame addressed to the local node, the judgments in steps S1302, S1303, S1304, S1305 become NO. In this case, the routing controller 1003 in FIG. 10 executes a routing process. Details of the process are described later using a data configuration diagram of the FID table 1006 in FIG. 24, flowcharts in FIG. 25 and FIG. 26, and illustration diagrams from FIG. 27 to FIG. 32.

When the received frame controller 1010 detects frame detection from a plurality of wired ad-hoc network ports 1016, the ad-hoc routing control device 1001 processes the frame reception process illustrated in FIG. 13 sequentially from the smaller number port.

The respective WaitNo. update processes executed when the respective judgments in steps S1302, S1303, S1304 in FIG. 13 are YES may be implemented in parallel by the routing controller 1003 in FIG. 10, or one or more of the WaitNo. update processes may be selectively implemented.

FIG. 14 is a flowchart illustrating the WaitNo. update process according to a synchronization request executed when it is decided in step S1302 in FIG. 12 that the received frame is a synchronization request frame. The flowchart is implemented as the processing function of the FPGA configured as the ad-hoc routing control device 1001 in FIG. 10, in the same manner in the case in FIG. 13. Alternatively, when the ad-hoc routing control device 1001 is configured by a processor including a central processing unit and a memory, it is implemented as an operation in which the central processing unit executes a control program stored in the memory. Hereinafter, the process in the flowchart is explained.

First, the routing controller 1003 accesses the WaitNo. table illustrated in FIG. 11 managed by the WaitNo. controller 1004. Then, the routing controller 1003 updates the WaitNo. corresponding to the reception port at which the frame arrives to the source WaitNo. stored in the received frame (1201 in FIG. 12($c$)) (step S1401).

In addition, the routing controller 1003 restarts the timer corresponding to the port whose WaitNo. has been updated in the WaitNo. table (step S1402). Accordingly, for the corresponding port, whether or not a new synchronization request frame is received is monitored for the period of time corresponding to the newly set timer value (step S3802 in FIG. 38 described later).

The routing controller 1003 judges whether or not the received frame is a frame that has already been received (step S1403). The judgment is performed as a process to judge whether or not the entry having the same SRC ID and FID as the SRC ID and FID stored in the received frame (FIG. 12($c$)) is registered in the FID table 1006 in FIG. 10. As described referring to FIG. 24 later, the FID table 1006 in the routing method of the present embodiment includes the SRC ID and FID.

When the received frame is an already received frame and the judgment in step S1403 is YES, since there is no need to process the same synchronization request frame redundantly, the routing controller 1003 discards the received frame (step S1411). Then, the routing controller 1003 terminates the WaitNo update process according to a synchronization request in FIG. 14, and returns to the detection process of frame reception by the ad-hoc routing control device 1001.

When the received frame is a frame received for the first time and the judgment in step S1403 is NO, the routing controller 1003 judges whether or not the value of the source WaitNo. (1201 in FIG. 12($c$)) in the received frame is equal to the initial value (0xFF) (step S1404).

When the value of the source WaitNo. in the received frame is equal to the initial value and the judgment in step S1404 is YES, the routing controller 1003 updates the local node WaitNo. (FIG. 11) to the initial value (0xFF) (step S1405). After that, the process of the routing controller 1003 moves to step S1409 described later.

When the value of the source WaitNo. in the received frame is not equal to the initial value and the judgment in step S1404 is NO, the routing controller 1003 executes the following process. That is, routing controller 1003 judges whether or not the value of the local value Wait.No. in the WaitNo. table is larger than a value of the source WaitNo. in the received frame+1 (step S1406).

When the value of the local Wait.No. in the WaitNo. table is not larger than a value of the source WaitNo. in the received frame+1 and the judgment in step S1406 is NO, the process of the routing controller 1003 moves to step S1411, and the synchronization request frame is discarded. This status corresponds to a case in which a synchronization request frame that the local node transmitted was subjected to +1 in the adjacent sensor relay node 103 and returned to the local node, for example. In such a case, in the local node, there is no need to process the synchronization request frame, the frame is discarded without updating the WaitNo. table.

When the value of the local value Wait.No. in the WaitNo. table is larger than a value of the source WaitNo. in the received frame+1 and the judgment in step S1406 is YES, the routing controller 1003 executes the following process. That is, the routing controller 1003 updates the value of the local node WaitNo. (FIG. 11) in the WaitNo. table to the value of the source WaitNo. in the received frame+1 (step S1407).

Furthermore, the routing controller 1003 updates the value of the master Port (FIG. 11) in the WaitNo. table to the port number of the wired ad-hoc network port 1016 at which the received frame arrived (step S1408).

When the WaitNo. table is updated in step S1408 or S1405, the control operation below is performed. That is, according to the control from the routing controller 1003, the frame processor 1009 replaces the value of the source WaitNo. in the synchronization request frame with the value of the local node WaitNo. in the WaitNo. table. Then the frame processor 1009 controls the transmission frame controller 1011 to make the synchronization request frame transmitted via all the wired ad-hoc network ports 1016 (step S1409). In addition, according to the control from the routing controller 1003, the frame processor 1009 controls the transmission frame controller 1011 to make the synchronization request response frame transmitted to the core relay node 102 (step S1410).

The synchronization request response frame has a data format illustrated in FIG. 12(d). In the synchronization request response frame, the address of the core relay node 102 is set for the DST ID. In the SRC ID, the address of the local node is set. In addition, in the MAC data 302, the source WaitNo. that was set in the received frame is set as the destination WaitNo. 1201. In addition to this, in the synchronization request response frame, in the MAC data 203, the local node WaitNo. set in the WaitNo. table 1007 of the local node is set as 2-bytesource WaitNo. The routing controller 1003 detects, in the PS table 1005 in FIG. 10, a field in which the "used status" (FIG. 4) is set, among the P1, P2, P3 field in the entry in which the DST ID of the core relay node 102 is set as the DST ID. Then, the routing controller 1003 instructs, to the transmission frame controller 1011 in FIG. 10, to output the synchronization request response frame to the wired ad-hoc network port 1016 corresponding to the detected field. According to this process, the core relay node 102 can recognize the local node WaitNo. set in the WaitNo. table in each sensor relay node 103, by receiving the synchronization request response frame from each sensor relay node 103. The core relay node 102 stores and manages the local node WaitNo. of each sensor relay node 103 in a table that is not particularly illustrated in the drawing.

After that, the routing controller 1003 terminates the WaitNo. update process according to a synchronization request in FIG. 14, and returns to the detection process of frame reception by the ad-hoc routing control device 1001.

According to the WaitNo. update process according to a synchronization request described above, in FIG. 1, the WaitNo. transmitted from the core relay node 102 is sequentially propagated to sensor relay nodes 103 in the sensor relay node group 100. At this time, in each sensor relay node 103, the value of the source WaitNo. (1201 in FIG. 12(c)) in the synchronization request frame is increased by +1 at each node. The increased WaitNo. is stored as the local node WaitNo. in the WaitNo. table in the WaitNo. controller 1004 illustrated in FIG. 10. Then, the synchronization request frame having the increased WaitNo. is forwarded to the adjacent sensor relay node 103. As described above, the WaitNo. corresponding to the hop count from the core relay node 102 is set in each of the sensor relay nodes 103 as the local node WaitNo.

FIG. 15 through FIG. 23 are illustration diagrams illustrating specific examples of the WaitNo. update process according to a synchronization request. Hereinafter, using the illustration diagrams, the specific processes of the WaitNo. update process according to a synchronization request are explained.

In FIG. 15, the core relay node 102 transmits a synchronization request frame in which 0x00 (corresponding to the hop count=0) as the source WaitNo. value. The synchronization request frame has the data format illustrated in FIG. 12(c). In the DST ID, all "0" is set, and in the SRC ID, the address of the core relay node 102 is set. In the KIND field, 0x0006 representing a synchronization request command (time synchronization command) (FIG. 3). As the source WaitNo. the value 0x00 is set.

The synchronization request frame is first received at the sensor relay node 103-ID1 connected to the core relay node 102. "sensor relay node 103-ID1" indicates a relay node 103 identified by an identifier ID1. ID1 may be an address value representing the sensor relay node 103. The same applies to ID2 through ID20. As a result, "0x01" is stored as the local node WaitNo. in the WaitNo. table (FIG. 11) in the WaitNo. controller 1004 (FIG. 10) of the sensor relay node 103-ID1. "0x01" is obtained by incrementing the source WaitNo. by 1. This represents a situation that the smallest hop count from the core relay node 102 to the sensor relay node 103-ID1 is 1. This process is executed according to step S1407 in FIG. 14.

Meanwhile, for the reception of the synchronization request frame, step S1401 in FIG. 14 is executed. Accordingly, WaitNo. corresponding to the reception port of the synchronization request frame among the WaitNo. of P1, P2, P3 in the WaitNo. table of the sensor relay node 103-ID1 is updated to the source WaitNo.=0x00 stored in the synchronization request frame. As a result, the local node WaitNo. set in the core relay node 102 that is adjacent in the direction in which the hop count decreases can be recognized.

Figure 16:
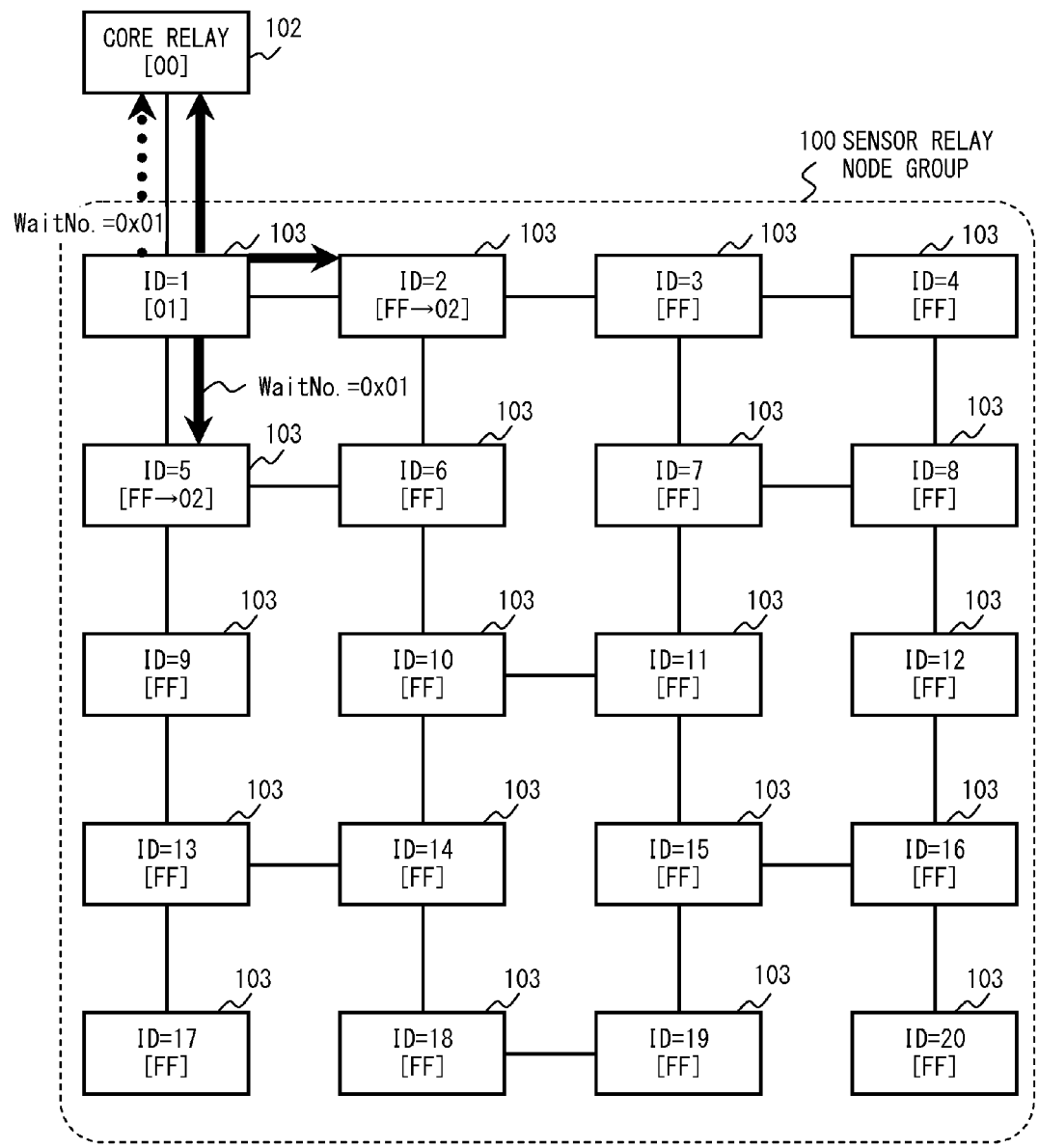

The synchronization request frame in which the local node WaitNo. value 0x01 is newly set as the source WaitNo. is transmitted to all the wired ad-hoc network ports 1016 in the sensor relay node 103-ID1. This status is illustrated in FIG. 16. This process is executed by step S1409 in FIG. 14.

As illustrated in FIG. 16, from the sensor relay node 103-ID1 to the core relay node 102, a synchronization request response frame having the local node WaitNo.=0x01 as the source WaitNo. (FIG. 12 (d)) is returned. This process is executed by step S1410 in FIG. 14. Accordingly, the core relay node 102 recognizes that the WaitNo. of the sensor relay node 103-ID1 has been set to 0x01.

The synchronization request frame having the source WaitNo.=0x01 transmitted via each port of the sensor relay node 103-ID1 is received by the sensor relay nodes 103-ID2 and 103-ID5. As a result, "0x02" is stored as the local node WaitNo. in the WaitNo. table (FIG. 11) in the WaitNo. controller 1004 (FIG. 10) of each of the sensor relay nodes 103-ID2 and 103-ID5. "0x02" is obtained by incrementing the value of the source WaitNo.=0x01 by 1. This represents a situation that the smallest hop count from the core relay node 102 to each of the sensor relay nodes 103-ID2 and 103-ID5 is 2. This process is executed by step S1407 in FIG. 14.

Figure 17:
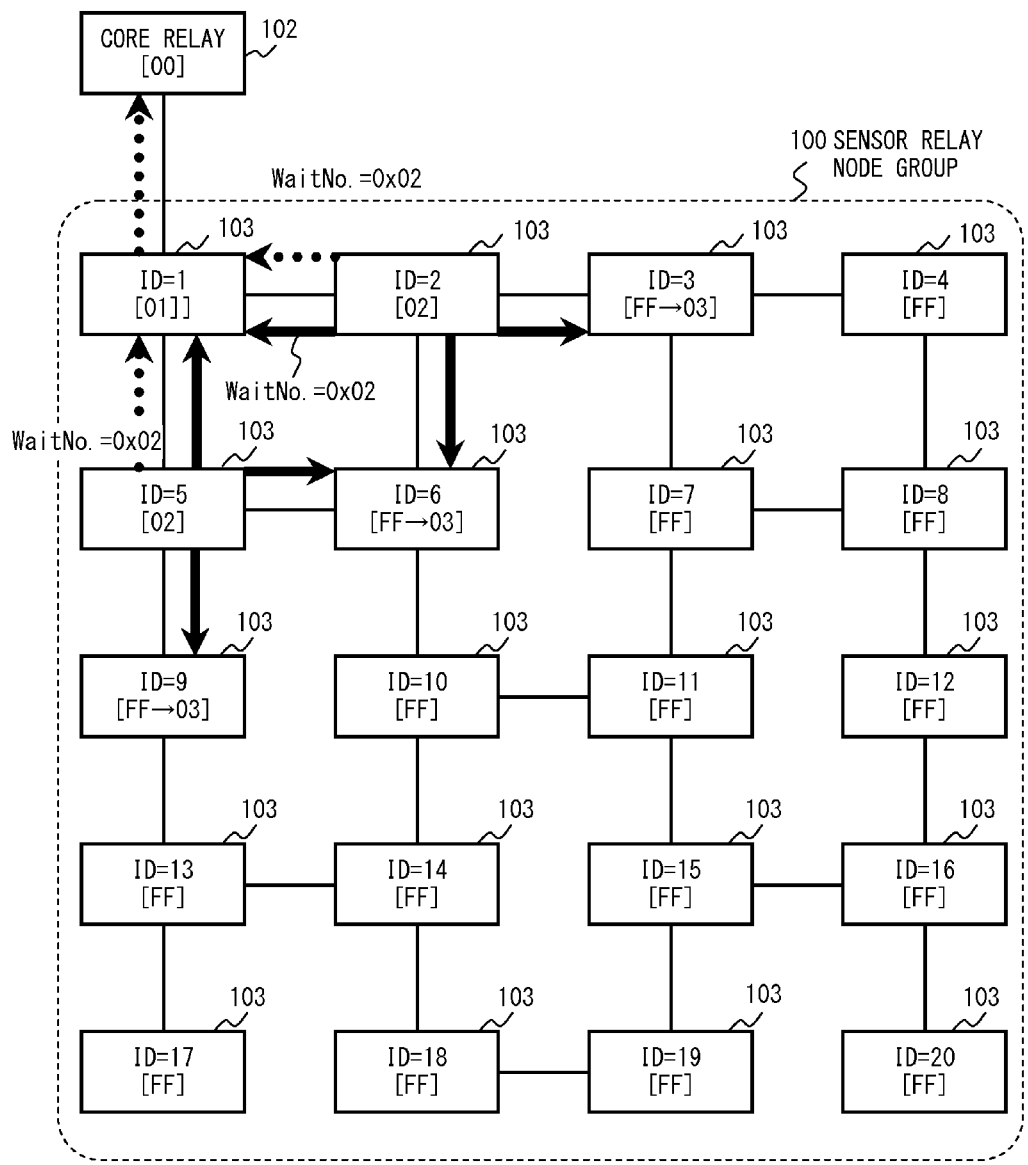

To all the wired ad-hoc network port 1016 of each of the sensor relay nodes 103-ID2 and 103-ID5, the synchronization request frame in which the local node WaitNo. value 0x02 is newly set as the source WaitNo. is output. This status is illustrated in FIG. 17. This process is executed by step S1409 in FIG. 14.

As illustrated in FIG. 17, from each of the sensor relay nodes 103-ID2 and 103-ID5 to the core relay node 102, the synchronization request response frame having the local node WaitNo.=0x02 as the source WaitNo. is returned. This process is executed by step S1410 in FIG. 14. Accordingly, the core relay node 102 recognizes that the WaitNo. of each of the sensor relay nodes 103-ID2 and 103-ID5 has been set to 0x02.

Meanwhile, each synchronization request frame in which the source WaitNo.=0x02 and transmitted from each of the sensor relay nodes 103-ID2 and 103-ID5 also reaches the sensor relay node 103-ID1. However, in this case, the local node WaitNo.=0x01 of the sensor relay nodes 103-ID1 is smaller than the source WaitNo.=0x02 of the received frame and the judgment in step S1406 in FIG. 14 becomes NO, thus the synchronization request frame is discarded in step S1411. However, step S1401 in FIG. 14 is executed at the time of reception of each synchronization request frame described above. Accordingly, WaitNo. corresponding to the reception port at which the synchronization request frame arrived among the WaitNo. of P1, P2, P3 in the WaitNo. table (FIG. 11) is updated to the source WaitNo. stored in the synchronization request frame. As a result, from the viewpoint of the core relay node 102, the local node WaitNo. set in the sensor relay node that is adjacent in the direction in which WaitNo. increases may be detected on the WaitNo. table.

The synchronization request frame having the source WaitNo.=0x02 and transmitted from each port of the sensor relay nodes 103-ID2 and 103-ID5 is received at each of the sensor relay nodes 103-ID3, 103-ID6 and 103-ID9. As a result, "0x03" is stored as the local node WaitNo. in the WaitNo. table of each of the sensor relay nodes 103-ID3, 103-ID6 and 103-ID9. "0x03" is obtained by incrementing the value of the source WaitNo.=0x02 set in the synchronization request frame by 1. This represents a situation that the smallest hop count from the core relay node 102 to each of the sensor relay nodes 103-ID3, 103-ID6 and 103-ID9 is 3. This process is executed by step S1407 in FIG. 14.

In addition, by the execution of step S1401 in FIG. 14, the local node WaitNo. set in the sensor relay node 103 that is adjacent in the direction in which WaitNo. decreases from the viewpoint of the core relay node 102 may be detected as the WaitNo. of the corresponding port in the WaitNo. table.

Figure 18:
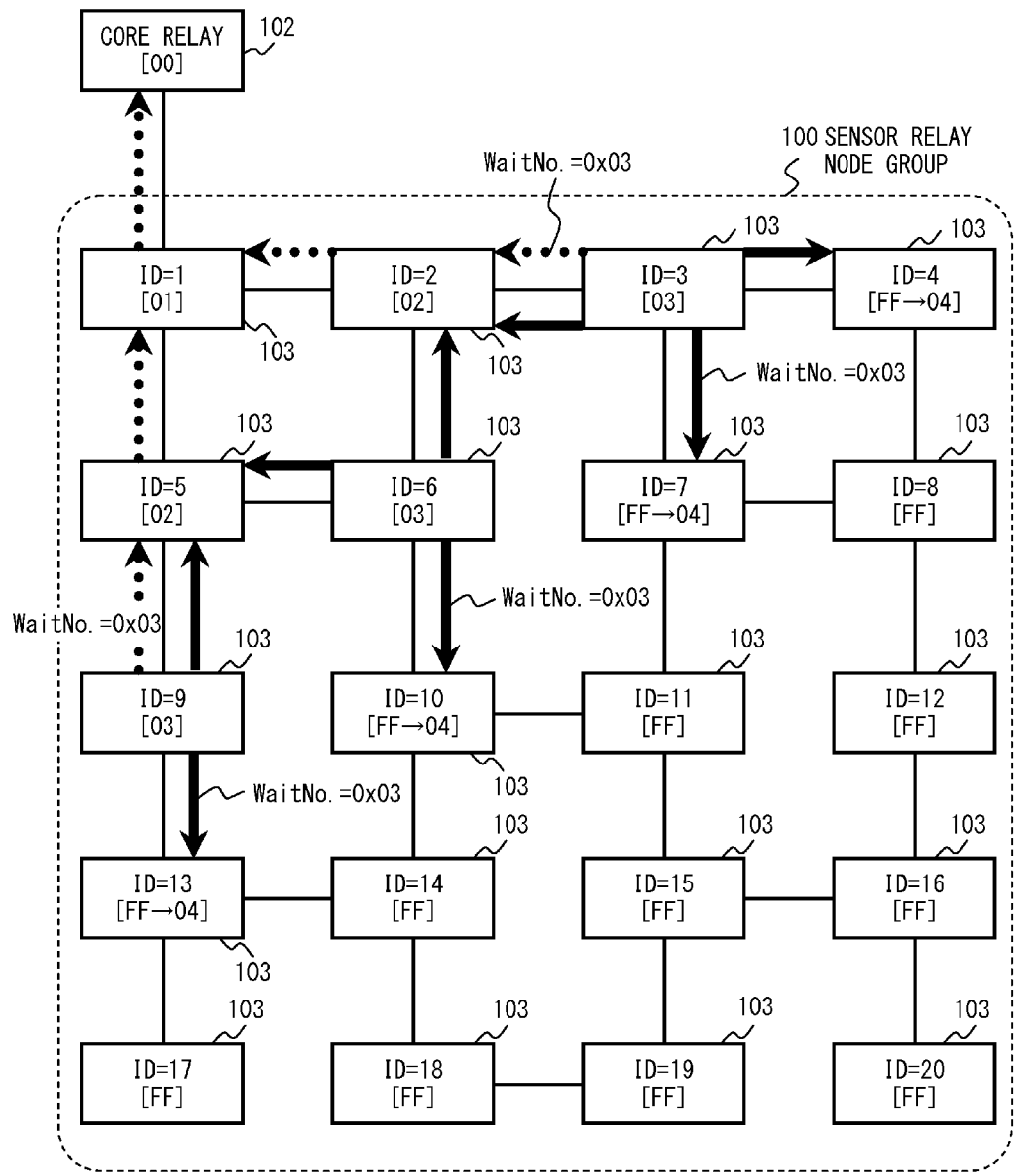

To all the wired ad-hoc network ports 1016 in each of the sensor relay nodes 103-ID3, 103-ID6 and 103-ID9, the synchronization request frame in which the local node WaitNo. 0x03 is set as the source WaitNo. is output. This status is illustrated in FIG. 18. This process is executed by step S1409 in FIG. 14.

As illustrated in FIG. 18, from each of the sensor relay nodes 103-ID3, 103-ID6 and 103-ID9 to the core relay node 102, the synchronization request response frame having the local node WaitNo.=0x03 as the source WaitNo. is returned. This process is executed by step S1401 in FIG. 14. Accordingly, the core relay node 102 recognizes that the WaitNo. of each of the sensor relay nodes 103-ID3, 103-ID6 and 103-ID9 has been set to 0x03.

The synchronization request frame having the source WaitNo.=0x03 and transmitted from each port of each of the sensor relay nodes 103-ID3, 103-ID6 and 103-ID9 is received at each of the sensor relay nodes 103-ID4, 103-ID7, 103-ID10 and 103-ID13. As a result, "0x04" is stored as the local node WaitNo in the WaitNo. table of each of the sensor relay nodes 103-ID4, 103-ID7, 103-ID10 and 103-ID13. "0x04" is obtained by incrementing the value of the source WaitNo.=0x03 set in the synchronization request frame by 1. This represents a situation that the smallest hop count from the core relay node 102 to each of the sensor relay nodes 103-ID4, 103-ID7, 103-ID10 and 103-ID13 is 4. This process is executed by step S1407 in FIG. 14.

Meanwhile, while the synchronization request frame is returned also to each of the sensor relay nodes 103-ID2 and 103-ID5, this frame is discarded at each of the nodes as described above. However, by the execution of step S1401 in FIG. 14, the local node WaitNo. set in each sensor relay node 103 that is adjacent in the direction in which the WaitNo. increases from the viewpoint of the core relay node 102 may be detected as the WaitNo. of the corresponding port in the WaitNo. table.

To all the wired ad-hoc network ports 1016 in each of the sensor relay nodes 103-ID4, 103-ID7, 103-ID10 and 103-ID13, the synchronization request frame in which the local node WaitNo. 0x04 is set as the source WaitNo. is output. This status is illustrated in FIG. 19. This process is executed by step S1409 in FIG. 14.

While it is not illustrated in FIG. 19, the synchronization request response frame having the local node WaitNo.=0x04 as the source WaitNo. is returned from each of the sensor relay nodes 103-ID4, 103-ID7, 103-ID10 and 103-ID13 to the core relay node 102. This process is executed by step S1410 in FIG. 14. Accordingly, the core relay node 102 recognizes that the WaitNo. of each of the sensor relay nodes 103-ID4, 103-ID7, 103-ID10 and 103-ID13 has been set to 0x04.

The synchronization request frame having the source WaitNo.=0x04 and transmitted from each port of each of the sensor relay nodes 103-ID4, 103-ID7, 103-ID10 and 103-ID13 is received by each of the sensor relay nodes 103-ID8, 103-ID11, 103-ID14 and 103-ID17. As a result, "0x05" is stored as the local node WaitNo. in the WaitNo. table of each of the sensor relay nodes 103-ID8, 103-ID11, 103-ID14 and 103-ID17. "0x05" is obtained by incrementing the value of the source WaitNo.=0x04 set in the synchronization request frame by 1. This represents a situation that the smallest hop count from the core relay node 102 to each of the sensor relay nodes 103-ID8, 103-ID11, 103-ID14 and 103-ID17 is 5. This process is executed by step S1407 in FIG. 14.

By the execution of step S1401 in FIG. 14, the local node WaitNo. set in the sensor relay node 103 that is adjacent in the direction in which WaitNo. decreases from the viewpoint of the core relay node 102 may be detected as the WaitNo. of the corresponding port in the WaitNo. table.

Meanwhile, while the synchronization request frame is returned also to each of the sensor relay nodes 103-ID3, 103-ID6 and 103-ID9, this frame is discarded at each of the nodes as described above. However, by the execution of step S1401 in FIG. 14, the local node WaitNo. set in each sensor relay node 103 that is adjacent in the direction in which the WaitNo. increases from the viewpoint of the core relay node 102 may be detected as the WaitNo. of the corresponding port in the WaitNo. table.

Figure 20:
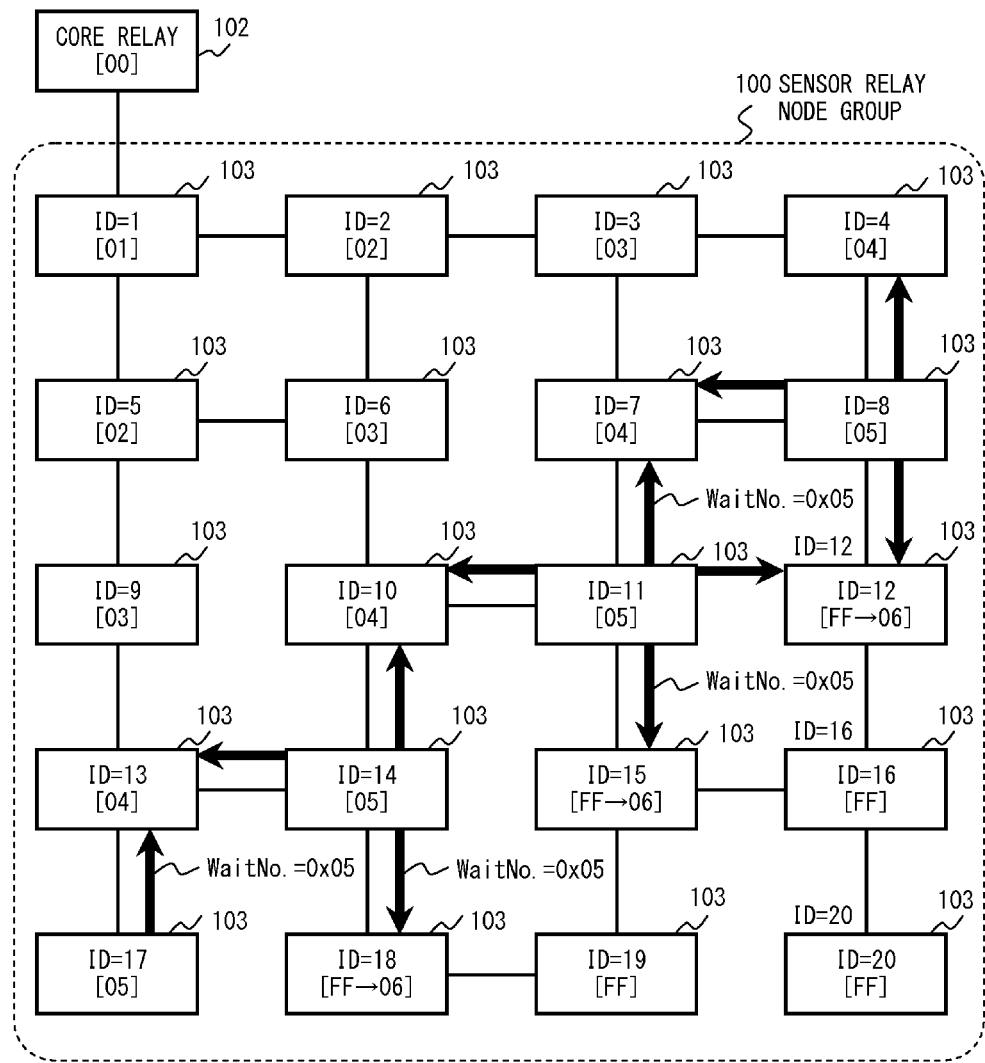

To all the wired ad-hoc network ports 1016 in each of the sensor relay nodes 103-ID8, 103-ID11, 103-ID14 and 103-ID17, the synchronization request frame in which the local node WaitNo. 0x05 is set as the source WaitNo. is output. This status is illustrated in FIG. 20. This process is executed by step S1409 in FIG. 14.

While it is not illustrated in FIG. 20, the synchronization request response frame having the local node WaitNo.=0x05 as the source WaitNo. is returned from each of the sensor relay nodes 103-ID8, 103-ID11, 103-ID14 and 103-ID17 to the core relay node 102. This process is executed by step S1410 in FIG. 14. Accordingly, the core relay node 102 recognizes that the WaitNo. of each of the sensor relay nodes 103-ID8, 103-ID11, 103-ID14 and 103-ID17 has been set to 0x05.

The synchronization request frame having the source WaitNo.=0x05 and transmitted from each port of each of the sensor relay nodes 103-ID8, 103-ID11, 103-ID14 and 103-ID17 is received by each of the sensor relay nodes 103-ID12, 103-ID15 and 103-ID18. As a result, "0x06" is stored as the local node WaitNo. in the WaitNo. table of each of the sensor relay nodes 103-ID12, 103-ID15 and 103-ID18. "0x06" is obtained by incrementing the value of the source WaitNo.=0x05 set in the synchronization request frame by 1. This represents a situation that the smallest hop count from the core relay node 102 to each of the sensor relay nodes 103-ID12, 103-ID15 and 103-ID18 is 6. This process is executed by step S1407 in FIG. 14.

By the execution of step S1401 in FIG. 14, the local node WaitNo. set in the sensor relay node 103 that is adjacent in the direction in which WaitNo. decreases from the viewpoint of the core relay node 102 is obtained as the WaitNo. of the corresponding port in the WaitNo. table.

Meanwhile, while the synchronization request frame is returned also to each of the sensor relay nodes 103-ID7, 103-ID10 and 103-ID13, this frame is discarded at each of the nodes as described above. However, by the execution of step S1401 in FIG. 14, the local node WaitNo. set in each sensor relay node 103 that is adjacent in the direction in which the WaitNo. increases from the viewpoint of the core relay node 102 may be understood as the WaitNo. of the corresponding port in the WaitNo. table.

To all the wired ad-hoc network ports 1016 in each of the sensor relay nodes 103-ID12, 103-ID15 and 103-ID18, the synchronization request frame in which the local node WaitNo. 0x06 is set as the source WaitNo. is output. This status is illustrated in FIG. 21. This process is executed by step S1409 in FIG. 14.

While it is not illustrated in FIG. 21, the synchronization request response frame having the local node WaitNo.=0x06 as the source WaitNo. is returned from each of the sensor relay nodes 103-ID12, 103-ID15 and 103-ID18 to the core relay node 102. This process is executed by step S1410 in FIG. 14. Accordingly, the core relay node 102 recognizes that the WaitNo. of each of the sensor relay nodes 103-ID12, 103-ID15 and 103-ID18 has been set to 0x06.

The synchronization request frame having the source WaitNo.=0x06 and transmitted from each port of each of the sensor relay nodes 103-ID12, 103-ID15 and 103-ID18 is received by each of the sensor relay nodes 103-ID16 and 103-ID19. As a result, "0x07" is stored as the local node WaitNo. in the WaitNo. table of each of the sensor relay nodes 103-ID16 and 103-ID19. "0x07" is obtained by incrementing the value of the source WaitNo.=0x06 set in the synchronization request frame by 1. This represents a situation that the smallest hop count from the core relay node 102 to each of the sensor relay nodes 103-ID16 and 103-ID19 is 7. This process is executed by step S1407 in FIG. 14.

By the execution of step S1401 in FIG. 14, the local node WaitNo. set in the sensor relay node 103 that is adjacent in the direction in which WaitNo. decreases from the viewpoint of the core relay node 102 is obtained as the WaitNo. of the corresponding port in the WaitNo. table.

Meanwhile, while the synchronization request frame is returned also to each of the sensor relay nodes 103-ID8, 103-ID11 and 103-ID14, this frame is discarded at each of the nodes as described above. However, by the execution of step S1401 in FIG. 14, the local node WaitNo. set in each sensor relay node 103 that is adjacent in the direction in which the WaitNo. increases from the viewpoint of the core relay node 102 may be understood as the WaitNo. of the corresponding port in the WaitNo. table.

Figure 22:
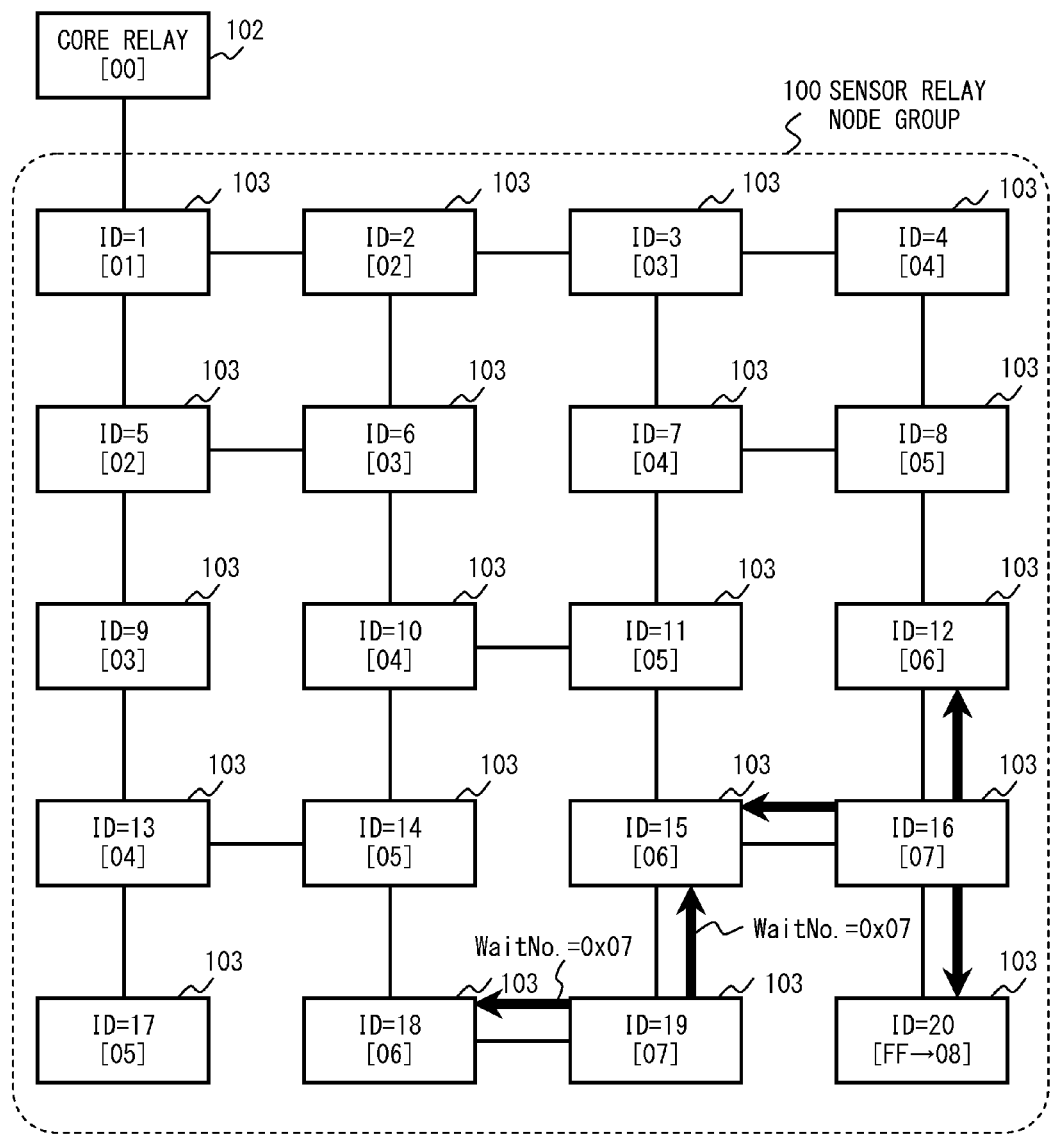

To all the wired ad-hoc network ports 1016 in each of the sensor relay nodes 103-ID16 and 103-ID19, the synchronization request frame in which the local node WaitNo. 0x07 is set as the source WaitNo. is output. This status is illustrated in FIG. 22. This process is executed by step S1409 in FIG. 14.

While it is not illustrated in FIG. 22, the synchronization request response frame having the local node WaitNo.=0x07 as the source WaitNo. is returned from each of the sensor relay nodes 103-ID16 and 103-ID19 to the core relay node 102. This process is executed by step S1410 in FIG. 14. Accordingly, the core relay node 102 recognizes that the WaitNo. of each of the sensor relay nodes 103-ID16 and 103-ID19 has been set to 0x07.

The synchronization request frame having the source WaitNo.=0x07 and transmitted from each port of each of the sensor relay nodes 103-ID16 and 103-ID19 is received by the sensor relay node 103-ID20. As a result, "0x08" is stored as the local node WaitNo. in the WaitNo. table of the sensor relay node 103-ID20. "0x08" is obtained by incrementing the value of the source WaitNo.=0x07 set in the synchronization request frame by 1. This represents a situation that the smallest hop count from the core relay node 102 to the sensor relay node 103-ID20 is 8. This process is executed by step S1407 in FIG. 14.

By the execution of step S1401 in FIG. 14, the local node WaitNo. set in the sensor relay node 103 that is adjacent in the direction in which WaitNo. decreases from the viewpoint of the core relay node 102 is obtained as the WaitNo. of the corresponding port in the WaitNo. table.

Meanwhile, while the synchronization request frame is returned also to each of the sensor relay nodes 103-ID12, 103-ID15 and 103-ID18, this frame is discarded at each of the nodes as described above. However, by the execution of step S1401 in FIG. 14, the local node WaitNo. set in each sensor relay node 103 that is adjacent in the direction in which the WaitNo. increases from the viewpoint of the core relay node 102 may be detected as the WaitNo. of the corresponding port in the WaitNo. table.

Lastly, to all the wired ad-hoc network ports 1016 in the sensor relay node 103-ID20, the synchronization request frame in which the local node WaitNo. 0x08 is set as the source WaitNo. is output. This status is illustrated in FIG. 22. This process is executed by step S1409 in FIG. 14.

While it is not illustrated in FIG. 22, the synchronization request response frame having the local node WaitNo.=0x08 as the source WaitNo. is returned from the sensor relay node 103-ID20 to the core relay node 102. This process is executed by step S1410 in FIG. 14. Accordingly, the core relay node 102 recognizes that the WaitNo. of the sensor relay node 103-ID20 has been set to 0x08.

While the synchronization request frame is received by the sensor relay node 103-ID16, this frame is discarded as described above. However, by the execution of step S1401 in FIG. 14, the local node WaitNo. set in sensor relay node 103-ID20 that is adjacent in the direction in which the WaitNo. increases from the viewpoint of the core relay node 102 is detected as the WaitNo. of the corresponding port in the WaitNo. table.

As described above, the synchronization request frame having the source WaitNo.=0x00 transmitted from the core relay node 102 is sequentially forwarded to each sensor relay node 103 in the sensor relay node group 100. During this process, at each sensor relay node 103, the value of the source WaitNo. (1021 in FIG. 12(c)) is incremented by 1. The incremented WaitNo. is set as the local node WaitNo. in the WaitNo. table in the WaitNo. controller 1004 in FIG. 10 of each sensor relay node 103. Then, the synchronization request frame having the incremented WaitNo. is forwarded to the adjacent relay node 103.

Figure 23:
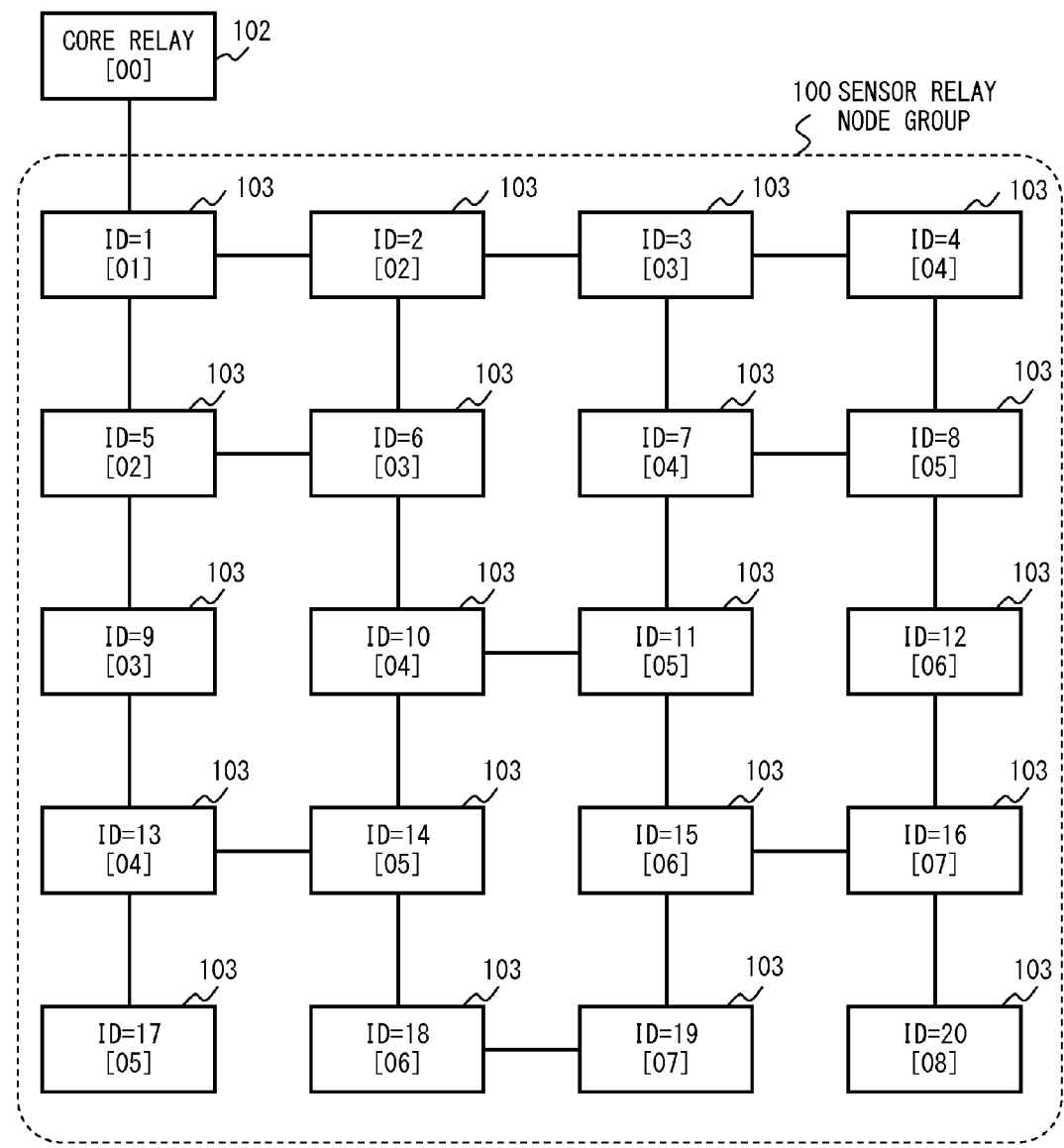

As a result, as illustrated in FIG. 23, in the WaitNo. table (FIG. 11) of each sensor relay node 103, the WaitNo. value corresponding to the smallest hop count from the core relay node 102 is set as the local node WaitNo.

In addition, by the execution of step S1401 in FIG. 14, the sensor relay node 103 can detect the WaitNo. of an adjacent sensor relay node connected to each wired ad-hoc network port 1016 of the sensor relay node 103. The WaitNo. of the adjacent nodes is managed by the WaitNo. table (FIG. 11).

Next, the routing process is explained. When the received frame is none of the synchronization request frame, the health frame, the deletion notification frame and the frame addressed to the local frame, the judgments in steps S1302, S1303, S1304, S1305 become NO in FIG. 13. In this case, a routing process is executed by the routing controller 1003 in FIG. 10. The process is explained using the data configuration diagram of the FID table 1006 in FIG. 24, the flowcharts in FIG. 25 and FIG. 26, and the illustration diagrams from FIG. 27 to FIG. 32.

FIG. 24 illustrates the data configuration of the FID table 1006 (FIG. 10) in the routing method of the present embodiment. In FIG. 24, the same number is assigned to the same portion in the case in the data configuration of the FID table in the routing method that is usually assumed illustrated in FIG. 5.

The data configuration in FIG. 24 differs from the data configuration in FIG. 5 in that a Loop flag is added. The Loop flag indicates that there is no path addressed by entry that includes the Loop flag in the connection of the local node. When the Loop flag is "ON", it indicates that there is no path addressed by the entry in the connection destination of the local node. When the Loop flag is "OFF", it indicates that there is a possibility that the path addressed by the entry exists in the connection destination of the local node.

The Loop flag is combined with the routing control according to the Wait No. described later, to be used to execute the routing process so that the path with the smallest hop count is selected.

Figure 25:
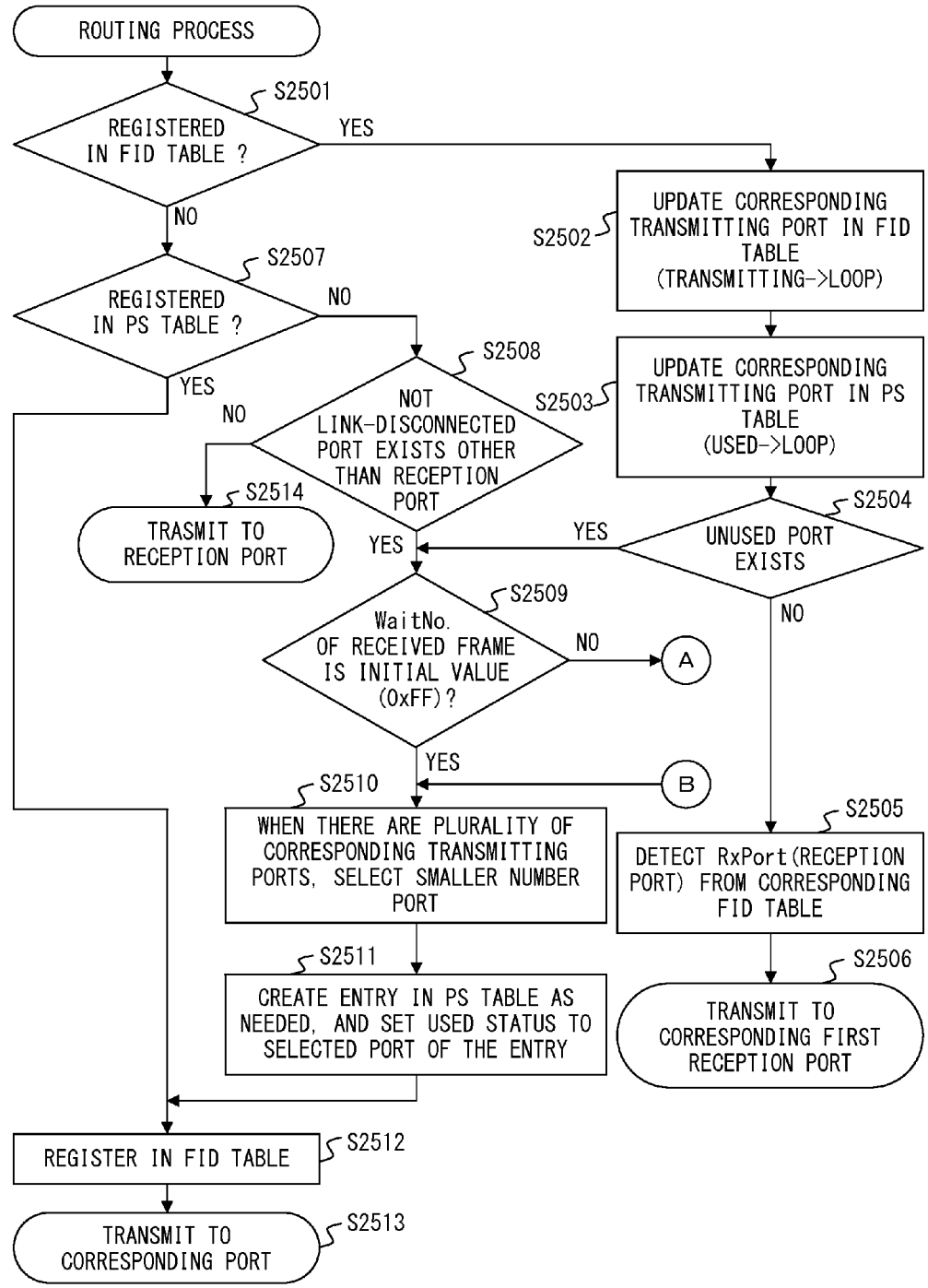
FIG. 25 and FIG. 26 are flowcharts illustrating the routing process.
Figure 26:
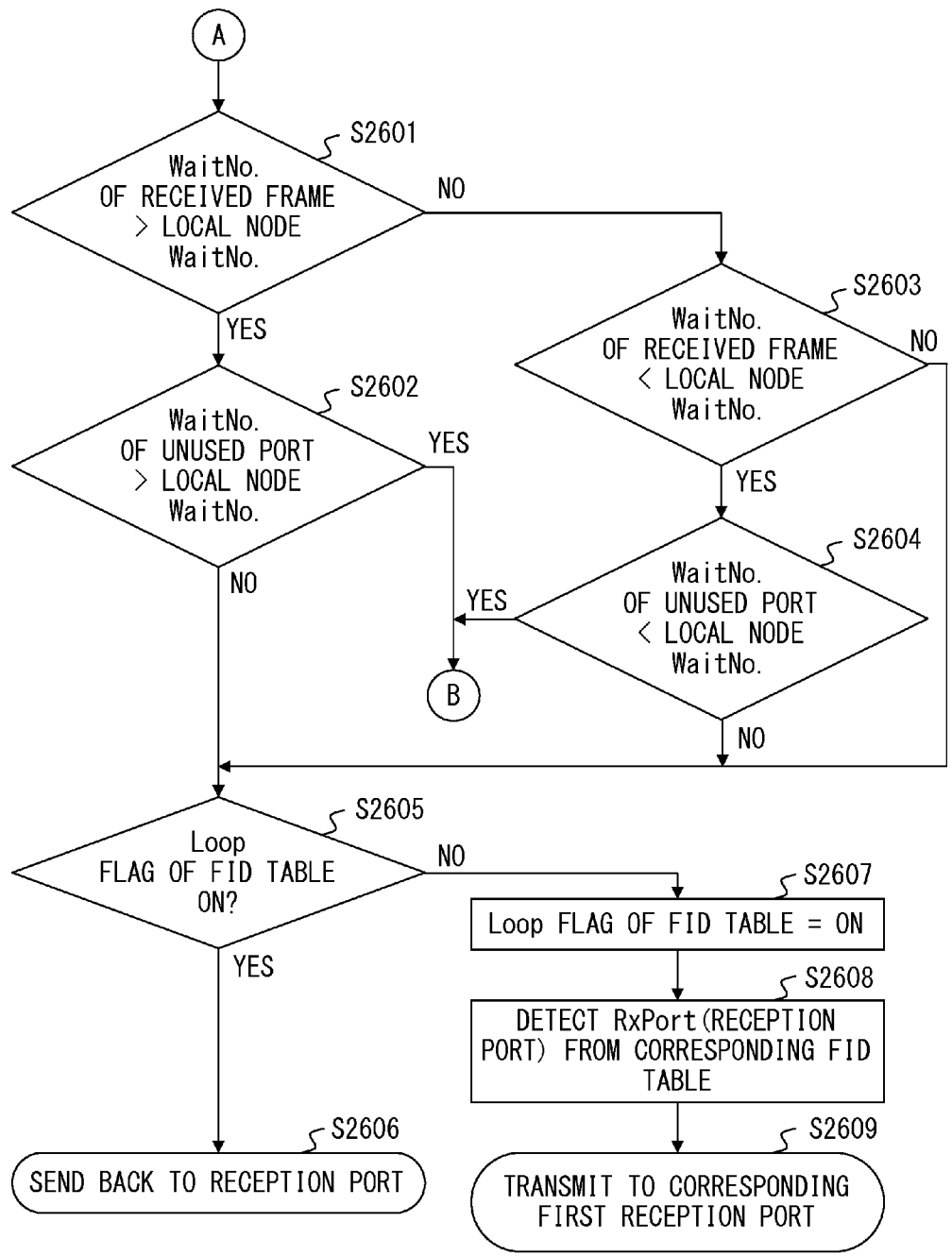

FIG. 25 and FIG. 26 are flowcharts illustrating a routing process that is executed as a result of the judgment in step S1305 in FIG. 13 being NO. That is, the flowchart illustrate a routing process based on the WaitNo. while avoiding the loop, after the WaitNo. assignment to the relay nodes 103 is completed. This flowchart is implemented as the processing function of the FPGA in the ad-hoc routing control device 1001 in FIG. 10, similar to the case of FIG. 13. Alternatively, when the ad-hoc routing control device 1001 is implemented by a processor including a central processing unit and a memory, it is implemented as an operation in which the central processing unit executes a control program stored in the memory. Hereinafter, the process in the flowchart is explained.

In FIG. 25, the routing controller 1003 takes out the SRC ID and FID from the received frame (FIG. 12(*a*)). The routing controller 1003 searches the FID table 1006 (FIG. 10. FIG. 24) by the SRC ID and FID. By this, the routing controller 1003 judges whether or not an entry with the corresponding SRC ID and FID is registered on the FID table 1006 (step S2501).

When no corresponding entry is registered in the FID table 1006 and the judgment in S2501 is NO, the routing controller 1003 searches the PS table 1005. More specifically, the routing controller 1003 first takes out the DST ID from the received frame (FIG. 12(*a*)). Then, the routing controller 1003 searches the PS table (FIG. 10, FIG. 4) by the DST ID. By this, the routing controller 1003 judges whether or not an entry with the corresponding DST ID is registered on the PS table 1005 (step S2507).

When a corresponding entry exists on the PS table 1005 and the judgment in S2507 is YES, the routing controller 1003 executes the following process. That is, the routing controller 1003 takes out the SRC ID and FID from the received frame. Then, routing controller 1003 creates an entry including the SRC ID and FID on the FID table 1006. In addition, the routing controller 1003 extracts the port number for which the "used status" is registered, among the P1, P2, P3 fields of the entry created on the FID table 1006. Then, the routing controller 1003 sets the "transmitting port" status in the field corresponding to the extracted port number, among the P1, P2, P3 fields of the entry created on the FID table 1006 (step S2512).

After that, the routing controller 1003 makes an instruction, to the transmission frame controller 1011 in FIG. 10, for transmission to the wired ad-hoc network port 1016 corresponding to the extracted port number. Along with this, the routing controller 1003 passes the received frame to the frame processor 1009 in FIG. 10. The frame processor 1009 controls the transmission frame controller 1011 to make it output the received frame to the wired ad-hoc network port 1016 (step S2513).

When no corresponding entry exists on the PS table 1005 and the judgment in S2503 is NO, the routing controller 1003 executes the following process. That is, the routing controller 1003 make an inquiry to the transmission frame controller 1011 and judges whether or not there is any wired ad-hoc network port 1016 that has not become link-disconnected, other than the port that received the received frame (step S2508).

When there is a port that is not link-disconnected and the judgment in step S2508 is YES, the routing controller 1003 judges whether or not the destination WaitNo. (1201 in FIG. 12(*a*)) set in the received frame is the initial value (0xFF) (step S2509).

When the destination WaitNo. of the received frame is not the initial value and the judgment in step S2509 is NO, the routing controller 1003 executes the process in the flowchart in FIG. 26. The process is described later.

When the destination WaitNo. of the received frame is the initial value and the judgment in step S2509 is YES, the routing controller 1003 executes the routing process that is usually assumed, without executing the routing process using the WaitNo. That is, the routing controller 1003 selects the port of the smaller number (or the larger number, according to a unified condition), when there are plurality of ports determined in step S2508 (step S2510). Next, the routing controller 1003 extracts the DST ID (FIG. 12(*a*)) from the received frame. The routing controller 1003 creates an entry in which the DST ID is set on the PS table 1005 in FIG. 10. The routing controller 1003 sets the "used status" in the field corresponding to the port selected in step S2508 and S2510 among the P1, P2, P3 fields of the entry (step S2511). Furthermore, the routing controller 1003 takes out the SRC ID and FID from the received frame. The routing controller 1003 creates, on the FID table 1006, an entry including the SRC ID and FID. In addition, the routing controller 1003 sets the "transmitting port" status in the field corresponding to the selected port, among the P1, P2, P3 fields of the entry created on the FID table 1006 (step S2512).

When there is no port that is not link-disconnected and the judgment in step S2508 is NO, the routing controller 1003 returns the received frame to the port at which the frame arrived (step S2514).

When a corresponding entry is registered in the FID table 1006 and the judgment in step S2501 is YES, it follows that the a frame that was once transmitted is returned to the local node. In this case, the routing controller 1003 sets the "loop port" status in the field that is in the "transmitting port" status, among the P1, P2, P3 fields of the corresponding entry on the FID table 1006 (step S2502) (FIG. 24).

The routing controller 1003 extracts the DST ID (FIG. 12(*a*)) from the received frame. The routing controller 1003 searches the entry in which the same DST ID as the extracted DST ID is registered on the PST table 1005. Then, the routing controller 1003 sets the "loop status" in the field that is in the "used status" among the P1, P2, P3 fields of the entry (step S2503) (FIG. 4).

The routing controller 1003 searches the corresponding entry on the PS table 1005, thereby judging whether or not there is any unused port corresponding to the field in which the "unused status" is set, among the P1, P2, P3 fields (step S2504).

When there is an unused port and the judgment in step S2504 is YES, the routing controller 1003 executes steps S2509-S2512 and the process in the flowchart in FIG. 26 when needed, to select the unused port and execute a transmission process.

On the other hand, when there is no unused port and the judgment in step S2504 is NO, the routing controller 1003 executes the following control. That is, the routing controller 1003 detects the RxPort (reception port) (FIG. 24) of the entry having the SRC ID corresponding to the SRC ID (FIG. 12(*a*)) of the received frame (step S2505). Then, the routing controller 1003 transmits the received frame to the extracted first reception port (step S2506).

FIG. 26 is a flowchart illustrating the control in a case in which, when a new port is selected to relay the received frame including the case of the loop status, a value other than the initial value (0xFF) is set as the source WaitNo. (1201 in FIG. 12(*a*)) of the received frame.

The core relay node 102 executes the following control operation, when the WaitNo. is set for each sensor relay node 103 as illustrated in FIG. 23 based on the flowchart in FIG. 14. That is, the core relay node 102 recognizes the WaitNo. informed from the a sensor relay node 103 and kept, when transmitting data to the target sensor relay node 103 in the sensor relay node group 100. Then, the core relay node 102 generates a frame in which the WaitNo. is set as the destination WaitNo. (1201 in FIG. 12(*a*)) and the address of the target sensor relay node 103 is set as the DST ID, and transmits the frame.

In this case, in the routing process at the routing controller 1003 of each sensor relay node 103, when there is a need for selecting a new port, the judgment in step S2509 in FIG. 25 becomes NO. Then, the control process in the flowchart in FIG. 26 is executed.

The routing process algorithm in the flowchart in FIG. 26 is as follows.

(1) Destination WaitNo. of the received frame is larger than the local node WaitNo.

(1*a*) Select an unused port to which a larger WaitNo. than the local node WaitNo. is set and transmit the received frame via the selected port.

(1*b*) When there is no corresponding port, set the Loop flag in the FID table 1006 and return the received frame to the reception port.

(2) Destination WaitNo. of the received frame is smaller than the local node WaitNo.

(2*a*) Select an unused port to which a smaller WaitNo. than the local node WaitNo. is set and transmit the received frame via the selected port.

(2*b*) When there is no corresponding port, set the Loop flag in the FID table 1006 and return the received frame to the reception port.

(3) Destination WaitNo. of the received frame is equal to the local node WaitNo.

(3*a*) Receive the frame if corresponding to the local node ID.

(3*b*) If not corresponding to the local node ID, set the Loop flag in the FID table 1006 and return the received frame to the reception port.

More specifically, the operation is as follows. The routing controller 1003 judges whether or not the destination WaitNo. of the received frame is larger than the local node WaitNo. (FIG. 11) set in the WaitNo. table in the WaitNo. controller 1004 (step S2601). This corresponds to the condition judgment in (1) above.

When the judgment in step S2601 is YES, the routing controller 1003 extracts WaitNo. corresponding to the port that is currently unused from the WaitNo. table (FIG. 11). Then, the routing controller 1003 judges whether or not the WaitNo. of the unused port is larger than the local node WaitNo. (step S2602).

When the judgment in step S2602 is YES, the routing controller 1003 executes the following control. That is, the routing controller 1003 executes the processes in step S2510-S2512 in FIG. 25 described above, to select the unused port to which a WaitNo. larger than the local node WaitNo. is set and execute a transmission process.

When the judgment in step S2602 is NO, the routing controller 1003 judges whether or not the Loop flag in the FID table 1006 is "ON" (step S2605). When the Loop flag is "ON" and the judgment in step S2605 is YES, a sensor relay node 103 to which the received frame is to be transmitted does not exist in the connection destination of the local node. Therefore, the routing controller 1003 returns the received frame via the port at which the frame arrived (step S2606).

On the other hand, when the Loop flag is "OFF" and the judgment in step S2605 is NO, the routing controller 1003 turns the Loop flag of the FID table 1006 "ON" (step S2607). After that, the routing controller 1003 detects, from the FID table 1006, the RxPort (reception port) (FIG. 24) of an entry having the SRC ID that corresponds to the SRC ID (FIG. 12(*a*)) of the received frame (step S2608). Then, the routing controller 1003 returns the received frame via the extracted first port (step S2608).

When the judgment in step S2601 is NO, the routing controller 1003 judges whether or not the destination WaitNo. in the received frame is smaller than the local node WaitNo. (FIG. 11) set in the WaitNo. table (step S2603). This corresponds to the condition judgment in (2) above.

When the judgment in step S2603 is YES, the routing controller 1003 extracts the WaitNo. corresponding to the port that is currently unused, from the WaitNo. table (FIG. 11). Then, the routing controller 1003 judges whether or not the WaitNo. of the unused port is smaller than the local node WaitNo. (step S2604).

When the judgment in S2604 is YES, the routing controller 1003 performs the following control. That is, the routing controller 1003 executes the processes in step S2510-S2512 in FIG. 25 described above, to select the unused port to which a smaller wait No. than the local node WaitNo. and execute a transmission process.

When the judgment in step S2604 is NO, the routing controller 1003 judges the Loop flag in the FID table 1006, and then executes the processes in S2605-S2609 to transmit the received frame back to the reception port corresponding to the judgment in S2605.

Meanwhile, the judgment in step S2603 being NO, that is, when the destination WaitNo. in the received frame and the local node WaitNo. are equal, corresponds to the condition (3) above. In this case also, the routing controller 1003 executes the processes in S2605-S2609 to transmit the received frame back to the reception port corresponding to it.

By the routing process illustrated in the flowcharts in FIG. 25 and FIG. 26, the routing controller 1003 executes the following control. That is, the routing controller 1003 selects the path with the smallest hop count, based on the destination WaitNo. in the received frame, the local node WaitNo. registered in the WaitNo. table of the local node and the WaitNo. of the connection destination node of each port.

Figure 27:
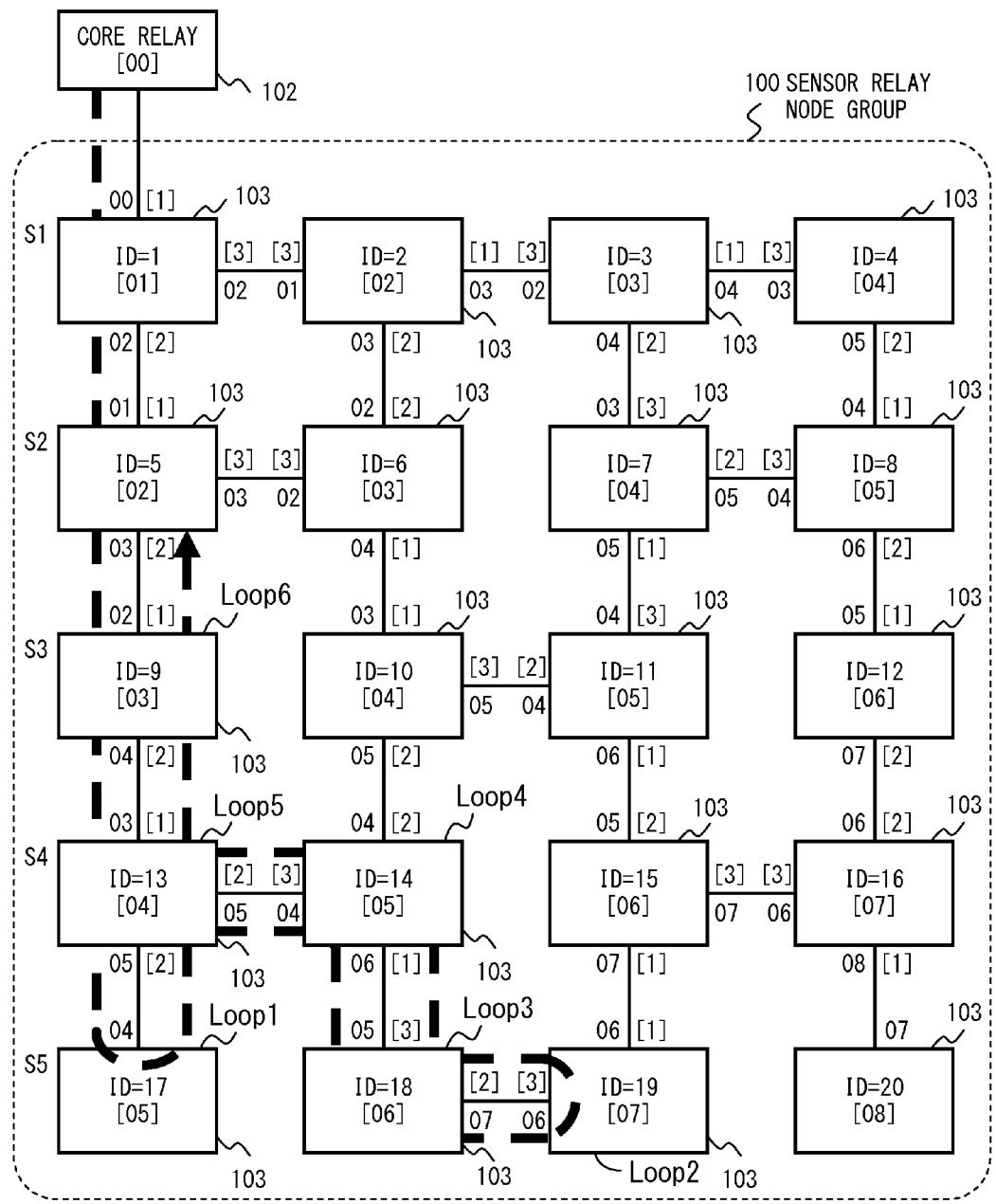
FIG. 27 is an illustration diagram (loop control) of the routing process.
Figure 28:
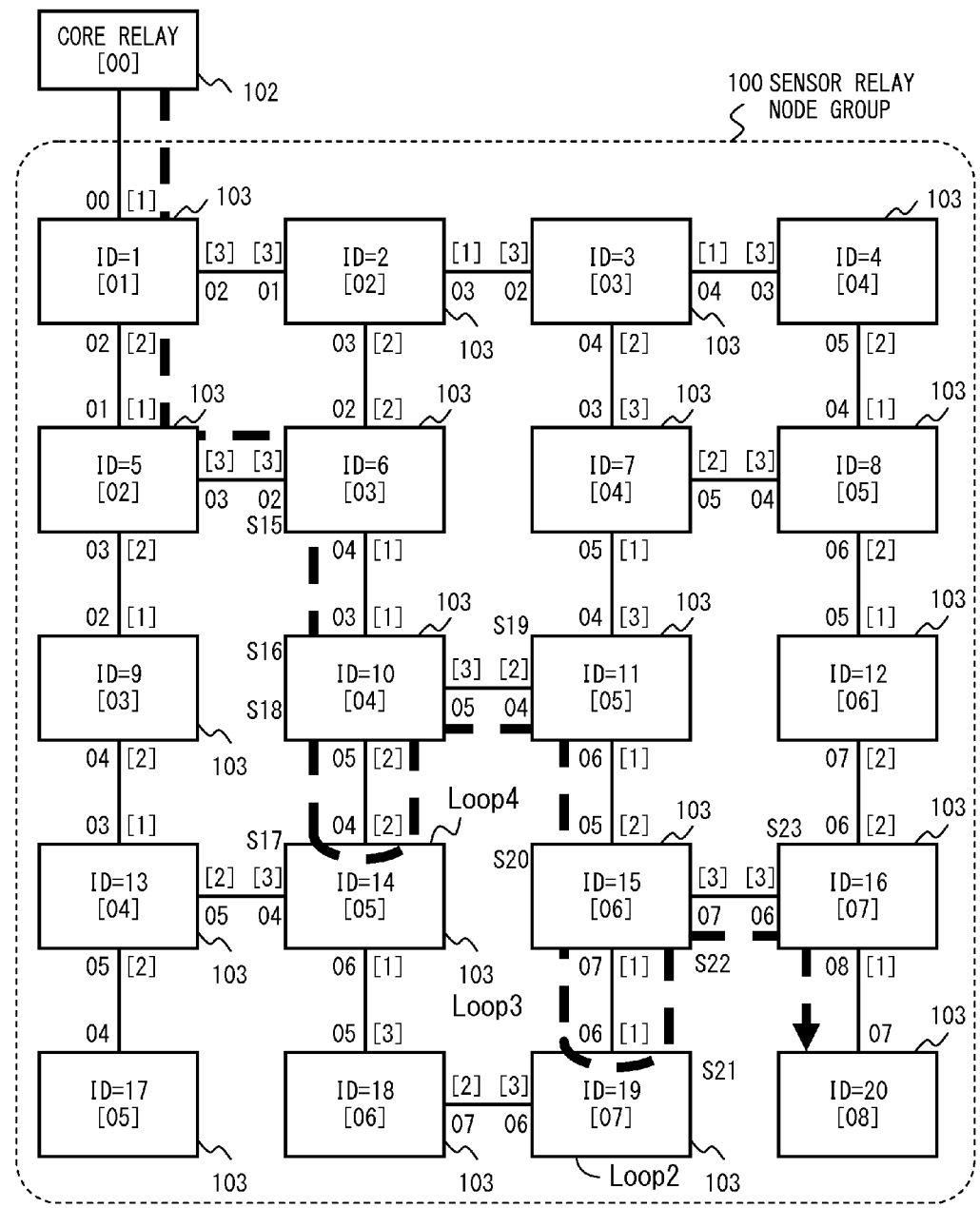
FIG. 28 is an illustration diagram (retry transmission) of the routing process.
Figure 29:
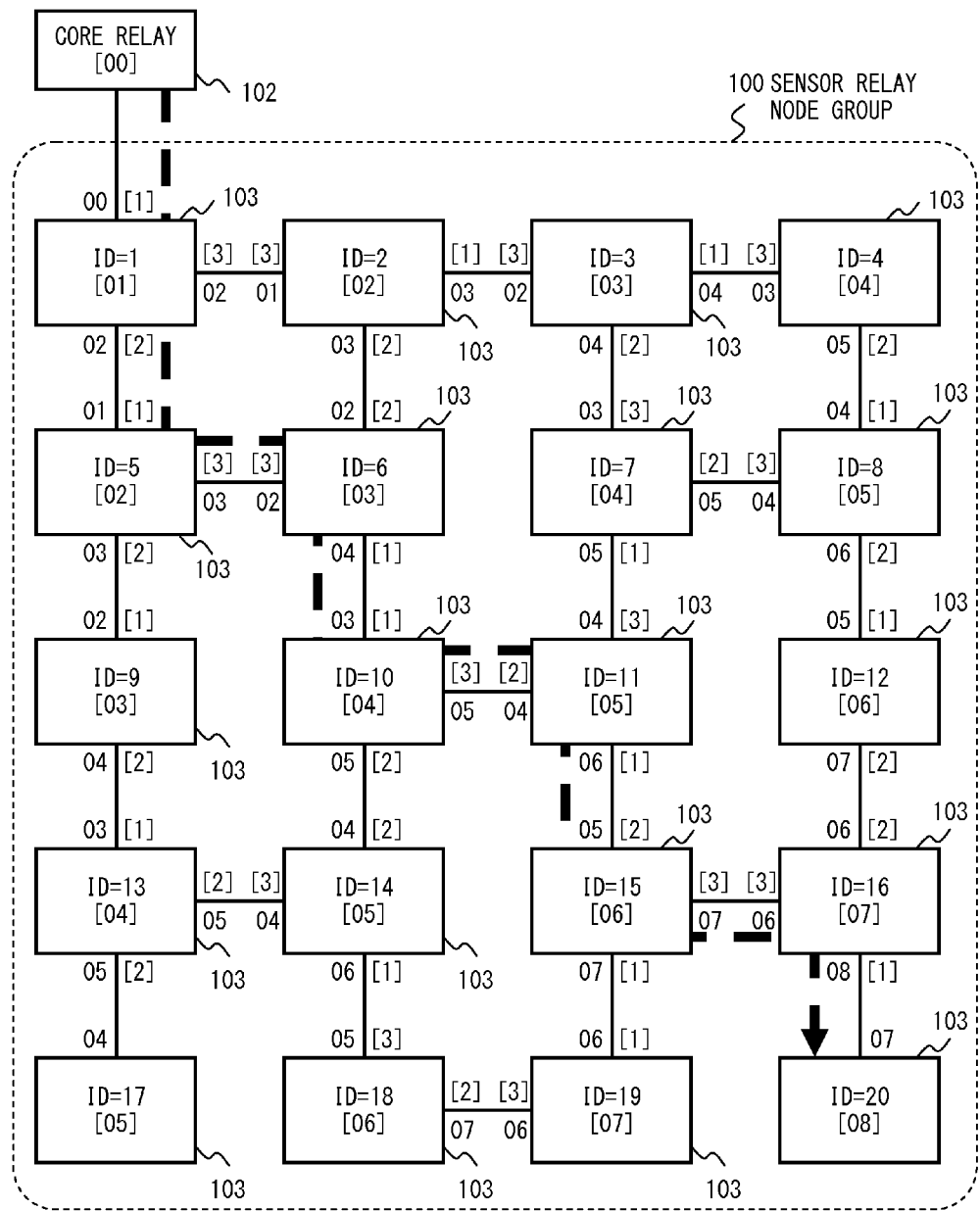
FIG. 29 is an illustration diagram (path establishment) of the routing process.

FIG. 27 through FIG. 29 are illustration diagrams of the routing process described above. The configuration illustrated in FIG. 27 through FIG. 29 is based on the system configuration illustrated in FIG. 1.

The core relay node 102 has recognized the WaitNo. of each sensor relay node 103 (step S1410 in FIG. 14). When transmitting the frame to the sensor relay node 103-ID20, the core relay node 102 stores destination WaitNo. (1201 in FIG. 12(a))=0x08 in the frame and transmits it, where 0x08 is the WaitNo. set in the sensor relay node 103-ID20 by the WaitNo. update process according to a synchronization request illustrated in the flowchart in FIG. 14 described above.

In the drawing, numbers in brackets [1] [2] [3] and the like described near the communication line connected to each sensor relay node 103 represent the port number of each sensor relay node 103. Numbers 01-08 and the like displayed alongside each port number represent the WaitNo. of the port indicated by each port number registered in the WaitNo. table (FIG. 11), and S1, S2, S3 ... indicate the order of processing.

In FIG. 27, in S1 through S4, at each of the sensor relay node 103-ID1, 103-ID5, 103-ID9 and 103-ID13, the port of the larger WaitNo. is selected and the received frame is forwarded via the selected port. This process is executed in the control in which the judgment in S2602 in FIG. 26 becomes YES.

At the sensor relay node 103-ID17, since there is no destination, the received frame is sent back to the sensor relay node 103-ID13 (indication of Loop1 on S5). In this node 103-ID13, since there is another larger WaitNo. port, the received frame is forwarded to the sensor relay node 103-ID14 (S6). This process is performed in the control of S2501, S2502, S2503, S2504, S2509, S2601, S2602, S2510, S2511, S2512, and S2513.

After that, in S7, S8, the larger WaitNo. port is selected, and the frame is forwarded to the sensor relay nodes 103-ID18 and 103-ID19. Then, since there is no destination in the process at the sensor relay node 103-ID19, the received frame is returned to the sensor relay node 103-ID19 (S9).

After that, in S10, S11, S12, S13, the Loop status is detected at each of the sensor relay nodes 103-ID18, 103-ID14, 103-ID13 and 103-ID9, respectively (indication of Loops 2-6). This process is performed in the control of steps S2501, S2502, S2503, S2504, S2505, and S2506.

As a result, the received frame is returned to sensor relay node 103-ID5. At the sensor relay node 103-ID5, since there is another larger WaitNo. port, the received frame is transmitted to the sensor relay node 103-ID6 (S14).

Moving to FIG. 28, as the larger WaitNo. is selected in S15, S16, the received frame is sequentially forwarded to the sensor relay nodes 103-ID10 and 103-ID14. However, since there is no destination in the process at the sensor relay node 103-ID14, the received frame is returned to the sensor relay node 103-ID10 (indicated as Loop4 on S17).

At the sensor relay node 103-ID10, since there is another larger WaitNo. port, the received frame is transmitted to the sensor relay node 103-ID11 (S18).

After that, as the larger WaitNo. is selected in S19, S20, the received frame is sequentially forwarded to the sensor relay nodes 103-ID15 and 103-ID19. However, since there is no destination in the process at the sensor relay node 103-ID19, the received frame is returned to the sensor relay node 103-ID15 (indicated as Loop2 on S21).

At the sensor relay node 103-ID15, since there is another larger WaitNo. port, the received frame is transmitted to the sensor relay node 103-ID16 (S22).

Lastly, as the larger WaitNo. is selected in S23, the received frame is forwarded to the sensor relay node 103-ID20, and the frame is received by the sensor relay node 103-ID20.

As a result of the routing described above, the path from the core relay node 102 to the sensor relay node 103-ID20 is decided as the path indicated as the broken line in FIG. 29. That is, the relay is sequentially performed by the sensor relay nodes 103-ID1, 103-ID5, 103-ID6, 103-ID10, 103-ID11, 103-ID15, and 103-ID16. As is understood by comparing FIG. 29 and FIG. 2, the path decided by the routing process described above is an optimal path with the smallest hop count from the core relay node 102 to the sensor relay node 103-ID20.

By the WaitNo. update process according to a synchronization request illustrated in FIG. 14, as illustrated in FIG. 23, at each sensor relay node 103, the WaitNo. represents the smallest hop count from the core relay node 102. Then, by the routing process illustrated in FIG. 25, FIG. 26, each sensor relay node 103 performs the following control until the destination WaitNo. corresponding to the target sensor relay node 103 set in the received frame is attained. That is, each sensor relay node 103 operates autonomously so as to output the received frame to a port to which an adjacent node having a larger WaitNo, than the local node WaitNo. This control is enabled by providing the WaitNo. table to store the local node WaitNo. and the WaitNo. of the adjacent node for each port in each sensor relay node 103. In addition, each sensor relay node 103 is able to perform the appropriate loop suppression process while performing control so that the hop count does not become redundant by use of the Loop flag stored in the FID table 1006.

Meanwhile, when the first frame is transmitted, as illustrated in FIG. 27 and FIG. 28, the selection operation of the path is repeated until the optimal path is obtained. However, as illustrated in FIG. 29, once the optimal path is decided, the path information is stored in the PS table 1005 (FIG. 4) of each sensor relay node 103 on the optimal path, as an entry in which the DST ID of the sensor relay node 103-ID20 is registered. Upon receiving subsequent frames, each sensor relay node 103 on the path searches the entry corresponding to the DST ID of the received frame on the PS table 1005. Then, the sensor relay node 103 forwards the received frame by selecting the port to which the "used status" is set.

FIG. 30A and FIG. 30B illustrate the status transmission table of the PS table and the FID table at each sensor relay node 103 in the control operations from FIG. 27 to FIG. 29. In the explanation below, it is assumed that the description "entry S1" represents the line in which the value of leftmost "No." field in table in FIG. 30A and FIG. 30B is "S1". The same applies to the entries S2-S23. In addition, the P1, P2, P3 fields in the PS table illustrated in FIG. 4 and in the FID table illustrated in FIG. 23 are described as "Port1" "Port2" "Port3" in FIG. 30A and FIG. 30B. Furthermore, the "unused status" "used status" "loop status" and "link-disconnected status" set in the PS table illustrated in FIG. 4 are described as "unused" "used" "loop" and "link-disconnected", respectively, in FIG. 30A. In addition, the statuses "no-transmission port" "transmitting port" "loop port" and "reserve" set in the FID table illustrated in FIG. 24 are described as "no-transmission" "transmitting" "loop" and "Reserve", respectively, in FIG. 30B.

According to the status transitions S1-S4 in FIG. 27, the respective entries S1-S4 described below are registered in each PS table 1005 of each of the sensor relay nodes 103-ID1, 103-ID5, 103-ID9 and 103-ID13 (FIG. 4). That is, in the respective entries S1-S4 of the PS table 1005, a destination address of the sensor relay nodes 103-ID20 extracted from the DST ID field of the received frame is set in the DST ID field. In the respective entries S1-S4 of the PS table 1005, "used" is registered in the P2 (Port2) field corresponding to the port 2 being the output port in each sensor relay node 103. Furthermore, in each of the sensor relay nodes 103-ID1, 103-ID5 and 103-ID13, in P1 (Port1) and P3 (Port3) fields of the respective entries S1, S2, S4 of the PS table, "unused" is registered. In addition, in the sensor relay node 103-ID9, in the P1 (Port1) field of the entry S3 of the PS table, "unused" is registered, and in the P3 (Port3) field, "link-disconnected" is registered since no other node is connected.

Meanwhile, according to the status transitions S1-S4 in FIG. 27, in each FID table of each of the sensor relay nodes 103-ID1, 103-ID5, 103-ID9 and 103-ID13 (FIG. 24), the respective entries S1-S4 described below are registered. That is, in the respective entries S1-S4 of the FID table, in the SRC ID field, the source address of the core relay node 102 extracted from the SRC ID field (FIG. 12(a)) of the received frame is registered. In addition, in the respective entries S1-S4 of the FID table, in the FID field, FID:0x0001 extracted from the FID field of the received frame (FIG. 12(a)) is registered. In addition, in the respective entries S1-S4 of the FID table, in the RxPort field port number Port1 corresponding to the port 1 being the reception port in each sensor relay node 103 is registered. In addition, in the respective entries S1-S4 of the FID table, "transmitting" is registered in the P2 (Port2) field corresponding to the port 2 being the output port in each sensor relay node 103 is registered. Furthermore, in each of the sensor relay nodes 103-ID1, 103-ID5 and 103-ID13, in the P1 (Port1) and P3 (Port3) fields of the respective entries S1, S2, S4 of the FID table, "no-transmission" is registered. In addition, in the sensor relay node 103-ID9, "no-transmission" is registered in the P1 (Port1) field of the entry S3 of the FID table, and in the P3 (Port3) field, "Reserve" is registered as no other node is connected.

In the status transition of S5 in FIG. 27, in the sensor relay node 103-ID17, P2 (Port2) and P3 (Port3) are link-disconnected. Therefore, to indicate that it is impossible to reach the target sensor relay node 103-ID20 from the local node, Loop flag="ON" is set in the entry S5 of the FID table 1006 of the sensor relay node 103-ID17. Similarly in each status transition of S9-S13, S17, S21 in FIG. 27, some of the ports are link-disconnected, or there is no larger WaitNo. port available for output. Therefore, in each entry of the FID table 1006 of these sensor relay nodes 103, Loop flag="ON" is set as well. At a sensor relay node 103 in which another port that is available for forwarding remains, Loop flag="OFF" is set in each entry of the FID table 1006.

In the status transition of S5 in FIG. 27, the frame is returned to the sensor relay node 103-ID13. As a result, the status of the PS table and the FID table of the sensor relay node 103-ID13 changes from the status of the entry S4 to the status of the entry S6 in FIG. 30A and FIG. 30B. That is, in the entry S6 (=entry S4) in the PS table in which the same DST ID as in the received frame, since a loop is detected at the port 2, the status of the P2 (Port2) field is updated from "used' to "loop". In addition, since the port 3 has become the new output port, the status of the P3 (Port3) field is updated from "unused" to "used". Meanwhile, in the entry S6 (=entry S4) in which the same SRC ID and FID as in the received frame are registered in the FID table 1006, since a loop is detected at the port 2, the status of the P2 (Port2) field is updated from "transmitting" to "loop port". In addition, since the port 3 has become the new output port, the status of the P3 (Port3) field is updated from "no-transmission" to "transmitting".

In the case other than the status transitions described above, in a similar manner as described above, the contents of the PS table 1005 and the FID table 1006 are updated.

As is understood from FIG. 30A and FIG. 30B, due to the existence of a link-disconnected ports and the absence of a larger WaitNo. port, the Loop flag of the FID table 1006 is set to "ON" at the sensor relay node 103 which is incapable of forwarding a frame to the target sensor relay node 103. Accordingly, the loop status is avoided, and also the selection of a path having a larger hop count is also avoided.

Figure 31:
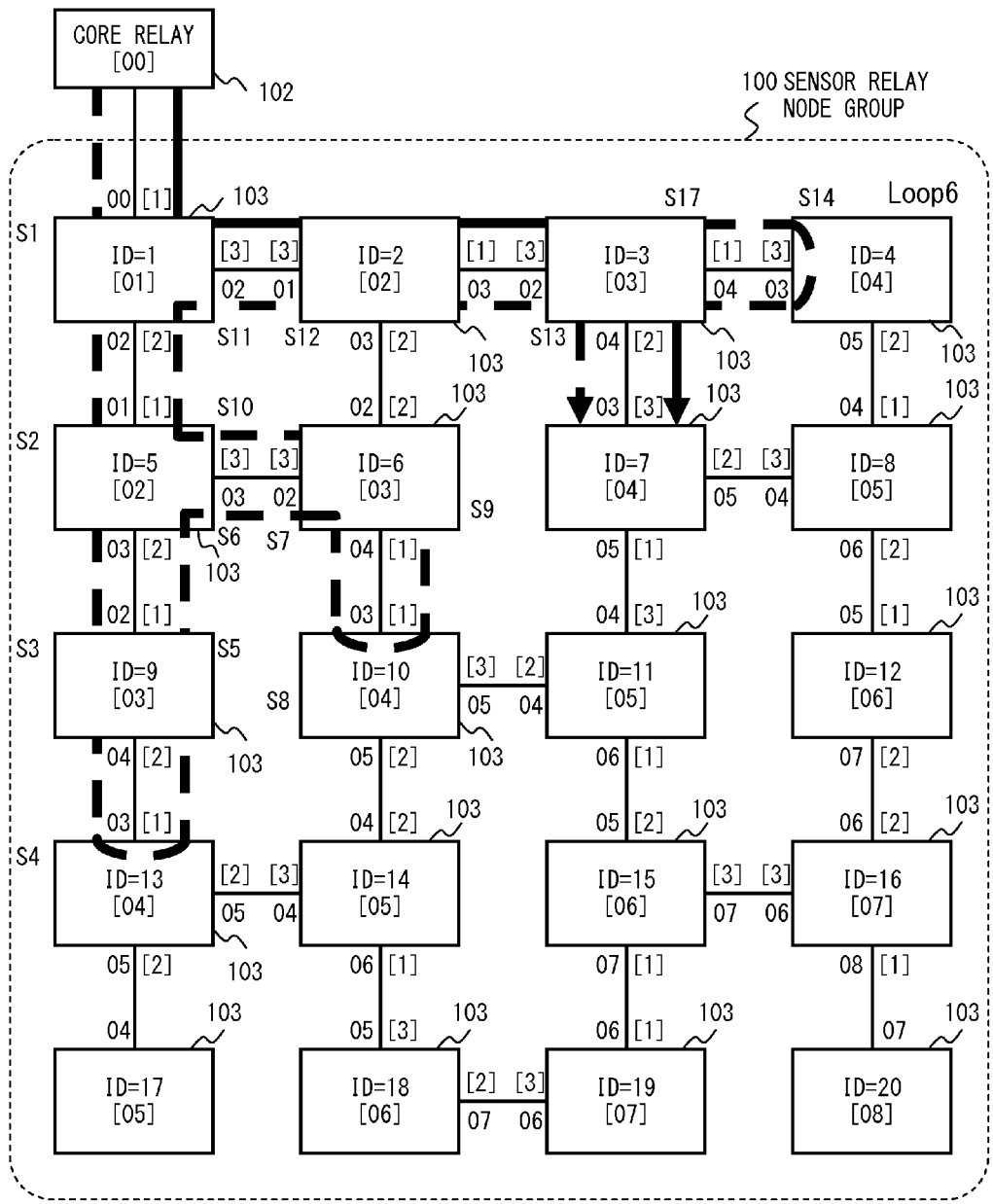
FIG. 31 is an illustration diagram (transmission to an intermediate sensor) of the routing process.

FIG. 31 illustrates the routing process in a case in which frame transmission is performed from the core relay node 102 to the sensor relay node 103-ID7 in the middle of the sensor relay node group 100.

In S4, S8, at the sensor relay node 103-ID13 and 103-ID10, the destination WaitNo. of the received frame and the local node WaitNo. stored in the WaitNo. table are both 0x04. In addition, the local node address is different from the DST ID of the received frame. Therefore, after the judgment in step S1305 becomes NO, the received frame is returned via the received port following steps S2601, S2603, and S2605-S2609. Thus, according to the status transition S4-S10, the received frame is sent back to the sensor relay node 103-ID1.

In S11, S12, S13, at each of the sensor relay nodes 103-ID1, 103-ID2 and 103-ID3, the larger WaitNo. port is selected and the received frame is forwarded via the selected port. The process is performed in the control in which the judgment in step S2602 in FIG. 26 becomes YES.

Meanwhile, in S12, at the sensor relay node 103-ID2, since there are two ports of the larger WaitNo. ports, according to step S2510 in FIG. 25, the smaller number port among the two ports is selected, and the received frame is forwarded to the sensor relay node 103-ID3 via the selected port.

In S14, at the sensor relay node 103-ID4, destination WaitNo. of the received frame and the local node WaitNo. of the WaitNo. table are 0x04. In addition, the local node address is different from the DST ID of the received frame. Therefore, after the judgment in step S1305 becomes NO, the received frame is returned via the received port following steps S2601, S2603, and S2605-S2609.

In S15, at the sensor relay node 103-ID3, another larger WaitNo. port is selected, and the received frame reaches the target sensor relay node 103-ID7, and the sensor relay node 103-ID7 receives the frame.

As a result of the routing process above, the path with the smallest hop count indicated with the thick solid line is established.

Figure 32:
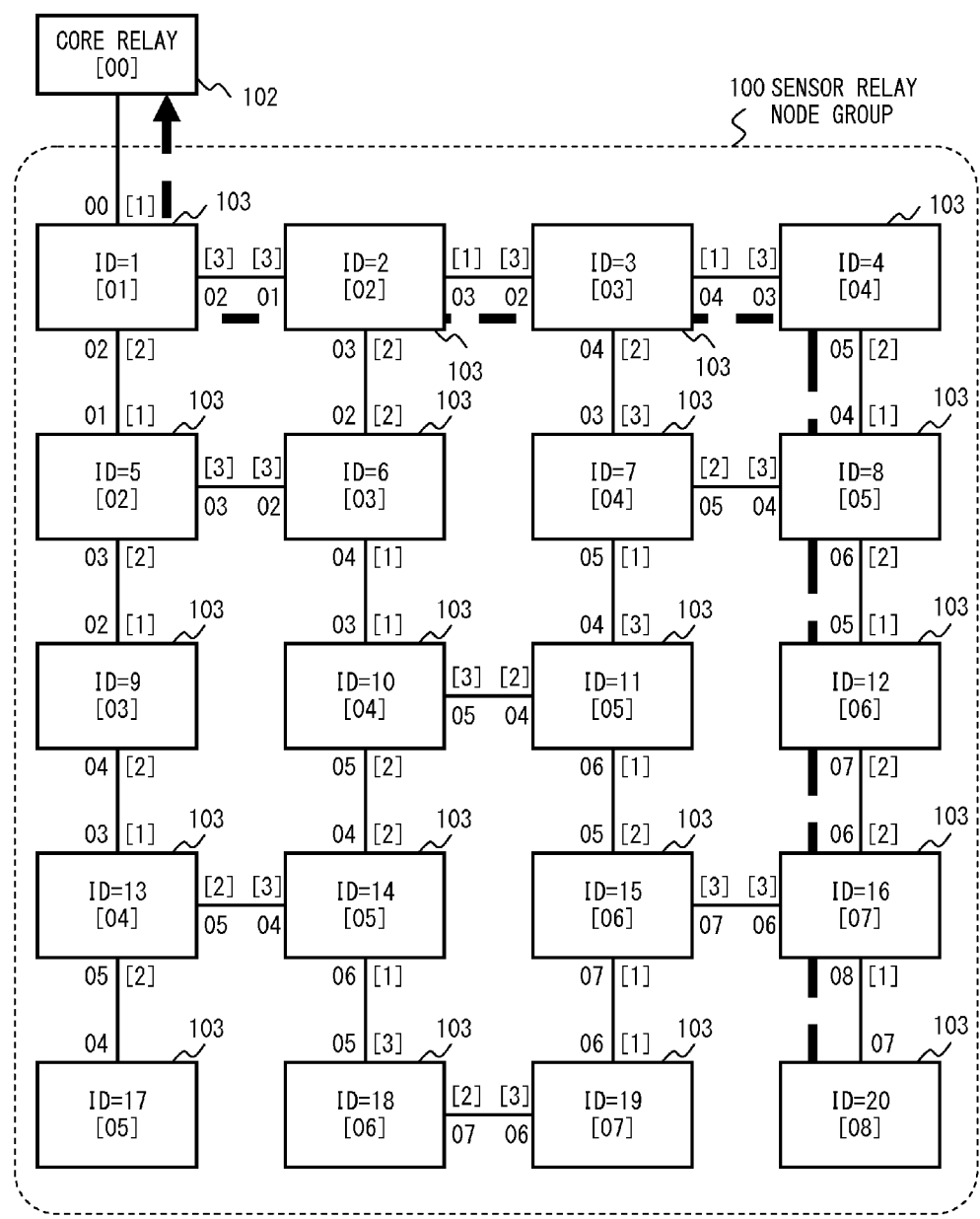
FIG. 32 is an illustration diagram (transmission to a core relay node) of the routing process.

FIG. 32 illustrates an example of frame transmission from the sensor relay node 103-ID20 to the core relay node 102.

In the present embodiment, since data communication between the core relay node 102 and the sensor relay node 103 is mainly performed, the transmission from the sensor relay node 103 to a node having a smaller WaitNo. than the local node becomes the transmission to the core relay node 102.

In the frame transmitted from the sensor relay node 103-ID20, the address of the core relay node 102 is set as the DST ID, and the WaitNo.=0x00 of the core relay node 102 is set as the destination WaitNo. (FIG. 12(*a*)).

For the frame transmitted from sensor relay node 103-ID20, at each of the sensor relay nodes 103-ID16, 103-ID12, 103-ID8, 103-ID4, 103-ID3, 103-ID2 and 103-ID1, the following control is performed. That is, the respective local node WaitNo.=0x06, 0x05, 0x04, 0x03, 0x02, 0x01 set in the WaitNo. table of the respective local nodes are compared with the destination WaitNo.=0x00 stored in the frame. The destination WaitNo. of the received frame always becomes smaller than the respective local node WaitNo. In this case, each sensor relay node 103 outputs the received frame via a port to which a smaller number of WaitNo. than the local node WaitNo. This is performed by the control by S2601, S2603, S2604, S2510, S2511, S2512, and S2513.

As a result of the routing process described above, the path with the smallest hop count is established in the frame transmission from the sensor relay node 103 to the core relay node 102 as well.

Figure 33:
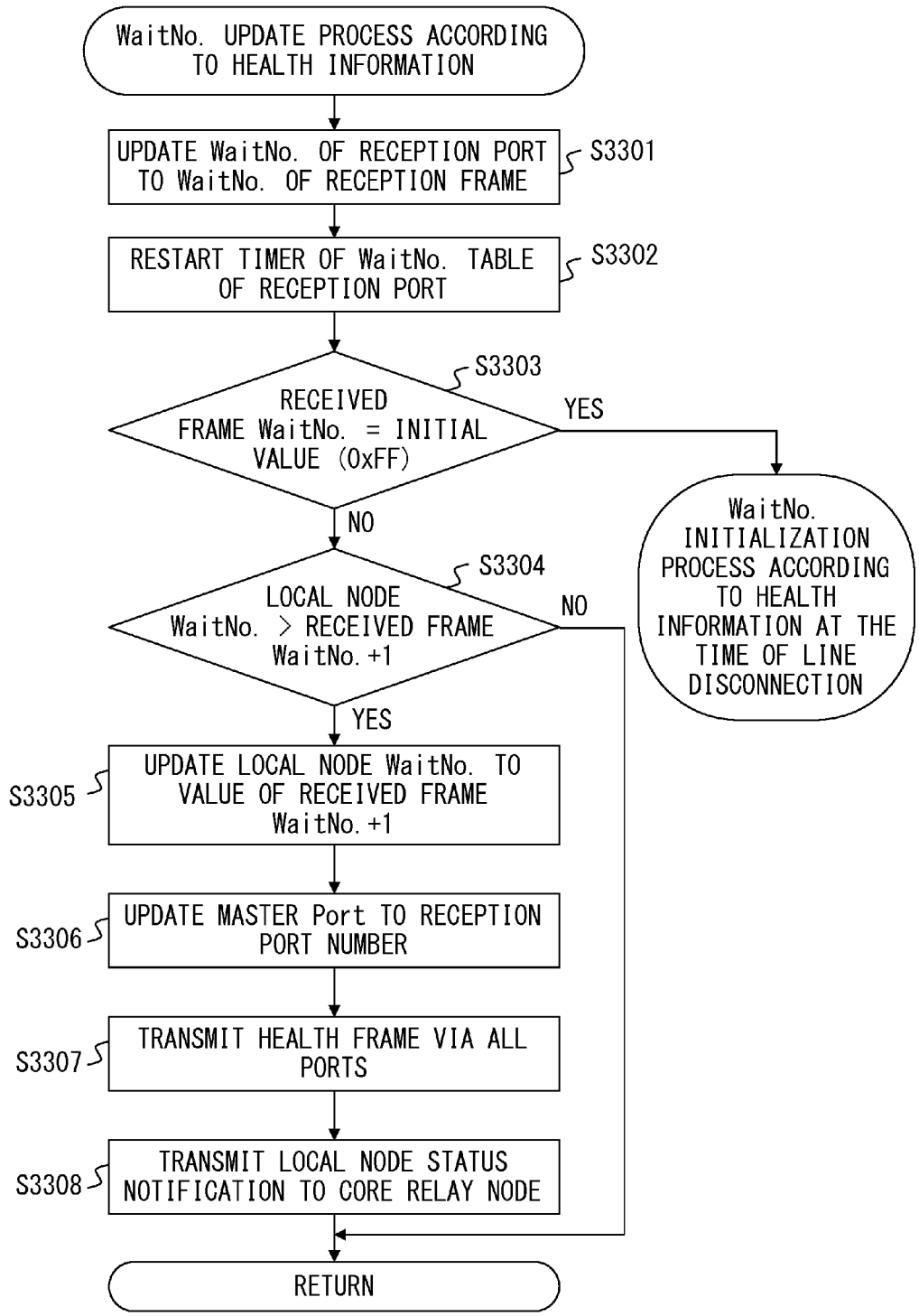
FIG. 33 is a flowchart illustrating a WaitNo. update process by health information.

FIG. 33 is a flowchart illustrating the WaitNo. update process according to health information when the received frame is judged as a health frame in step S1303 in FIG. 12. The routing controller 1003 in FIG. 10 accesses the WaitNo. table illustrated in FIG. 11 managed by the WaitNo. controller 1004. Then, among WaitNo. P1, P2 and P3, the WaitNo. corresponding to the reception port at which the received frame arrived is updated to the source WaitNo. (1201 in FIG. 12(*b*)) stored in the received frame (step S3301).

Along with this, the routing controller 1003 restarts the timer corresponding to the port whose WaitNo. has been updated in the WaitNo. table (step S3302). Accordingly, for the corresponding port, whether or not a new health frame is received is monitored for the period of time corresponding to the newly set timer value (step S3802 in FIG. 38 described later).

The routing controller 1003 judges whether the source WaitNo. (1201 in FIG. 12(*b*)) in the received frame is equal to the initial value (0xFF) (step S3303).

When the source WaitNo. in the received frame is equal to the initial value and the judgment in step S3303 is YES, the routing controller 1003 executes a WaitNo. update process according to health information at the time of occurrence of line disconnection illustrated in the flowchart in FIG. 45. This process is described later.

When the source WaitNo. in the received frame is not equal to the initial value and the judgment in step S3303 is NO, the routing controller 1003 performs the following process. That is, the routing controller 1003 judges whether or not the local node WaitNo. in the WaitNo. table is larger than the source WaitNo. in the received frame plus 1 (step S3304).

When the local node WaitNo. in the WaitNo. table is not larger than the source WaitNo. in the received frame plus 1 and the judgment in step S3304 is NO, the routing controller 1003 ignores the received frame, terminates the WaitNo. update process according to health information in FIG. 33, and returns to the detection process of frame reception by the ad-hoc routing control device 1001.

When the local node WaitNo. in the WaitNo. table is larger than the source WaitNo. in the received frame plus 1 and the judgment in step S3304 is YES, the routing controller 1003 executes the following process. That is, the routing controller 1003 updates the local node WaitNo. (FIG. 11) in the WaitNo. table to the value of the source WaitNo. in the received frame plus 1 (step S3305).

Furthermore, the routing controller 1003 updates the value of the master Port (FIG. 11) in the WaitNo. table to the port number of the wired ad-hoc network port 1016 at which the received frame arrived (step S3306).

Next, according to the control from the routing controller 1003, the frame processor 1009 sets the value of the source WaitNo. in the health frame to the local node WaitNo. in the WaitNo. table. Then, the frame processor 1009 controls the transmission frame controller 1011 to make the health frame output via all the wired ad-hoc network ports 1016 (step S3307).

Along with this, according to the control from the routing controller 1003, the frame processor 1009 controls the transmission frame controller 1011 to make it transmit the local node status notification frame to the core relay node 102 (step S3308). The local node status notification frame has a data format illustrated in FIG. 12(*d*). In the local node status notification frame, the address of the core relay node 102 is set as the DST ID. In the SRC ID, the address of the local node is set. In addition, in the MAC data 302, the source WaitNo. set in the received frame is set as the destination WaitNo. 1201. In addition to this, in the local node status notification frame, in the MAC data 302, the local node WaitNo. stored in the WaitNo. table 1007 is set as 2-byte source WaitNo. The routing controller 1003 detects, in the PS table 1005 in FIG. 10, among the P1, P2, P3 fields of the entry in which the DST ID of the core relay node 102 is set as the DST ID, a field in which "used stats" (FIG. 4) is set. Then, the routing controller 1003 makes an instruction, to the transmission frame controller 1011 in FIG. 10, for output of the local node status notification frame via the wired ad-hoc network port 1016 corresponding to the detected field. By this process, by receiving the local node status notification frame from each sensor relay node 103, the core relay node 102 can detect the local node WaitNo. set in the WaitNo. table of each of the sensor relay nodes 103. The core relay node 102 keeps and manages the local node WaitNo. of each sensor relay node 103 in a table that is not particularly illustrated in the drawing.

After that, the routing controller 1003 terminates the WaitNo. update process according to health information in FIG. 33, and returns to the detection process of frame reception by the ad-hoc routing control device 1001.

By the WaitNo. update process according to health information explained above, a similar control to the case of the WaitNo. update process according to a synchronization request illustrated in the flowchart of FIG. 14 described above is performed. That is, in FIG. 1, the WaitNo. transmitted from the core relay node 102 is sequentially forwarded to each sensor relay node 103 in the sensor relay node group 100. During this operation, in each sensor relay node 103, the value of the source WaitNo. (1201 in FIG. 12(*c*)) in the synchronization request frame is incremented by 1 each time. The incremented WaitNo. is set as the local node WaitNo. in the WaitNo. table in the WaitNo. controller 1004 illustrated in FIG. 10. Furthermore, the synchronization request frame having the incremented WaitNo. is forwarded to the adjacent sensor relay node 103. As described above, in each of the sensor relay nodes 103, a WaitNo. corresponding to the hop count from the core relay node 102 is set as the local node WaitNo.

FIG. 34 through FIG. 37 are illustration diagrams illustrating specific examples of the WaitNo. update process according to health information described above. Hereinafter, using these illustration diagrams, the specific processing in the WaitNo. update process according to health information is explained. Meanwhile, the configuration illustrated in FIG. 34 through FIG. 37 is based on the system configuration illustrated in FIG. 1.

In FIG. 34, as the status transition S1, at the time of start-up, each sensor relay node 103 transmits a health frame in which the source WaitNo.=0xFF (1201 in FIG. 12(b)) is set, via all the wired ad-hoc network port 1016 (FIG. 10).

In status transition S2, the core relay node 102 transmits the health frame in which the source WaitNo.=0x00 is set to the sensor relay node 103-ID1.

In the status transition S3, the sensor relay node 103-ID1 that receives the health frame in which the source WaitNo.=0x00 is set performs the following control. That is, the sensor relay node 103-ID1 changes the local node WaitNo. stored in the WaitNo. table in the WaitNo. controller 1004 (FIG. 10) into "0x01". "0x01" is obtained by incrementing the source WaitNo. in the received health frame by 1.

In FIG. 35, the status transitions S1, S2 are the same as in the case of FIG. 34. The health frame is regularly transmitted from each sensor relay node 103 to the adjacent node.

In the status transition S4, the sensor relay node 103-ID1 transmits the health frame in which the source WaitNo.=0x01 is set to each of the sensor relay nodes 103-ID2 and 103-ID3.

In the status transition S5, each of the sensor relay nodes 103-ID2 and 103-ID3 that receives the health frame from the sensor relay node 103-ID1 performs the following control. That is, each of the sensor relay node 103-ID2 and 103-ID3 changes the local node WaitNo. stored in the WaitNo. table into "0x02". "0x02" is obtained by incrementing the source WaitNo. in the received health frame by 1.

In FIG. 36, the status transitions S1, S2, S4 are the same as in the case of FIG. 34, FIG. 35. In the status transition S6, each of the sensor relay nodes 103-ID2 and 103-ID3 transmits the health frame in which the source WaitNo.=0x02 is set to the sensor relay nodes 103-ID4 and 103-ID5.

In the status transition S7, each of the sensor relay nodes 103-ID4 and 103-ID5 that receives the health frame from the sensor relay nodes 103-ID2 and 103-ID3 performs the following control. That is, each of the sensor relay node 103-ID4 and 103-ID5 changes the local node WaitNo. stored in the WaitNo. table into "0x03". "0x03" is obtained by incrementing the source WaitNo. in the received health frame by 1.

Figure 37:
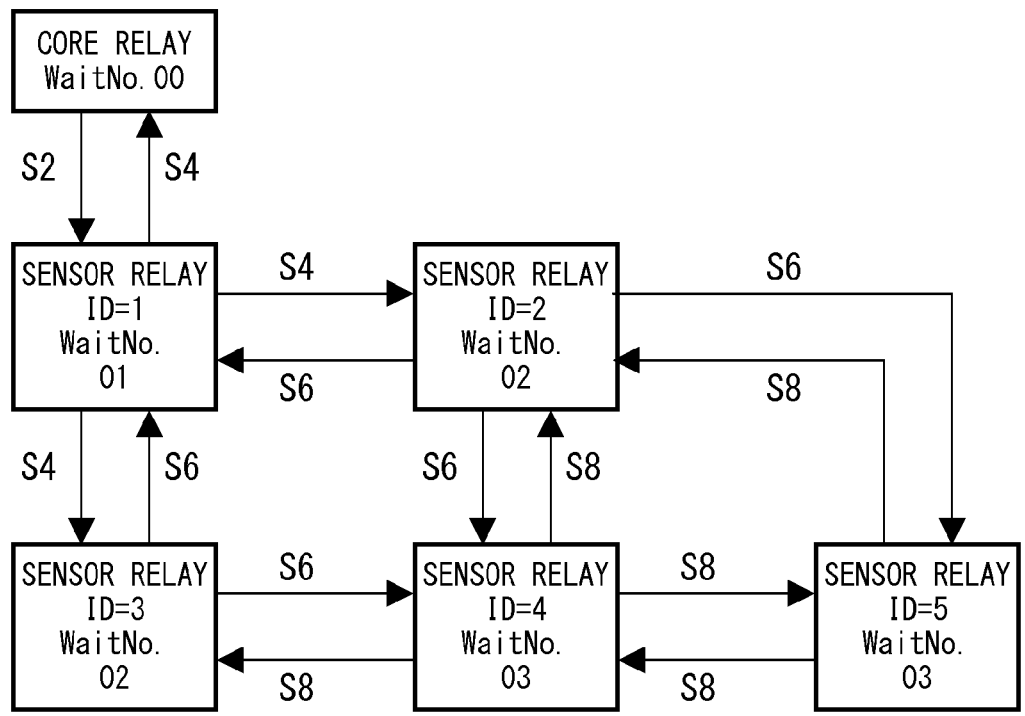

In FIG. 37, the status transitions S1, S2, S4, S6 are the same as in the case of FIG. 34, FIG. 35, FIG. 36. In the status transition S8, each of the sensor relay node 103-ID4 and 103-ID5 transmits the health frame in which the source WaitNo.=0x03 is set to each of the sensor relay node 103-ID2, 103-ID3, 103-ID4 and 103-ID5. At each of the sensor relay nodes 103 that receives the health frame from the sensor relay node 103-ID4 and 103-ID5, the destination WaitNo. of the received frame is larger than the local node WaitNo. Therefore, according to the judgment in step S3304 in FIG. 33 being NO, these health frames are ignored.

As described above, by the regular transmission of the health frame, the WaitNo. corresponding to the smallest hop count from the core relay node 102 is set at each sensor relay node 103.

Next, the processes of initialization and reconfiguration of the WaitNo. when line disconnection occurs in the ad-hoc network are described below.

FIG. 38 is a flowchart illustrating the operation of the sensor relay node 103 at the time when line disconnection is detected. Hereinafter, the process in the flowchart is explained.

The routing controller 1003 executes the respective processes of steps S3801 and S3802 repeatedly.

The routing controller 1003 in the ad-hoc routing control device 1001 judges whether or not a physical level failure is detected in the connection with the adjacent node by each wired ad-hoc network port 1016 in FIG. 10 (step S3801).

When no physical level failure is not detected and the judgment in step S3801 is NO, the routing controller 1003 judges the timeout that indicates whether or not the synchronization request frame or the health frame is received regularly (step S3802). Specifically, this judgment is performed as the operation to monitor the timer value for each port on the WaitNo. table in the WaitNo. controller 1004 in FIG. 10.

While the timer timeout of the regular frame reception has not occurred and the judgment in step S3802 is also NO, the routing controller 1003 performs the judgment in step S3801 and the judgment in step S3802 repeatedly.

When an event of either the detection of a physical level failure or the occurrence of the timer timeout of the regular frame reception occurs and the judgment in S3801 or the judgment in S3802 becomes YES, the routing controller 1003 executes the line disconnection process below.

The routing controller 1003 transmits a deletion notification frame (step S3803) to the core relay node 102. This enables the core relay node 102 to recognize the occurrence of line disconnection at the corresponding sensor relay node 103.

The routing controller 1003 judges whether or not, in the WaitNo. table, the local WaitNo. is larger than the WaitNo. of an adjacent node connected to any of the ports other than the reception port (step S3804).

When the local node WaitNo. is not larger than any WaitNo. of other port due to the line disconnection and the judgment in step S3804 is NO, the routing controller 1003 executes the following operation. That is, the routing controller 1003 first updates the local node WaitNo. on the WaitNo. table to the initial value (0xFF) (step S3807). Next, the routing controller 1003 updates the master Port on the WaitNo. table to the initial value (unused) (step S3808). After that, the process is shifted to step S3809.

On the other hand, when the local node WaitNo. is larger than WaitNo. of any other port and the judgment in step S3804 is YES, the routing controller 1003 executes the following operation. That is, the routing controller 1003 first increments the WaitNo. of the reception port of the smaller WaitNo. by 1, and updates the local node WaitNo. on the WaitNo. table with the incremented value (step S3805). Next, the routing controller 1003 updates, in the WaitNo. table, the master Port to the reception port number of the smaller WaitNo. (step S3806). After that, the process is shifted to step S3809.

After the process in steps S3805 and S3806 or steps S3807 and S3808, the routing controller 1003 performs the following control. That is, the routing controller 1003 judges whether or not the health frame has been transmitted, after the status of the WaitNo. table of the local node changes (step S3809). Then, the health frame has not been transmitted, the frame processor 1009 makes the transmission frame controller 1011 transmit the health frame via all the wired ad-hoc network ports 1016 according to the instruction from the routing controller 1003 (step S3810).

According to the control from the routing controller 1003, the frame processor 1009 controls the transmission frame controller 1011 to make it transmit the local node status notification frame to the core relay node 102 (step S3811). In the local node status notification frame, the local node WaitNo. updated in the WaitNo. table is set as the source WaitNo. (FIG. 12(d)). Accordingly, the core relay node 102 recognizes that the local node WaitNo. has been updated in the sensor relay node 103.

The routing controller 1003 judges whether or not the health frame has been all received from the adjacent nodes (step S3812).

When the judgment in step S3812 is NO, the routing controller 1003 waits for the reception of the health frame from adjacent sensor relay node 103 and executes the processes from step S3804 to step S3812 again, and updates the status of the local node (step S3813).

When the judgment in step S3812 is YES, the routing controller 1003 returns to the monitoring process in step S3801 and S3802.

By the control process of the flowchart illustrated in FIG. 38, the sensor relay node 103 can update the local node WaitNo. autonomously, according to the situation of the adjacent nodes, at the time of occurrence of line disconnection.

FIG. 39 is a flowchart illustrating a WaitNo. initialization process according to health information at the time of occurrence of line disconnection, executed when an initialized WaitNo. is received from another node by means of the health frame in the WaitNo. update process according to health information (FIG. 33) described above. Hereinafter, the process in the flowchart is explained.

When it is determined that the source WaitNo. (1201 in FIG. 12 (*b*)) in the received health frame is the initial value (0xFF) and the judgment in step S3303 in FIG. 33 descried above becomes YES, the process in the flowchart in FIG. 39 is executed.

The routing controller judges whether or not, in the WaitNo. table, the local WaitNo. is larger than the WaitNo. of an adjacent node connected to any of the ports other than the reception port (step S3901).

When the local node WaitNo. is not larger than any WaitNo. of other port according to the health information indicating the link disconnection from another node and the judgment in step S3901 is NO, the routing controller 1003 executes the following operation. That is, the routing controller 1003 first updates the local node WaitNo. on the WaitNo. table to the initial value (0xFF) (step S3902). Next, the routing controller 1003 updates the master Port on the WaitNo. table to the initial value (unused) (step S3903). After that, the process is shifted to step S3906.

When the local node WaitNo. is larger than WaitNo. of any other port according to the health information indicating the link disconnection from another node and the judgment in step S3901 is YES, the routing controller 1003 executes the following operation. That is, the routing controller 1003 first increments the WaitNo. of the reception port of the smaller WaitNo. by 1, and updates the local node WaitNo. on the WaitNo. table with the incremented value (step S3904). Next, the routing controller 1003 updates, in the WaitNo. table, the master Port to the reception port number of the smaller WaitNo. (step S3905). After that, the process is shifted to step S3906.

After the process in steps S3902 and S3903 or steps S3904 and S3905, the routing controller 1003 performs the following control. According to the instruction from the routing controller 1003, the frame processor 1009 makes the transmission frame controller 1011 transmit the health frame via all the wired ad-hoc network port 1016 (step S3906).

According to the control from the routing controller 1003, the frame processor 1009 controls the transmission frame controller 1011 to make it transmit the local node status notification frame to the core relay node 102 (step S3907). In the local node status notification frame, the local node WaitNo. updated in the WaitNo. table is set as the source WaitNo. (FIG. 12(*d*)). Accordingly, the core relay node 102 recognizes that the local node WaitNo. has been updated in the sensor relay node 103.

As described above, the routing controller 1003 can update the local node WaitNo. according to the situation of the adjacent node, when it receives notification of the occurrence of line disconnection from the adjacent node by means of the health frame.

Figure 40:
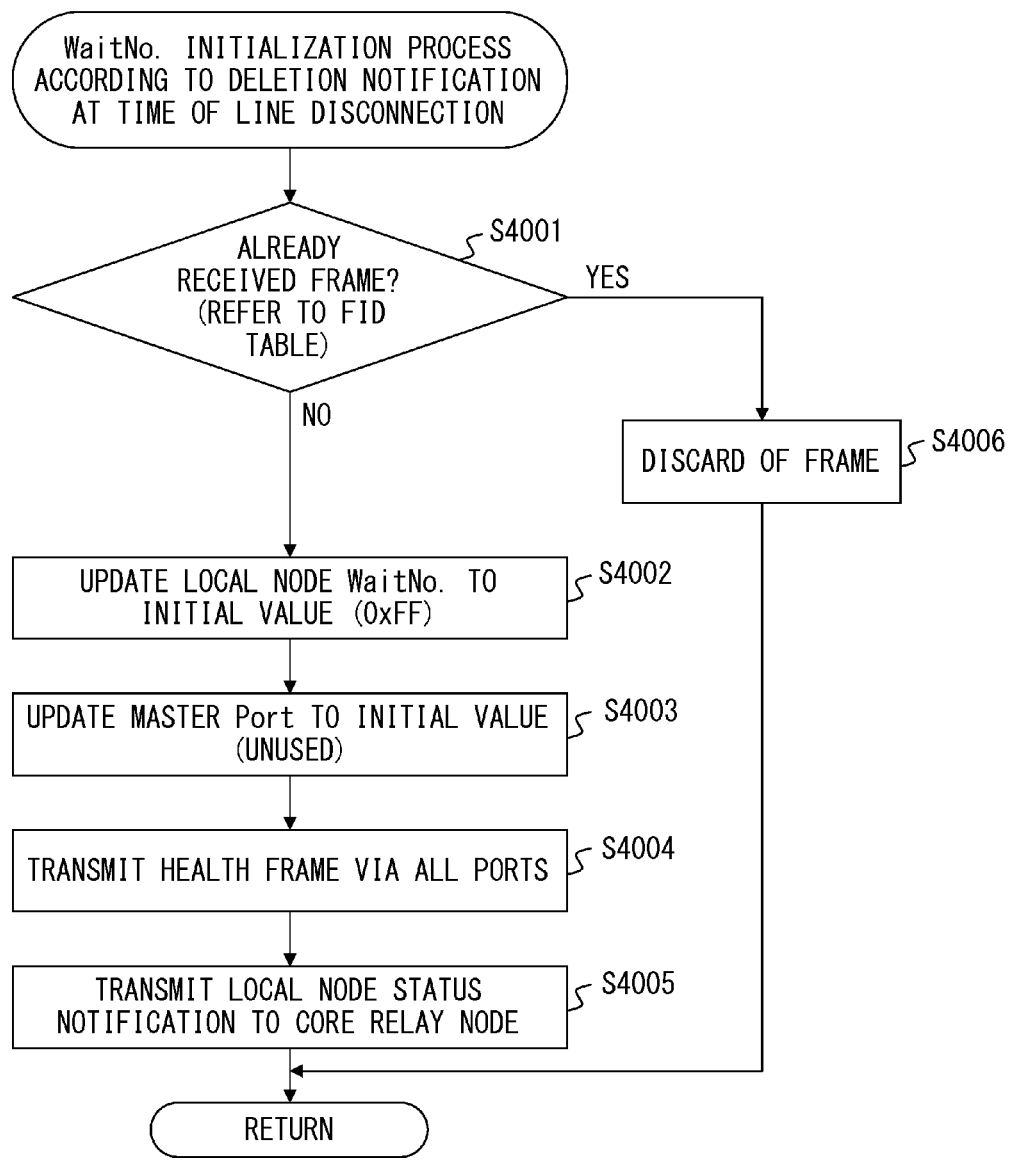
FIG. 40 is a flowchart illustrating WaitNo. initialization process by a deletion notification at the time of occurrence of line disconnection.

FIG. 40 is an operation flowchart illustrating the WaitNo. initialization process according to deletion notification at the time of occurrence of line disconnection, executed when reception of a deletion notification frame is detected in step S1304 in FIG. 13. The flowchart is also implemented as the processing function of the FPGA configured as the ad-hoc routing control device 1001 in FIG. 10.

Alternatively, when the ad-hoc routing control device 1001 is configured by a processor including a central processing unit and a memory, it is implemented as an operation in which the central processing unit executes a control program stored in the memory. Hereinafter, the process in the flowchart is explained.

The routing controller 1003 judges whether or not the received deletion notification frame is a frame that has already been received (step S4001). The judgment is performed as a process to judge whether or not the entry having the same SRC ID and FID as the SRC ID and FID set in the received frame is registered in the FID table 1006 (FIG. 24) in FIG. 10.

When the received frame is an already received frame and the judgment in step S4001 is YES, since there is no need to process the same synchronization request frame redundantly, the routing controller 1003 discards the received frame (step S4006). Then, the routing controller 1003 terminates the WaitNo initialization process according to deletion notification in FIG. 40, and returns to the detection process of frame reception by the ad-hoc routing control device 1001.

When the received frame is a frame received for the first time and the judgment in step S4001 is NO, the routing controller 1003 updates the local node WaitNo. on the WaitNo. table to the initial value (0xFF) (step S4002). Next, the routing controller 1003 updates the master Port on the WaitNo. table to the initial value (unused) (step S4003).

After that, the routing controller 1003 performed the following control. That is, the frame processor 1009 makes the transmission frame controller 1011 transmit the health frame via all the wired ad-hoc network ports 1016 according to the instruction from the routing controller 1003 (step S4004).

According to the control from the routing controller 1003, the frame processor 1009 controls the transmission frame controller 1011 to make it transmit the local node status notification frame to the core relay node 102 (step S4005). In the local node status notification frame, the local node WaitNo. updated in the WaitNo. table is set as the source WaitNo. (FIG. 12(*d*)). Accordingly the core relay node 102 recognizes that the local node WaitNo. has been updated in the sensor relay node 103.

Then, the routing controller 1003 terminates the WaitNo. initialization process according to deletion notification in FIG. 40, and returns to the detection process of frame reception by the ad-hoc routing control device 1001.

As described above, the routing controller 1003 can update the local node WaitNo. according to the situation of the adjacent node, when it receives notification of the occurrence of line disconnection by the health node from the adjacent node.

FIG. 41 through FIG. 44 are illustration diagrams of an example 1 in which the initialization and reconfiguration of WaitNo. is performed using health information at the time of line disconnection. The example 1 corresponds to the example illustrated in FIG. 34 through FIG. 37.

In FIG. 41, it is assumed that the communication line between the sensor relay node 103-ID1 and the sensor relay node 103-ID2 is disconnected. The status transitions S2, S4, S6, S8 are the same as in the case of FIG. 34 through FIG. 37.

Figure 42:
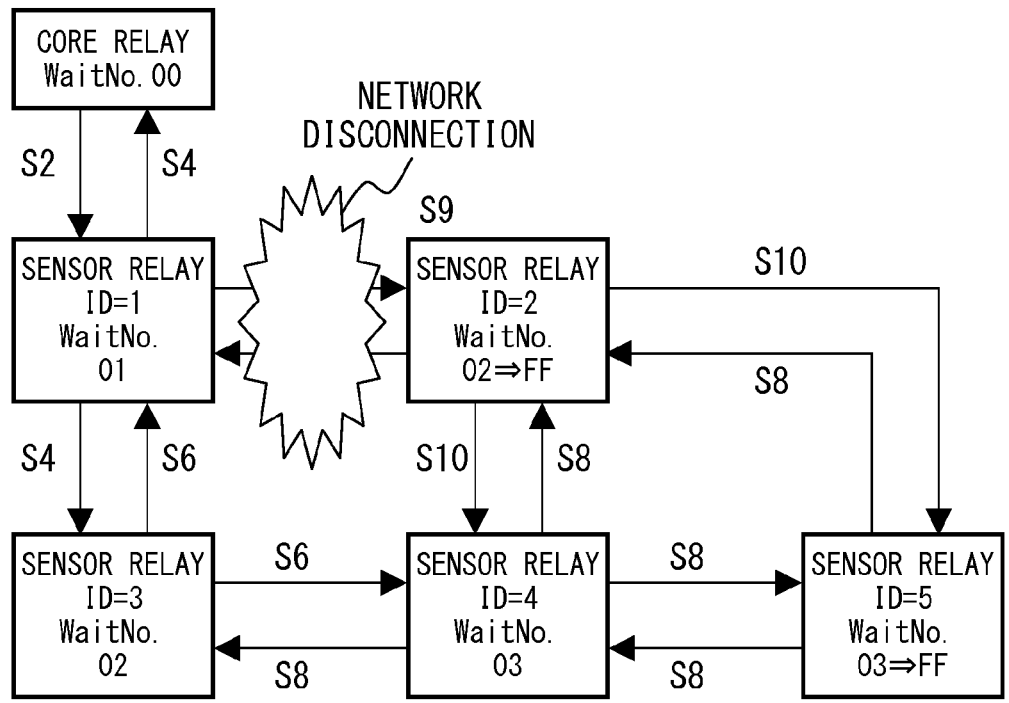

In FIG. 41 and FIG. 42, in the status transition S9, the sensor relay node 103-ID2 detects a line failure by, for example, step S3801 in FIG. 38. Accordingly, the sensor relay node 103-ID2 initializes the local node WaitNo. stored in the WaitNo. table from 0x02 to 0xFF. This process is executed according to of steps S3804 and S3807 in FIG. 38.

In the status transition S10, the sensor relay node 103 transmits the health frame (FIG. 12(b)) including the initialized WaitNo. as the source WaitNo. to each of the adjacent sensor relay nodes 103-ID4 and 103-ID5. This process is executed according to the control of steps S3809 and S3810 in FIG. 38.

As a result, in the sensor relay node 103-ID5, after the judgment in step S3303 in FIG. 33 becomes YES, since there is no port of the smaller WaitNo. in the ports other than the reception port, the judgment becomes NO in step S3901 in FIG. 39. Then, by step S3902, the local node WaitNo. in the WaitNo. table is initialized to 0xFF in the sensor relay node 103-ID5 as well.

Meanwhile, in the sensor relay node 103-ID4, after the judgment in step S3303 in FIG. 33 becomes YES, since there is a port of the smaller WaitNo. in the ports other than the reception port, the judgment becomes YES in step S3901 in FIG. 39. Accordingly, by step S3904, in the sensor relay node 103-ID4, the local node WaitNo. in the WaitNo. table is maintained at the same value 0x03. "0x03" is obtained by incrementing the Wait No. of the sensor relay node 103-ID3.

Following the initialization process described above, a reconfiguration process of the WaitNo. is performed.

Shifting from FIG. 42 to FIG. 43, in the status transition S8, according to the health frame transmitted from the sensor relay node 103-ID4, the local node WaitNo. in the WaitNo. table is update to 0x04 in each of the sensor relay nodes 103-ID2 and 103-ID5. This process is executed as the control of steps S3303, S3304 and S3305 in FIG. 33.

As described with reference to FIG. 41 to FIG. 43, even if line disconnection occurs between the sensor relay node 103-ID1 and the sensor relay node 103-ID2, the WaitNo. of each of the sensor relay nodes 103-ID2 and 103-ID5 is automatically initialized and reconfigured.

In the status transition S12 in FIG. 44, the health frame (FIG. 12(b)) including the reconfigured WaitNo. as the source WaitNo. is transmitted from the sensor relay node 103-ID5 to the adjacent node. The process is executed as the control in S3307 in FIG. 33.

Meanwhile, after the completion of reconfiguration in FIG. 44, each sensor relay node 103 also monitors the failure detection at each port and the regular reception of the health frame, it becomes possible to be prepared for occurrence of a new failure and the like.

In addition, when the line disconnection is recovered, by the same initialization and reconfiguration of the WaitNo. as described above, it becomes possible to reestablish the path with the smallest hop count.

FIG. 45 and FIG. 46 are illustration diagrams of an example 2 in which the initialization and reconfiguration of WaitNo. is performed using health information at the time of line disconnection. The system configuration of the example 2 is substantially the same as the one illustrated in FIG. 1.

In FIG. 45, line disconnection occurs in the status transition S1. As a result, in the status transition S2, the sensor relay node 103 with the WaitNo.=0x03 detects the line failure by step S3801 in FIG. 38 for example. Accordingly, this sensor relay node 103 initializes the local node WaitNo. from 0x03 to 0xFF. This process is executed according to of steps S3804 and S3807 in FIG. 38. Next, this sensor relay node 103 transmits the health frame (FIG. 12(b)) including the initialized WaitNo. as the source WaitNo. to each adjacent sensor relay node 103 having the WaitNo.=0x04. This process is executed according to the control of step S3809 and S3810 in FIG. 38.

Accordingly, as illustrated as FIG. 46, in each sensor relay node 103 having the WaitNo.=0x04., after the judgment in step 3303 is YES, since there is no smaller WaitNo. port in the ports other than the reception port, the judgment becomes NO in step S3901. As a result, by step S3902, in each sensor relay node 103 mentioned above, the local node WaitNo. is initialized to 0xFF.

Furthermore, in the status transition S3, in the sensor relay nodes 103 having WaitNo.=0x05 and 0x06 also, the adjacent node of a smaller WaitNo. than the local node is initialized, and the initialized WaitNo. is transmitted by means of the health frame. As result, in the same manner as described above, in each sensor relay node 103, the local node WaitNo. in the WaitNo. table is initialized to 0xFF.

The detection of line disconnection and the update of the local node WaitNo. in each sensor relay node 103 is informed to the core relay node 102 by the deletion notification frame or the local node status notification frame, as indicated by the thick solid line in FIG. 46. The process is executed according to the control in step S3803 and S3811 in FIG. 38, or step S3907 in FIG. 39.

FIG. 47 is an illustration diagram of example 2 which the initialization of the WaitNo. is performed using deletion information at the time of line disconnection.

In FIG. 47, line disconnection occurs in the status transition S1. In the status transition S2, the sensor relay nodes 103 at the two ends in which the line disconnection has occurred detects the line failure by step S3801 in FIG. 38 for example. Accordingly, the sensor relay nodes 103 initialize the local node WaitNo. to 0xFF. This process is executed according to of steps S3804 and S3807 in FIG. 38. Next, the sensor relay nodes 103 transmit the deletion notification frame including the initialized local node WaitNo. as the source WaitNo. to each adjacent sensor relay nodes 103. While this process is not illustrated in FIG. 38, as the control corresponding to steps S3809 and S3810 in FIG. 38, the transmission of the deletion notification frame may be executed. As a result, in each adjacent sensor relay node 103, the local node WaitNo. in the WaitNo. table is initialized to 0xFF.

As the status transition S3, these sensor relay nodes 103 further transmit the deletion notification frame including the initialized WaitNo. to the adjacent node. This process is executed according to step S4004 in FIG. 40. Accordingly, it becomes possible to initialize the local node WaitNo. in the WaitNo. table of each sensor relay node 103 for the entire sensor relay node group, depending on the condition.

FIG. 48 is an illustration diagram of example 2 in which the initialization and reconfiguration of WaitNo. is performed using health information at the time of line disconnection.

It is assumed that, by the initialization process illustrated in FIG. 46, in the sensor relay node 103 in the range enclosed by a broken line 4801 in FIG. 48, the local node WaitNo. in the WaitNo. table has been initialized. In this case, in the status transition S4, by the transmission of the health frame from the adjacent sensor relay nodes 103 having the WaitNos.=0x05 and 0x07, the WaitNo. of each sensor relay node 103 in the range of the broken line 4801 is sequentially updated and reconfigured. This process is executed by the control of steps S3303, S3304, and S3305 in FIG. 33.

FIG. 49 is an illustration diagram of an example 2 in which reconfiguration of the WaitNo. is performed using synchronization request at the time of line disconnection.

It is assumed that, by the initialization process illustrated in FIG. 47, the WaitNo. of each sensor relay node 103 in the entire relay node group 100 has been initialized. In this case, in the status transition S1, the core relay node 102 that receives the deletion notification frame and/or the local node status notification frame transmits a broadcast frame for time synchronization request and the like. As a result, at each sensor relay node 103 that receives the synchronization request frame, by the execution of the control process in the flowchart in FIG. 14, it becomes possible to make the local node WaitNo. reconfigure in the WaitNo. table of each sensor relay node 103.

In the embodiment explained above, by giving a WaitNo to each sensor relay node 103 and performing routing using it, the redundant path is avoided or reduced.

More specifically, in the present embodiment, by using the WaitNo. being routing information corresponding to the hop count from the core relay node 102, a routing method that makes it possible to detect and reconfigure an optimized route is established. In addition, by the automatic control of addition/deletion of the sensor relay node 103 to the ad-hoc network according to the WaitNo., a routing method that makes it possible to autonomously and promptly decide the optimal path having the smallest hop count is provided.

In the WaitNo. update process according to the present embodiment, the WaitNo. transmitted from the core relay node 102 is sequentially forwarded to each sensor relay node 103 in the sensor relay node group 100. At this time, the value of the source WaitNo. in the synchronization request frame or the health frame is incremented by 1 each time at each sensor relay node 103. Then, the incremented WaitNo. is set as the local node WaitNo. in each sensor relay node 103, and furthermore, the synchronization request frame or the health frame having the new WaitNo. is forwarded to the adjacent sensor relay nodes 103. Thus, for each sensor relay node 103 in FIG. 1, the WaitNo. corresponding to the hop count from the core relay node 102 can be set as the local node WaitNo.

In addition, in the WaitNo. update process according to the present embodiment, every time when the synchronization request frame or the health frame is received, the WaitNo. of the adjacent node corresponding to the reception port is kept in the WaitNo. table. Accordingly, it becomes possible to recognize the WaitNo. of the adjacent nodes in the direction in which the hop count decreases and in the direction in which the hop count increases, and the decision of the path with the smallest hop count is performed based on it.

In addition, in the present embodiment, it becomes possible for the sensor relay node 103 to update the local node WaitNo. autonomously according to the situation of the adjacent node, at the time of occurrence of line disconnection. In addition, it becomes possible for the routing controller 1003 to update the local node WaitNo. according to the situation of the adjacent node autonomously, when it receives notification of the occurrence of line disconnection from the adjacent node. Accordingly, at the time of occurrence of the line disconnection, it becomes possible to automatically reestablish the path.

Furthermore, after the completion of reconfiguration, each sensor relay node 103 continues to monitor the failure detection at each port and the regular reception of the health frame, it becomes possible to be prepared for occurrence of another failure and the like.

In addition, when the line disconnection is repaired, by the execution of the same initialization and reconfiguration of the WaitNo. as described above, it becomes possible to reestablish the path with the smallest hop count.

In the present embodiment, as illustrated in FIG. 12, the ad-hoc frame including the ad-hoc header 302-1, the WaitNo. 1201, and the data 302-2 is provided to the Ethernet frame including the MAC header 301, the MAC data 302, and the FCS 303. That is, in the present embodiment, the ad-hoc frame is communicated under the Ethernet protocol. However, the present invention is not limited to this frame configuration. That is, the ad-hoc frame is directly communicated based on the ad-hoc communication protocol between the sensor relay nodes 103 or between the sensor relay node 103 and the core relay node 102.

In addition, while the WaitNo. is assigned so as to be incremented from the core relay node 102 toward the sensor relay node 103 in the present embodiment, it may be assigned so as to be decremented. In that case, when transmitting a frame from the core relay node 102 to the target sensor relay node 103, each sensor relay node selects the smaller WaitNo. node, not the larger WaitNo. node.

In addition, when transmitting a frame from the sensor relay node 103 to the core relay node 102, the transmission may be made just by going back the optimal path decided when transmitting a frame from the core relay node 102 to the sensor relay node 103.

The present embodiment may be used for the air conditioning management of a server room, building/security management system, for checking vibration of distortion/deflection of structural objects such as a building, a bridge and the like, and for establishing a relay network for a location where ad-hop operation is not available, and the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A routing method performed by one of a plurality of node equipments included in a network, the method comprising:

receiving a first frame including a wait number information, incrementing the wait number information, and storing the incremented wait number information as local wait number information;

transmitting the first frame including the local wait number information;

receiving a second frame including a wait number information of a destination node equipment, and comparing the wait number information in the second frame and the local wait number information;

transmitting the second frame to an adjacent node equipment having larger wait number information than the local wait number information, selectively, when the wait number information in the second frame is larger than the local wait number information; and returning the second frame to a source node equipment of the second frame, when the wait number in the second frame is larger than the local wait number but there is no adjacent node equipment having a larger wait number than the local wait number;

transmitting the second frame to an adjacent node equipment having smaller wait number information than the local wait number information, selectively, when the wait number information in the second frame is smaller than the local wait number information; and returning the second frame to the source node equipment of the second frame, when the wait number in the second frame is smaller than the local wait number but there is no adjacent node equipment having a smaller wait number than the local wait number, wherein in a case in which a communication failure is detected, the one of the plurality of node equipments equipment initializes the local wait number information when the local wait number information is smaller than a wait number information of any other adjacent node equipments, when the local wait number information is larger than a wait number information of any other available adjacent node equipments, the one of the plurality of node equipments increments the wait number information of the adjacent node equipment and stores as the local wait number information, the one of the plurality of node equipments transmits a health frame as the first frame including the local wait number information.

2. The routing method according to claim 1, further comprising receiving the second frame or returning the second frame to the a source node equipment of the second frame, when the wait number information in the second frame is equal to the local wait number information.

3. The routing method according to claim 1, wherein the one of the plurality of node equipments stores the wait number information in the first frame as a communication port wait number information in association with a communication port that the first frame arrives, the one of the plurality of node equipments decides a destination of the second frame according to the communication port wait number information.

4. The routing method according to claim 1, wherein when the local wait number information is larger than the wait number information in the first frame, the one of the plurality of node equipments increments the wait number information in the received first frame and stores as the local wait number information.

5. The routing method according to claim 1, wherein in a case in which a communication failure is detected, the one of the plurality of node equipments receives a health frame including initialized wait number information as the first frame, the one of the plurality of node equipments initializes the local wait number information when the local wait number information is smaller than a wait number information of any other adjacent node equipments, when the local wait number information is larger than a wait number information of any other available adjacent node equipments, the one of the plurality of node equipments increments the wait number information of the adjacent node equipment and stores as the local wait number information, the one of the plurality of node equipments transmits a health frame as the first frame including the local wait number information.

6. The routing method according to claim 1, wherein the one of the plurality of node equipments initializes the local wait number information upon receiving a deletion notification frame.

7. The routing method according to claim 1, wherein when there is a plurality of destinations having same wait number information, the one of the plurality of node equipments transmits the second frame to a destination decided based on a port number of respective communication ports connected to the plurality of the destinations.

8. The routing method according to claim 1, wherein the first frame is a synchronization request frame broadcasted from a core relay node.

9. The routing method according to claim 1, wherein the first frame is a health frame for performing a health check transmitted and received between the node equipments.

10. The routing method according to claim 1, further comprising:

returning the second frame to a source node equipment of the second frame, when the number information in the second frame is larger than the local number information but there is no adjacent node equipment having larger number information than the local number information or when the number information in the second frame is smaller than the local number information but there is no adjacent node equipment having smaller number information than the local number information.

11. The routing method according to claim 10, further comprising:

storing information representing that the second frame is in a loop status, when the second frame is returned to the source equipment of the second frame.

12. A node equipment comprising:

a wait number information controller which increments, upon receiving a first frame including a wait number information, the wait number information in the first frame and store as local wait number information, and to transmit the first frame including the local wait number information; and a routing controller which controls a routing of a second frame including a wait number information of a destination node equipment, wherein the routing controller transmits the second frame to an adjacent node equipment having larger wait number information than the local wait number information, selectively, when the wait number information in the second frame is larger than the local wait number information, the routing controller returns the second frame to a source node equipment of the second frame, when the wait number in the second frame is larger than the local wait number but there is no adjacent node equipment having a larger wait number than the local wait number, the routing controller transmits the second frame to an adjacent node equipment having smaller wait number information than the local wait number information, selectively, when the wait number information in the second frame is smaller than the local wait number information, wherein in a case in which a communication failure is detected, the one of the plurality of node equipments equipment initializes the local wait number information when the local wait number information is smaller than a wait number information of any other adjacent node equipments, when the local wait number information is larger than a wait number information of any other available adjacent node equipments, the one of the plurality of node equipments increments the wait number information of the adjacent node equipment and stores as the local wait number information, the one of the plurality of node equipments transmits a health frame as the first frame including the local wait number information.

13. The node equipment according to claim 12, wherein
the routing controller receives the second frame or returns the second frame to the source node equipment of the second frame, when the wait number information in the second frame is equal to the local wait number information.

14. The node equipment according to claim 12, wherein
the wait number information controller stores the wait number information in the first frame as a communication port wait number information in association with a communication port that the first frame arrives, the routing controller decides a destination of the second frame according to the communication port wait number information.

15. The node equipment according to claim 12, wherein
the routing controller stores loop information representing whether there is an adjacent node equipment for the second frame for each communication port, and performs routing of the second frame according to the loop information.

16. The node equipment according to claim 12, wherein
the routing controller returns the second frame to a source node equipment of the second frame, when the number information in the second frame is larger than the local number information but there is no adjacent node equipment having larger number information than the local number information or when the number information in the second frame is smaller than the local number information but there is no adjacent node equipment having smaller number information than the local number information.

17. The node equipment according to claim 16, wherein
the routing controller storing information representing that the second frame is in a loop status, when the routing controller returns the second frame to the source equipment of the second frame.

18. A computer-readable, non-transitory recording medium having stored therein a program for causing a computer, which performs as one of a plurality of node equipments included in a network, to execute a routing process comprising:

receiving a first frame including number information, incrementing the number information, and storing the incremented number information as local number information;

transmitting the first frame including the local number information;

receiving a second frame including number information of a destination node equipment, and comparing the number information in the second frame and the local number information;

transmitting the second frame to an adjacent node equipment having larger number information than the local number information, selectively, when the number information in the second frame is larger than the local number information; and transmitting the second frame to an adjacent node equipment having smaller number information than the local number information, selectively, when the number information in the second frame is smaller than the local number information, wherein
in a case in which a communication failure is detected,
the one of the plurality of node equipments equipment initializes the local wait number information when the local wait number information is smaller than a wait number information of any other adjacent node equipments, when the local wait number information is larger than a wait number information of any other available adjacent node equipments, the one of the plurality of node equipments increments the wait number information of the adjacent node equipment and stores as the local wait number information, the one of the plurality of node equipments transmits a health frame as the first frame including the local wait number information.

* * * * *